US010567364B2

(12) United States Patent
Vats et al.

(10) Patent No.: US 10,567,364 B2
(45) Date of Patent: *Feb. 18, 2020

(54) PRESERVING LDAP HIERARCHY IN A SCIM DIRECTORY USING SPECIAL MARKER GROUPS

(71) Applicant: Oracle International Corporation, Redwood Shores, CA (US)

(72) Inventors: Kanika Vats, Bangalore (IN); Hari Sastry, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 15/705,611

(22) Filed: Sep. 15, 2017

(65) Prior Publication Data

US 2018/0083944 A1 Mar. 22, 2018

Related U.S. Application Data

(60) Provisional application No. 62/395,405, filed on Sep. 16, 2016.

(30) Foreign Application Priority Data

Sep. 16, 2016 (IN) .............................. 201641031586

(51) Int. Cl.
*H04L 29/06* (2006.01)
*G06F 16/22* (2019.01)
*G06F 16/28* (2019.01)

(52) U.S. Cl.
CPC .......... *H04L 63/08* (2013.01); *G06F 16/2246* (2019.01); *G06F 16/282* (2019.01); *H04L 63/10* (2013.01)

(58) Field of Classification Search
CPC ..................................................... G06F 16/282
See application file for complete search history.

(56) References Cited

U.S. PATENT DOCUMENTS 5,550,971 A  8/1996  Brunner et al.
6,097,382 A  8/2000  Rosen et al.
(Continued)

FOREIGN PATENT DOCUMENTS

CN  101399813 A  4/2009
CN  103780635 A  5/2014
(Continued)

OTHER PUBLICATIONS

Unknown, "SAML Authorization Assertion", Oct. 31, 2014, Oracle, pp. 1-2, Retrieved from docs.oracle.com.
(Continued)

*Primary Examiner* — Thaddeus J Plecha
(74) *Attorney, Agent, or Firm* — Potomac Law Group, PLLC

(57) ABSTRACT

A method for hierarchically processing Lightweight Directory Access Protocol (LDAP) operations against a System for Cross-domain Identity Management (SCIM) directory is provided. The method includes providing an LDAP Directory Information Tree (DIT) including a plurality of LDAP DIT entries that describe LDAP containers, users and groups, providing a SCIM directory including a plurality of SCIM resource entries that describe SCIM users and groups, migrating the plurality of LDAP DIT entries to the SCIM directory including storing the LDAP DIT hierarchical information in the SCIM directory by mapping LDAP containers in the LDAP DIT to special marker SCIM groups in the SCIM directory, receiving, from an LDAP-based application over a network, an LDAP operation request, processing the
(Continued)

LDAP operation request, and returning an LDAP operation response to the LDAP-based application over the network.

20 Claims, 48 Drawing Sheets

(56) References Cited

U.S. PATENT DOCUMENTS

| | | |
|---|---|---|
| 6,266,058 B1 | 7/2001 | Meyer |
| 6,353,834 B1 | 3/2002 | Wong et al. |
| 6,578,068 B1 | 6/2003 | Bowman-Amuah |
| 6,606,663 B1 | 8/2003 | Liao et al. |
| 6,631,497 B1 | 10/2003 | Jamshidi et al. |
| 6,631,519 B1 | 10/2003 | Nicholson et al. |
| 6,978,305 B1 | 12/2005 | Nainani et al. |
| 6,990,653 B1 | 1/2006 | Burd et al. |
| 7,035,846 B2 | 4/2006 | Gupta et al. |
| 7,062,502 B1 | 6/2006 | Kesler |
| 7,111,307 B1 | 9/2006 | Wang |
| 7,116,310 B1 | 10/2006 | Evans et al. |
| 7,203,678 B1 | 4/2007 | Petropoulos et al. |
| 7,337,434 B2 | 2/2008 | Nichols et al. |
| 7,395,355 B2 | 7/2008 | Afergan et al. |
| 7,428,725 B2 | 9/2008 | Niyogi et al. |
| 7,430,732 B2 | 9/2008 | Cwalina et al. |
| 7,464,297 B2 | 12/2008 | Potter et al. |
| 7,487,248 B2 | 2/2009 | Moran et al. |
| 7,529,825 B1 | 5/2009 | Freskos et al. |
| 7,546,576 B2 | 6/2009 | Egli |
| 7,546,602 B2 | 6/2009 | Hejlsberg et al. |
| 7,577,909 B2 | 8/2009 | Harriger et al. |
| 7,577,934 B2 | 8/2009 | Anonsen et al. |
| 7,610,575 B2 | 10/2009 | Sproule |
| 7,650,505 B1 | 1/2010 | Masurkar |
| 7,650,594 B2 | 1/2010 | Nattinger |
| 7,685,206 B1 | 3/2010 | Mathew et al. |
| 7,685,430 B1 | 3/2010 | Masurkar |
| 7,703,128 B2 | 4/2010 | Cross et al. |
| 7,707,553 B2 | 4/2010 | Roques et al. |
| 7,716,492 B1 | 5/2010 | Saulpaugh et al. |
| 7,730,427 B2 | 6/2010 | Peters |
| 7,735,068 B2 | 6/2010 | Siddaramappa et al. |
| 7,757,177 B1 | 7/2010 | Bohm et al. |
| 7,757,207 B2 | 7/2010 | Yan et al. |
| 7,779,383 B2 | 8/2010 | Bomhoevd et al. |
| 7,827,256 B2 | 11/2010 | Phillips et al. |
| 7,849,447 B1 | 12/2010 | Karis et al. |
| 7,861,121 B2 | 12/2010 | Wang |
| 7,917,888 B2 | 3/2011 | Chong et al. |
| 7,926,027 B2 | 4/2011 | Chen et al. |
| 8,032,634 B1 | 10/2011 | Eppstein et al. |
| 8,099,766 B1 | 1/2012 | Corbett |
| 8,166,387 B2 | 4/2012 | Morrison et al. |
| 8,209,491 B2 | 6/2012 | Mobarak et al. |
| 8,219,970 B2 | 7/2012 | Neil et al. |
| 8,245,037 B1 | 8/2012 | Durgin et al. |
| 8,321,921 B1 | 11/2012 | Ahmed et al. |
| 8,364,968 B2 | 1/2013 | Corcoran et al. |
| 8,417,728 B1 | 4/2013 | Anders et al. |
| 8,452,567 B1 | 5/2013 | Sullivan et al. |
| 8,464,063 B2 | 6/2013 | Agarwal et al. |
| 8,473,951 B2 | 6/2013 | Sharon et al. |
| 8,554,846 B2 | 10/2013 | Brail |
| 8,578,282 B2 | 11/2013 | Boillot |
| 8,612,599 B2 | 12/2013 | Tung et al. |
| 8,676,723 B2 | 3/2014 | Jung |
| 8,732,182 B2 | 5/2014 | Bethlehem et al. |
| 8,732,665 B2 | 5/2014 | Vedula et al. |
| 8,745,641 B1 | 6/2014 | Coker |
| 8,782,632 B1 | 7/2014 | Chigurapati et al. |
| 8,799,641 B1 | 8/2014 | Seidenberg et al. |
| 8,812,627 B2 | 8/2014 | Donahue et al. |
| 8,813,028 B2 | 8/2014 | Farooqi |
| 8,824,274 B1 | 9/2014 | Medved et al. |
| 8,863,111 B2 | 10/2014 | Selitser et al. |
| 8,873,401 B2 | 10/2014 | Ashwood-Smith et al. |
| 8,938,540 B2 | 1/2015 | Van Biljon et al. |
| 8,949,776 B2 | 2/2015 | Feber |
| 8,954,732 B1 | 2/2015 | Watsen et al. |
| 8,955,081 B2 | 2/2015 | Metke et al. |
| 8,972,929 B2 | 3/2015 | Fahmy |
| 8,977,693 B2 | 3/2015 | Gidugu |
| 8,978,114 B1 | 3/2015 | Kaushik et al. |
| 8,984,581 B2 | 3/2015 | Luna et al. |
| 8,990,765 B2 | 3/2015 | Kulkarni et al. |
| 9,009,858 B2 | 4/2015 | Sapp, II et al. |
| 9,037,723 B2 | 5/2015 | Morgan |
| 9,047,166 B2 | 6/2015 | Nishio et al. |
| 9,047,404 B1 | 6/2015 | Jibaly et al. |
| 9,047,414 B1 | 6/2015 | Matyjek |
| 9,069,979 B2 | 6/2015 | Srinivasan et al. |
| 9,077,770 B2 | 7/2015 | Redpath |
| 9,105,046 B1 | 8/2015 | Dias et al. |
| 9,118,657 B1 | 8/2015 | Shetty |
| 9,158,518 B2 | 10/2015 | Brown et al. |
| 9,183,321 B2 | 11/2015 | Murthy |
| 9,223,684 B2 | 12/2015 | Gittelman et al. |
| 9,246,840 B2 | 1/2016 | Anderson et al. |
| 9,258,668 B2 | 2/2016 | Mall et al. |
| 9,258,669 B2 | 2/2016 | Nyisztor et al. |
| 9,292,502 B2 | 3/2016 | Karlsen |
| 9,355,279 B1 | 5/2016 | Takahashi |
| 9,369,457 B2 | 6/2016 | Grajek et al. |
| 9,413,750 B2 | 8/2016 | Akula et al. |
| 9,432,457 B2 | 8/2016 | Marano et al. |
| 9,448,790 B2 | 9/2016 | Collison et al. |
| 9,483,491 B2 | 11/2016 | Wijayaratne et al. |
| 9,544,293 B2 | 1/2017 | Mathew et al. |
| 9,648,007 B1 | 5/2017 | Sterling et al. |
| 9,715,534 B2 | 7/2017 | Beausoleil et al. |
| 9,729,539 B1 | 8/2017 | Agrawal et al. |
| 9,772,822 B2 | 9/2017 | Narayanan et al. |
| 9,774,586 B1 | 9/2017 | Roche et al. |
| 9,826,045 B2 | 11/2017 | Straub et al. |
| 9,886,524 B1 | 2/2018 | Richardson et al. |
| 9,935,934 B1 | 4/2018 | Orozco et al. |
| 9,992,186 B1 | 6/2018 | Drozd et al. |
| 10,013,364 B1 | 7/2018 | O'Brien et al. |
| 10,148,493 B1 | 12/2018 | Ennis, Jr. et al. |
| 10,331,879 B1 | 6/2019 | Jiang et al. |
| 10,382,202 B1 | 8/2019 | Ohsie et al. |
| 2001/0007128 A1 | 7/2001 | Lambert et al. |
| 2002/0116441 A1 | 8/2002 | Ding et al. |
| 2002/0138722 A1 | 9/2002 | Douceur et al. |
| 2002/0174010 A1 | 11/2002 | Rice |
| 2003/0023623 A1 | 1/2003 | Horvitz et al. |
| 2003/0028583 A1 | 2/2003 | Flores et al. |
| 2003/0149717 A1 | 8/2003 | Heinzman |
| 2004/0010621 A1 | 1/2004 | Afergan et al. |
| 2004/0031030 A1 | 2/2004 | Kidder et al. |
| 2004/0046789 A1 | 3/2004 | Inanoria |
| 2004/0059719 A1 | 3/2004 | Gupta et al. |
| 2004/0128546 A1 | 7/2004 | Blakley, III et al. |
| 2004/0167866 A1* | 8/2004 | Kaw ................... G06F 16/252 |
| 2004/0250257 A1 | 12/2004 | Koutyrine et al. |
| 2005/0038849 A1 | 2/2005 | Kaluskar et al. |
| 2005/0055631 A1 | 3/2005 | Scardina et al. |
| 2005/0080792 A1* | 4/2005 | Ghatare ............... G06F 16/258 |
| 2005/0091539 A1 | 4/2005 | Wang et al. |
| 2005/0171872 A1 | 8/2005 | Burch et al. |
| 2005/0172261 A1 | 8/2005 | Yuknewicz et al. |
| 2005/0183059 A1 | 8/2005 | Loksh et al. |
| 2006/0075398 A1 | 4/2006 | Bennett et al. |
| 2006/0143359 A1 | 6/2006 | Dostert et al. |
| 2006/0173873 A1* | 8/2006 | Prompt ................ G06F 16/284 |
| 2006/0184656 A1 | 8/2006 | Roddy |
| 2006/0185004 A1 | 8/2006 | Song et al. |
| 2006/0291398 A1 | 12/2006 | Potter et al. |
| 2007/0016804 A1 | 1/2007 | Kemshall |
| 2007/0078887 A1 | 4/2007 | Harvey et al. |
| 2007/0112574 A1 | 5/2007 | Greene |
| 2007/0156659 A1 | 7/2007 | Lim |
| 2007/0174290 A1 | 7/2007 | Narang et al. |
| 2007/0219956 A1 | 9/2007 | Milton |

(56) References Cited

U.S. PATENT DOCUMENTS

| | | |
|---|---|---|
| 2007/0240127 A1 | 10/2007 | Roques et al. |
| 2007/0255764 A1 | 11/2007 | Sonnier et al. |
| 2008/0021997 A1 | 1/2008 | Hinton |
| 2008/0077809 A1 | 3/2008 | Hayter et al. |
| 2008/0222238 A1 | 9/2008 | Ivanov et al. |
| 2008/0256554 A1 | 10/2008 | Yassin |
| 2008/0276224 A1 | 11/2008 | Gyure et al. |
| 2009/0006538 A1 | 1/2009 | Risney et al. |
| 2009/0064001 A1 | 3/2009 | Robbins |
| 2009/0086726 A1 | 4/2009 | Savage et al. |
| 2009/0106234 A1 | 4/2009 | Siedlecki et al. |
| 2009/0119763 A1 | 5/2009 | Park et al. |
| 2009/0125595 A1 | 5/2009 | Maes |
| 2009/0157811 A1 | 6/2009 | Bailor et al. |
| 2009/0164571 A1 | 6/2009 | Potter et al. |
| 2009/0183072 A1 | 7/2009 | Stephenson et al. |
| 2009/0265772 A1 | 10/2009 | Hitchcock et al. |
| 2009/0300740 A1 | 12/2009 | Verma et al. |
| 2010/0017812 A1 | 1/2010 | Nigam |
| 2010/0042869 A1 | 2/2010 | Szabo et al. |
| 2010/0070230 A1 | 3/2010 | Kumar et al. |
| 2010/0107241 A1 | 4/2010 | Jaber et al. |
| 2010/0257513 A1 | 10/2010 | Thirumalai et al. |
| 2010/0262631 A1* | 10/2010 | Andersson ............ G06F 16/258 707/809 |
| 2010/0269164 A1 | 10/2010 | Sosnosky et al. |
| 2010/0281475 A1 | 11/2010 | Jain et al. |
| 2010/0286992 A1 | 11/2010 | Tkatch et al. |
| 2010/0293080 A1 | 11/2010 | Shah |
| 2011/0010394 A1 | 1/2011 | Carew et al. |
| 2011/0022812 A1 | 1/2011 | Linden et al. |
| 2011/0078675 A1 | 3/2011 | Camp et al. |
| 2011/0082879 A1* | 4/2011 | Hazlewood ......... G06F 16/9027 707/770 |
| 2011/0107196 A1 | 5/2011 | Foster |
| 2011/0123973 A1 | 5/2011 | Singh |
| 2011/0125448 A1 | 5/2011 | Jung |
| 2011/0138034 A1 | 6/2011 | Brookbanks et al. |
| 2011/0209140 A1 | 8/2011 | Scheidel et al. |
| 2011/0213756 A1 | 9/2011 | Chen et al. |
| 2011/0213870 A1 | 9/2011 | Cai et al. |
| 2011/0246964 A1 | 10/2011 | Cox et al. |
| 2011/0265077 A1 | 10/2011 | Collison et al. |
| 2011/0265172 A1 | 10/2011 | Sharma et al. |
| 2011/0302516 A1 | 12/2011 | White et al. |
| 2011/0314159 A1 | 12/2011 | Murphy et al. |
| 2011/0314175 A1 | 12/2011 | Thilagar et al. |
| 2011/0321033 A1 | 12/2011 | Kelkar et al. |
| 2011/0321150 A1 | 12/2011 | Gluck |
| 2012/0011578 A1 | 1/2012 | Hinton et al. |
| 2012/0036125 A1 | 2/2012 | Al-Kofahi et al. |
| 2012/0072728 A1 | 3/2012 | Teather et al. |
| 2012/0084313 A1* | 4/2012 | Greene ................ G06Q 10/10 707/769 |
| 2012/0090021 A1 | 4/2012 | Luh et al. |
| 2012/0096521 A1 | 4/2012 | Peddada |
| 2012/0102451 A1 | 4/2012 | Kulkarni et al. |
| 2012/0110650 A1 | 5/2012 | Van Biljon et al. |
| 2012/0140923 A1 | 6/2012 | Lee et al. |
| 2012/0151063 A1 | 6/2012 | Yang et al. |
| 2012/0151568 A1 | 6/2012 | Pieczul et al. |
| 2012/0166488 A1 | 6/2012 | Kaushik et al. |
| 2012/0170751 A1 | 7/2012 | Wurm |
| 2012/0215582 A1 | 8/2012 | Petri et al. |
| 2012/0252405 A1 | 10/2012 | Lortz et al. |
| 2012/0254111 A1 | 10/2012 | Carmichael |
| 2012/0297016 A1 | 11/2012 | Iyer et al. |
| 2012/0317172 A1 | 12/2012 | Redpath |
| 2012/0317233 A1 | 12/2012 | Redpath |
| 2012/0323553 A1 | 12/2012 | Aslam et al. |
| 2012/0328105 A1 | 12/2012 | Mukkara et al. |
| 2013/0007845 A1 | 1/2013 | Chang et al. |
| 2013/0019015 A1 | 1/2013 | Devarakonda et al. |
| 2013/0019242 A1 | 1/2013 | Chen et al. |
| 2013/0024695 A1 | 1/2013 | Kandrasheu et al. |
| 2013/0031136 A1 | 1/2013 | Shah |
| 2013/0071087 A1 | 3/2013 | Motiwala et al. |
| 2013/0086645 A1 | 4/2013 | Srinivasan et al. |
| 2013/0151848 A1 | 6/2013 | Baumann et al. |
| 2013/0152047 A1 | 6/2013 | Moorthi et al. |
| 2013/0173712 A1 | 7/2013 | Llorente et al. |
| 2013/0191339 A1 | 7/2013 | Haden et al. |
| 2013/0191481 A1 | 7/2013 | Prevost et al. |
| 2013/0198236 A1 | 8/2013 | Lissack et al. |
| 2013/0198363 A1 | 8/2013 | Kolluru et al. |
| 2013/0232179 A1 | 9/2013 | Chhaunker et al. |
| 2013/0254262 A1 | 9/2013 | Udall |
| 2013/0262626 A1 | 10/2013 | Bozek et al. |
| 2013/0312117 A1 | 11/2013 | Sapp, II et al. |
| 2014/0006465 A1 | 1/2014 | Davis et al. |
| 2014/0007205 A1 | 1/2014 | Oikonomou |
| 2014/0013109 A1 | 1/2014 | Yin |
| 2014/0013400 A1 | 1/2014 | Warshavsky et al. |
| 2014/0032531 A1 | 1/2014 | Ravi et al. |
| 2014/0036306 A1 | 2/2014 | Matsuda |
| 2014/0050317 A1 | 2/2014 | Sabin |
| 2014/0053056 A1 | 2/2014 | Weber et al. |
| 2014/0053126 A1 | 2/2014 | Watson et al. |
| 2014/0075032 A1 | 3/2014 | Vasudevan et al. |
| 2014/0075501 A1 | 3/2014 | Srinivasan et al. |
| 2014/0075565 A1 | 3/2014 | Srinivasan et al. |
| 2014/0089674 A1 | 3/2014 | Buehl |
| 2014/0090037 A1 | 3/2014 | Singh |
| 2014/0109072 A1 | 4/2014 | Lang et al. |
| 2014/0109078 A1 | 4/2014 | Lang et al. |
| 2014/0114707 A1 | 4/2014 | Rope et al. |
| 2014/0164318 A1 | 6/2014 | Tsai et al. |
| 2014/0173454 A1 | 6/2014 | Sanchez |
| 2014/0181931 A1 | 6/2014 | Bokarius et al. |
| 2014/0215590 A1 | 7/2014 | Brand |
| 2014/0222818 A1 | 8/2014 | Kikuchi et al. |
| 2014/0245389 A1 | 8/2014 | Oberheide et al. |
| 2014/0280771 A1 | 9/2014 | Bosworth et al. |
| 2014/0280931 A1 | 9/2014 | Braun et al. |
| 2014/0280943 A1 | 9/2014 | Bobrov et al. |
| 2014/0280948 A1 | 9/2014 | Schmidt et al. |
| 2014/0281943 A1 | 9/2014 | Prilepov et al. |
| 2014/0282398 A1 | 9/2014 | Podolyak et al. |
| 2014/0282399 A1 | 9/2014 | Gorelik et al. |
| 2014/0282889 A1 | 9/2014 | Ishaya et al. |
| 2014/0298293 A1 | 10/2014 | Nishio et al. |
| 2014/0304507 A1 | 10/2014 | Coppola et al. |
| 2014/0304700 A1 | 10/2014 | Kim et al. |
| 2014/0310243 A1 | 10/2014 | McGee et al. |
| 2014/0324911 A1 | 10/2014 | de Lavarene et al. |
| 2014/0330869 A1 | 11/2014 | Factor et al. |
| 2014/0331337 A1 | 11/2014 | Factor et al. |
| 2014/0337914 A1 | 11/2014 | Canning et al. |
| 2015/0039732 A1 | 2/2015 | Mall et al. |
| 2015/0040104 A1 | 2/2015 | Mall et al. |
| 2015/0040201 A1 | 2/2015 | Nyisztor et al. |
| 2015/0067135 A1 | 3/2015 | Wang et al. |
| 2015/0089340 A1 | 3/2015 | Logan et al. |
| 2015/0089341 A1 | 3/2015 | Davis et al. |
| 2015/0089342 A1 | 3/2015 | Davis et al. |
| 2015/0089351 A1 | 3/2015 | Logan et al. |
| 2015/0089569 A1 | 3/2015 | Sondhi et al. |
| 2015/0089579 A1 | 3/2015 | Manza et al. |
| 2015/0089604 A1 | 3/2015 | Mathew et al. |
| 2015/0128063 A1 | 5/2015 | Jones |
| 2015/0128106 A1 | 5/2015 | Halley et al. |
| 2015/0154415 A1 | 6/2015 | Wu et al. |
| 2015/0195182 A1 | 7/2015 | Mathur et al. |
| 2015/0213284 A1 | 7/2015 | Birkel et al. |
| 2015/0229638 A1 | 8/2015 | Loo |
| 2015/0256530 A1 | 9/2015 | Semba |
| 2015/0295844 A1 | 10/2015 | Perreira et al. |
| 2015/0304446 A1 | 10/2015 | Kato |
| 2015/0319185 A1 | 11/2015 | Kirti et al. |
| 2015/0319252 A1 | 11/2015 | Momchilov et al. |
| 2015/0332596 A1 | 11/2015 | Applehans |
| 2015/0350186 A1 | 12/2015 | Chan et al. |
| 2015/0350338 A1 | 12/2015 | Barnett et al. |
| 2016/0004668 A1 | 1/2016 | Rowles et al. |

(56) References Cited

U.S. PATENT DOCUMENTS

| | | |
|---|---|---|
| 2016/0048848 A1 | 2/2016 | Diggs et al. |
| 2016/0080360 A1 | 3/2016 | Child et al. |
| 2016/0085666 A1 | 3/2016 | Jordan |
| 2016/0085735 A1 | 3/2016 | Davis et al. |
| 2016/0092176 A1 | 3/2016 | Straub et al. |
| 2016/0092179 A1 | 3/2016 | Straub |
| 2016/0092180 A1 | 3/2016 | Straub |
| 2016/0092339 A1 | 3/2016 | Straub et al. |
| 2016/0092348 A1 | 3/2016 | Straub et al. |
| 2016/0092425 A1 | 3/2016 | Shah et al. |
| 2016/0092540 A1 | 3/2016 | Bihani et al. |
| 2016/0099915 A1 | 4/2016 | Savelieva et al. |
| 2016/0105393 A1 | 4/2016 | Thakkar et al. |
| 2016/0112475 A1 | 4/2016 | Lawson et al. |
| 2016/0124742 A1 | 5/2016 | Rangasamy et al. |
| 2016/0125490 A1 | 5/2016 | Angal et al. |
| 2016/0127199 A1 | 5/2016 | Ding et al. |
| 2016/0127254 A1 | 5/2016 | Kumar et al. |
| 2016/0127349 A1 | 5/2016 | Nakajima et al. |
| 2016/0127454 A1 | 5/2016 | Maheshwari et al. |
| 2016/0132214 A1 | 5/2016 | Koushik et al. |
| 2016/0149882 A1 | 5/2016 | Srivastava |
| 2016/0154629 A1 | 6/2016 | Noens et al. |
| 2016/0182328 A1 | 6/2016 | Bhasin et al. |
| 2016/0182588 A1 | 6/2016 | Luo et al. |
| 2016/0202007 A1 | 6/2016 | Hatch |
| 2016/0203087 A1 | 7/2016 | Nam et al. |
| 2016/0248866 A1 | 8/2016 | Garas |
| 2016/0267170 A1 | 9/2016 | Hastings et al. |
| 2016/0269343 A1 | 9/2016 | Li et al. |
| 2016/0285795 A1 | 9/2016 | Beausoleil et al. |
| 2016/0292694 A1 | 10/2016 | Goldschlag et al. |
| 2016/0294655 A1 | 10/2016 | Lin et al. |
| 2016/0330177 A1 | 11/2016 | Singleton et al. |
| 2016/0352746 A1 | 12/2016 | Anderson et al. |
| 2016/0359861 A1 | 12/2016 | Manov et al. |
| 2016/0364231 A1 | 12/2016 | Tati et al. |
| 2016/0378436 A1 | 12/2016 | Jensen et al. |
| 2016/0378439 A1 | 12/2016 | Straub et al. |
| 2017/0010870 A1 | 1/2017 | Davis et al. |
| 2017/0046134 A1 | 2/2017 | Straub |
| 2017/0046235 A1 | 2/2017 | Straub et al. |
| 2017/0046254 A1 | 2/2017 | Buege |
| 2017/0048215 A1 | 2/2017 | Straub |
| 2017/0048252 A1 | 2/2017 | Straub et al. |
| 2017/0048319 A1 | 2/2017 | Straub |
| 2017/0048339 A1 | 2/2017 | Straub |
| 2017/0063833 A1 | 3/2017 | Colle et al. |
| 2017/0063989 A1 | 3/2017 | Langouev et al. |
| 2017/0083293 A1 | 3/2017 | Jao et al. |
| 2017/0083503 A1 | 3/2017 | Davis et al. |
| 2017/0141916 A1 | 5/2017 | Zhang |
| 2017/0142094 A1 | 5/2017 | Doitch et al. |
| 2017/0155686 A1 | 6/2017 | Yanacek et al. |
| 2017/0187785 A1 | 6/2017 | Johnson et al. |
| 2017/0214696 A1 | 7/2017 | Cleaver et al. |
| 2017/0244613 A1 | 8/2017 | Vasudevan et al. |
| 2017/0295184 A1 | 10/2017 | Kurian et al. |
| 2017/0317999 A1 | 11/2017 | Knjazihhin et al. |
| 2018/0032534 A1 | 2/2018 | Koerner et al. |
| 2018/0063258 A1 | 3/2018 | Wang et al. |
| 2018/0329981 A1 | 11/2018 | Gupte et al. |

FOREIGN PATENT DOCUMENTS

| | | |
|---|---|---|
| CN | 105515759 A | 4/2016 |
| JP | 2008027043 A | 2/2008 |
| JP | 2013025405 A | 2/2013 |
| JP | 2013182310 A | 9/2013 |
| JP | 2015527681 A | 9/2015 |
| JP | 2015529366 A | 10/2015 |
| JP | 2016009299 A | 1/2016 |
| WO | 2005001620 A2 | 1/2005 |
| WO | 2013071087 A1 | 5/2013 |
| WO | 2013186070 A1 | 12/2013 |
| WO | 2014039918 A1 | 3/2014 |
| WO | 2014046857 A1 | 3/2014 |
| WO | 2014151839 A1 | 9/2014 |
| WO | 2014176363 A1 | 10/2014 |
| WO | 2016049626 A1 | 3/2016 |
| WO | 2016065080 A1 | 4/2016 |

OTHER PUBLICATIONS

R. Fielding; Rest API Tutorial; 2017.

Coan et al., "Using Distributed Topology Update and Preplanned Configurations to Achieve Trunk Network Survivability", Oct. 1991, IEEE, vol. 40, No. 4 (Year: 1991).

Konstantinou et al., "An Architecture for Virtual Solution Composition and Deployment in Infrastructure Clouds", Jun. 2009, ACM (Year: 2009).

Oliveira et al., "Delivering software with agility and quality in a cloud environment", Mar. 2016, IBM, vol. 60 No. 2/3 Paper 10 (Year 2016).

Rasti et al., "On the Long-Term Evolution of the Two-Tier Gnutella Overlay", Apr. 2007, IEEE (Year: 2007).

Rokonuzzaman et al., "A Cross-layer Approach for Qos Topology Control in Wireless Ad Hoc Networks", 2009. IEEE (Year: 2009).

"Cross-Device Single Sign-On Session Transfer", retrieved from https://www.egiz.gv.at/en/projekte/160-sso_session_transfer on Sep. 7, 2017.

Application Note—"Implementing Single Sign-On Using SAML 2.0 On Juniper Networks Mag Series Junos Pulse Gateways", Juniper Networks, Inc., 2013, 22 pages.

Grossman et al., "ToolClips: An Investigation of Contextual Video Assistance for Functionality Understanding, CHI 2010: Looking with Video", Apr. 10-15, 2010, pp. 1515-1524.

Hudli et al., "An Evaluation Framework for Selection of Mobile App Development Platform", ACM, pp. 13-16, 2015.

"SCIM Directory Services", Oracle Corporation, Sep. 2012 (https://tools.ietf.org/id/draft-hunt-scim-directory-00.html#rfc.section.2.2, visited Jun. 26, 2017).

"UnboundID Identity Proxy Product Description Version 4.5", UnboundID Corp., Austin TX, 2015 (https://cdn2.hubspot.net/hub/405650/file-2157336753-pdf/Resources/Data_Sheets/UnboundID_Identity_Proxy_v4.5PD.pdf?t=1458081481415, visited Jun. 26, 2017).

Jones et al., RFC 7519 JSON Web Tokens (JWT), May 2015, IETF, pp. 1-30.

Author Unknown, "Oracle Access Management—Complete, Integrated, Scalable Access Management Solution", Oracle White Paper, Retrieved From Http://www.oracle.com/technetwork/middleware/id-mgmt/overview/complete-and-scalable-access-mgmt-1697349.pdf, Published May 2015.

"Citrix XenServer Workload Balancing (WLB)"; Jan. 22, 2015; https://www.citrix.com/blogs/2015/01/22/citrix-xenserver-workload-balancing-wlb-why-xendesktop-and-xenapp-customers-really-should-take-note/.

Sairam Pappu et al., "Integrate Oracle E-Business Suite Using Oracle E-Business Suite AccessGate with Oracle Access Manager Using Multiple Data Stores", Retrieved From http://www.oracle.com/technetwork/middleware/id-mgmt/overview/oamebsintegrationwhitepaper-2152856.pdf, published Feb. 2014.

Anonymous:"DaaS—Diagnostics as a Service for Azure Web Sites: Blog: Microsoft Azure", Jul. 8, 2014, XP055403199, Retrieved from the Internet on Nov. 17, 2017: URL:https://azure.microsoft.com/en-gb/blog/daas/.

"Explore Microsoft Azure monitoring and diagnostics", youtube, Sep. 28, 2016, XP054977701, Retrieved from the Internet on Nov. 17, 2017, URL:https://www.youtube.com/watch?v=wUf4sm8aA_w.

Wikipedia: "Security Assertion Markup Language—Wikipedia", Aug. 28, 2016, XP055417859, Retrieved from the Internet on Nov. 17, 2017, URL:https://en.wlkipedia.org/w/index.php?title=Security_Assertion_Markup_Language&oldid=736544308.

Brockallen: "Single sign-out and IdentityServer3: brockallen", Feb. 8, 2016, XP055417951, Retrieved from the Internet on Nov. 20, 2017, URL:https://brockallen.com/2016/02/08/single-sign-out-and-identityserver3/.

(56) References Cited

OTHER PUBLICATIONS

Gregg Browinski: "SAML Single Logout—What You Need to Know", Jun. 20, 2016, XP055417923, Retrieved from the Internet on Nov. 17, 2017, URL:https://www.portalguard.com/blog/2016/06/20/saml-single-logout-need-to-know/.

Gluu: "Shibboleth Plugin released to enable simultaneous OpenID Connect and SAML sessions: Gluu", Mar. 25, 2013, XP055417498, Retrieved from the Internet on Nov. 17, 2017, URL:https://www.gluu.org/press-releases/2013/gluu-releases-shibboleth-plugin-for-ox-to-enable-simultaneous-openid-connect-and-saml-sessions/.

Gluu: "Use Case for Asimba as SAML Proxy: Gluu : Blog", Dec. 3, 2013, XP055417606, Retrieved from the Internet on Nov. 17, 2017, URL:https://www.gluu.org/blog/use-case-for-asimba-as-saml-proxy/.

Gluu: "Diagram Gluu Software Architecture", Dec. 3, 2013, XP055417597, Retrieved from the Internet on Nov. 17, 2017, URL:https://www.gluu.org/blog/wp-content/uploads/2013/12/idea_asimba.png.

Anonymous: "Gluu Server Overview: The Gluu Server for SSO, WAM, & 2FA: Gluu", Aug. 29, 2016, XP055417541, Retrieved from the Internet on Nov. 20, 2017, URL:https://web.archive.org/web/20160829102122/https://www.gluu.org/gluu-server/overview/.

Claycomb et al., "Detecting Insider Activity Using Enhanced Directory Virtualization", Oct. 2010, Proceedings of the 2010 ACM workshop on Insider threats, p. 29-36.

Larsson, "A Cast Study: Implementing Novell Identity Management at Drew University", Nov. 2005, Proceedings of the 33rd annual ACM SIGUCCS conference on user services, p. 165-170.

\* cited by examiner

SCIM attributes

LDAP attributes

| Attribute Name | Value |
|---|---|
| schemas | "urn:ietf:params:scim:schemas:core:2.0:User", "urn:ietf:params:scim:schemas:extension:enterprise:2.0:User" |
| uid | bjensen@example.com |
| idcsFormatted | Ms. Barbara J Jensen III |
| sn | Jensen |
| givenName | Barbara |
| middleName | Jane |
| idcsHonorificPrefix | Ms. |
| orclGenerationQualifier | III |

```
{
  "schemas": [
    "urn:ietf:params:scim:schemas:core:2.0:User",
    "urn:ietf:params:scim:schemas:extension:enterprise:2.0:User"
  ],
  "userName": "bjensen@example.com",
  "name": {
    "formatted": "Ms. Barbara J Jensen III",
    "familyName": "Jensen",
    "givenName": "Barbara",
    "middleName": "Jane",
    "honorificPrefix": "Ms.",
    "honorificSuffix": "III"
  }
}
```

PRESERVING LDAP HIERARCHY IN A SCIM DIRECTORY USING SPECIAL MARKER GROUPS

CROSS-REFERENCE TO RELATED APPLICATIONS

This application claims priority to U.S. Patent Application Ser. Nos. 62/395,405 (filed on Sep. 16, 2016), the disclosure of which is hereby incorporated by reference in its entirety.

FIELD

One embodiment is directed generally to identity management, and in particular, to identity management in a cloud-based system.

BACKGROUND INFORMATION

Generally, the use of cloud based applications (e.g., enterprise public cloud applications, third party cloud applications, etc.) is soaring, with access coming from a variety of devices (e.g., desktop and mobile devices) and a variety of users (e.g., employees, partners, customers, etc.). The abundant diversity and accessibility of cloud based applications has led access security to become a central concern. Typical security concerns in a cloud environment are unauthorized access, account hijacking, malicious insiders, etc. Accordingly, there is a need for secure access to cloud based applications, or applications located anywhere, regardless of from what device type or by what user type the applications are accessed.

SUMMARY

Embodiments provide a system and methods that implement a number of microservices in a stateless middle tier to provide cloud based multi-tenant identity and access management services.

In certain embodiments, a method for processing Lightweight Directory Access Protocol (LDAP) operations against a System for Cross-domain Identity Management (SCIM) directory is provided. The method includes providing an LDAP Directory Information Tree (DIT) including a plurality of LDAP DIT entries that describe LDAP containers, users and groups, providing a SCIM directory including a plurality of SCIM resource entries that describe SCIM users and groups, migrating the plurality of LDAP DIT entries to the SCIM directory including storing the LDAP DIT hierarchical information in the SCIM directory by mapping LDAP containers in the LDAP DIT to special marker SCIM groups in the SCIM directory, receiving, from an LDAP-based application over a network, an LDAP operation request, processing the LDAP operation request, and returning an LDAP operation response to the LDAP-based application over the network.

BRIEF DESCRIPTION OF THE DRAWINGS

FIG. 23 depicts one-to-one mapping for simple, simple multi-valued, and simple complex attributes between SCIM and LDAP, in accordance with an embodiment of the invention.

DETAILED DESCRIPTION

Figure 1:
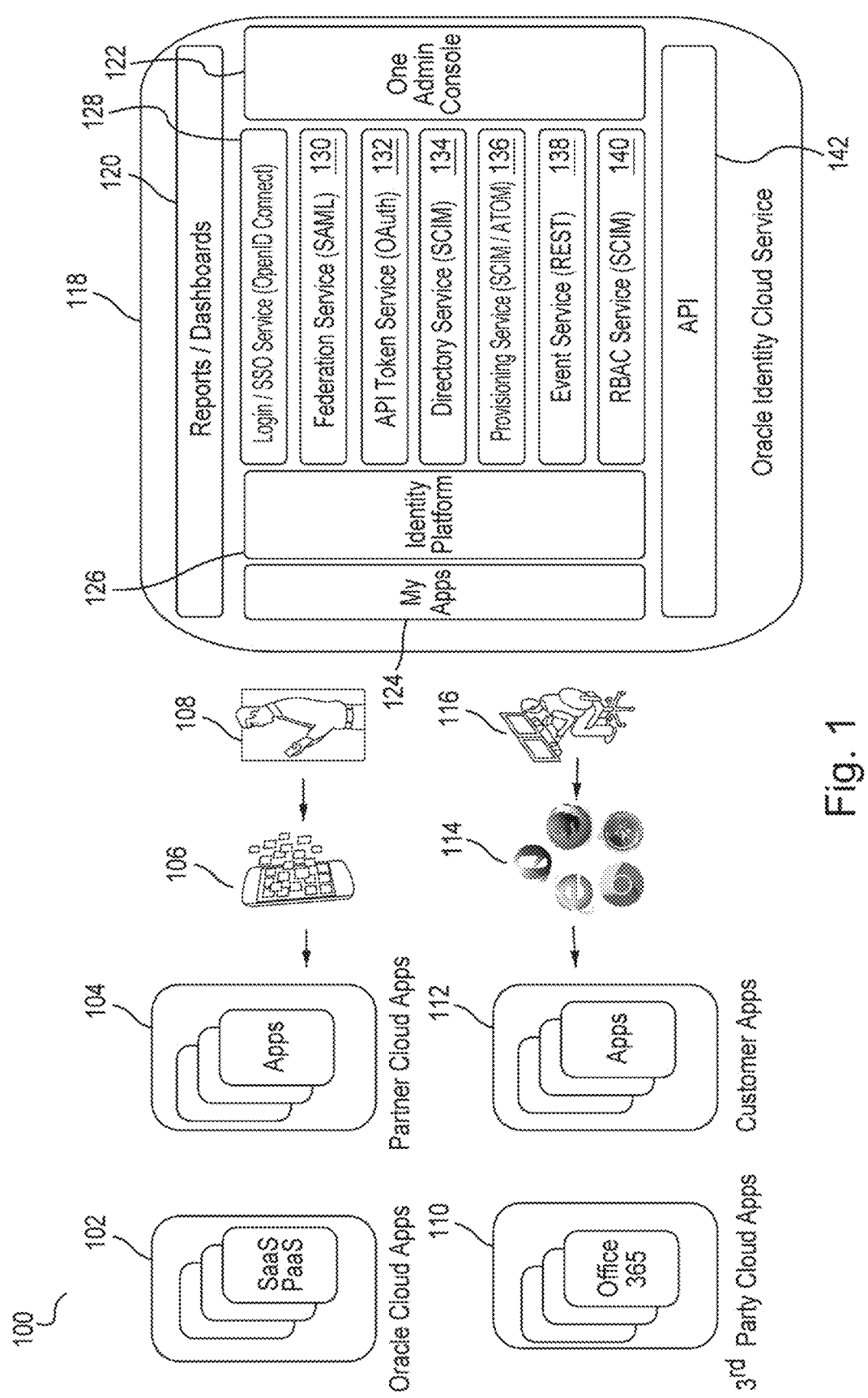
FIGS. 1-5 are block diagrams of example embodiments that provide cloud-based identity management.

Embodiments of the present invention provide an identity cloud service that implements a microservices based architecture and provides multi-tenant identity and data security management and secure access to cloud based applications. Embodiments support secure access for hybrid cloud deployments (i.e., cloud deployments which include a combination of a public cloud and a private cloud). Embodiments protect applications and data both in the cloud and on-premise. Embodiments support multi-channel access via web, mobile, and application programming interfaces ("APIs"). Embodiments manage access for different users, such as customers, partners, and employees. Embodiments manage, control, and audit access across the cloud as well as on-premise. Embodiments integrate with new and existing applications and identities. Embodiments are horizontally scalable.

Embodiments of the present invention provide a system and methods that implement a number of microservices in a stateless middle tier environment to provide cloud based multi-tenant identity and access management services. In certain embodiments, each requested identity management service is broken into real-time and near real-time tasks. The real-time tasks are handled by a microservice in the middle tier, while the near real-time tasks are offloaded to a message queue. Embodiments of the present invention implement access tokens that are consumed by a routing tier and a middle tier to enforce a security model for accessing the microservices. Accordingly, embodiments provide a cloud-scale Identity and Access Management ("IAM") platform based on a multi-tenant, microservices architecture.

In certain hybrid cloud deployments, identities are first migrated from an on-premises LDAP server to an IDCS SCIM server. Legacy on-premises LDAP-based applications then access these identities in the IDCS SCIM server through an intermediary or proxy service. In certain embodiments, an LDAP to SCIM proxy service allows legacy LDAP-based applications to interact seamlessly with the IDCS SCIM server. Newly-deployed on-premises SCIM-based applications may access the IDCS SCIM server directly, as well as those legacy on-premises LDAP-based applications that have been re-written to support SCIM. In a hybrid cloud deployment, the LDAP to SCIM proxy service advantageously provides a single source of truth for identities, and avoids the complexities, disadvantages and limitations of identity federation and/or synchronization configurations.

In certain embodiments, a method for processing LDAP (Lightweight Directory Access Protocol) operations against a SCIM (System for Cross-domain Identity Management) directory providing an LDAP Directory Information Tree (DIT) including a plurality of LDAP DIT entries that describe LDAP containers, users and groups, providing a SCIM directory including a plurality of SCIM resource entries that describe SCIM users and groups, migrating the plurality of LDAP DIT entries to the SCIM directory, receiving, from an LDAP-based application over a network, an LDAP operation request, processing the LDAP operation request, and returning an LDAP operation response to the LDAP-based application over the network.

Unified Security of Access

One embodiment protects applications and data in a cloud environment as well as in an on-premise environment. The embodiment secures access to any application from any device by anyone. The embodiment provides protection across both environments since inconsistencies in security between the two environments may result in higher risks. For example, such inconsistencies may cause a sales person to continue having access to their Customer Relationship Management ("CRM") account even after they have defected to the competition. Accordingly, embodiments extend the security controls provisioned in the on-premise environment into the cloud environment. For example, if a person leaves a company, embodiments ensure that their accounts are disabled both on-premise and in the cloud.

Generally, users may access applications and/or data through many different channels such as web browsers, desktops, mobile phones, tablets, smart watches, other wearables, etc. Accordingly, one embodiment provides secured access across all these channels. For example, a user may use their mobile phone to complete a transaction they started on their desktop.

One embodiment further manages access for various users such as customers, partners, employees, etc. Generally, applications and/or data may be accessed not just by employees but by customers or third parties. Although many known systems take security measures when onboarding employees, they generally do not take the same level of security measures when giving access to customers, third parties, partners, etc., resulting in the possibility of security breaches by parties that are not properly managed. However, embodiments ensure that sufficient security measures are provided for access of each type of user and not just employees.

Identity Cloud Service

Embodiments provide an Identity Cloud Service ("IDCS") that is a multi-tenant, cloud-scale, IAM platform. IDCS provides authentication, authorization, auditing, and federation. IDCS manages access to custom applications and services running on the public cloud, and on-premise systems. In an alternative or additional embodiment, IDCS may also manage access to public cloud services. For example, IDCS can be used to provide Single Sign On ("SSO") functionality across such variety of services/applications/systems.

Embodiments are based on a multi-tenant, microservices architecture for designing, building, and delivering cloud-scale software services. Multi-tenancy refers to having one physical implementation of a service securely supporting multiple customers buying that service. A service is a software functionality or a set of software functionalities (such as the retrieval of specified information or the execution of a set of operations) that can be reused by different clients for different purposes, together with the policies that control its usage (e.g., based on the identity of the client requesting the service). In one embodiment, a service is a mechanism to enable access to one or more capabilities, where the access is provided using a prescribed interface and is exercised consistent with constraints and policies as specified by the service description.

In one embodiment, a microservice is an independently deployable service. In one embodiment, the term microservice contemplates a software architecture design pattern in which complex applications are composed of small, independent processes communicating with each other using language-agnostic APIs. In one embodiment, microservices are small, highly decoupled services and each may focus on doing a small task. In one embodiment, the microservice architectural style is an approach to developing a single application as a suite of small services, each running in its own process and communicating with lightweight mechanisms (e.g., an HTTP resource API). In one embodiment, microservices are easier to replace relative to a monolithic service that performs all or many of the same functions. Moreover, each of the microservices may be updated without adversely affecting the other microservices. In contrast, updates to one portion of a monolithic service may undesirably or unintentionally negatively affect the other portions of the monolithic service. In one embodiment, microservices may be beneficially organized around their capabilities. In one embodiment, the startup time for each of a collection of microservices is much less than the startup time for a single application that collectively performs all the services of those microservices. In some embodiments, the startup time for each of such microservices is about one second or less, while the startup time of such single application may be about a minute, several minutes, or longer.

In one embodiment, microservices architecture refers to a specialization (i.e., separation of tasks within a system) and implementation approach for service oriented architectures ("SOAs") to build flexible, independently deployable software systems. Services in a microservices architecture are processes that communicate with each other over a network in order to fulfill a goal. In one embodiment, these services use technology-agnostic protocols. In one embodiment, the services have a small granularity and use lightweight protocols. In one embodiment, the services are independently deployable. By distributing functionalities of a system into different small services, the cohesion of the system is enhanced and the coupling of the system is decreased. This makes it easier to change the system and add functions and qualities to the system at any time. It also allows the architecture of an individual service to emerge through continuous refactoring, and hence reduces the need for a big up-front design and allows for releasing software early and continuously.

In one embodiment, in the microservices architecture, an application is developed as a collection of services, and each service runs a respective process and uses a lightweight protocol to communicate (e.g., a unique API for each microservice). In the microservices architecture, decomposition of a software into individual services/capabilities can be performed at different levels of granularity depending on the service to be provided. A service is a runtime component/process. Each microservice is a self-contained module that can talk to other modules/microservices. Each microservice has an unnamed universal port that can be contacted by others. In one embodiment, the unnamed universal port of a microservice is a standard communication channel that the microservice exposes by convention (e.g., as a conventional Hypertext Transfer Protocol ("HTTP") port) and that allows any other module/microservice within the same service to talk to it. A microservice or any other self-contained functional module can be generically referred to as a "service".

Embodiments provide multi-tenant identity management services. Embodiments are based on open standards to ensure ease of integration with various applications, delivering IAM capabilities through standards-based services.

Embodiments manage the lifecycle of user identities which entails the determination and enforcement of what an identity can access, who can be given such access, who can manage such access, etc. Embodiments run the identity management workload in the cloud and support security functionality for applications that are not necessarily in the cloud. The identity management services provided by the embodiments may be purchased from the cloud. For example, an enterprise may purchase such services from the cloud to manage their employees' access to their applications.

Embodiments provide system security, massive scalability, end user usability, and application interoperability. Embodiments address the growth of the cloud and the use of identity services by customers. The microservices based foundation addresses horizontal scalability requirements, while careful orchestration of the services addresses the functional requirements. Achieving both goals requires decomposition (wherever possible) of the business logic to achieve statelessness with eventual consistency, while much of the operational logic not subject to real-time processing is shifted to near-real-time by offloading to a highly scalable asynchronous event management system with guaranteed delivery and processing. Embodiments are fully multi-tenant from the web tier to the data tier in order to realize cost efficiencies and ease of system administration.

Embodiments are based on industry standards (e.g., OpenID Connect, OAuth2, Security Assertion Markup Language 2 ("SAML2"), System for Cross-domain Identity Management ("SCIM"), Representational State Transfer ("REST"), etc.) for ease of integration with various applications. One embodiment provides a cloud-scale API platform and implements horizontally scalable microservices for elastic scalability. The embodiment leverages cloud principles and provides a multi-tenant architecture with per-tenant data separation. The embodiment further provides per-tenant customization via tenant self-service. The embodiment is available via APIs for on-demand integration with other identity services, and provides continuous feature release.

One embodiment provides interoperability and leverages investments in identity management ("IDM") functionality in the cloud and on-premise. The embodiment provides automated identity synchronization from on-premise Lightweight Directory Access Protocol ("LDAP") data to cloud data and vice versa. The embodiment provides a SCIM identity bus between the cloud and the enterprise, and allows for different options for hybrid cloud deployments (e.g., identity federation and/or synchronization, SSO agents, user provisioning connectors, etc.).

Accordingly, one embodiment is a system that implements a number of microservices in a stateless middle tier to provide cloud-based multi-tenant identity and access management services. In one embodiment, each requested identity management service is broken into real-time and near-real-time tasks. The real-time tasks are handled by a microservice in the middle tier, while the near-real-time tasks are offloaded to a message queue. Embodiments implement tokens that are consumed by a routing tier to enforce a security model for accessing the microservices. Accordingly, embodiments provide a cloud-scale IAM platform based on a multi-tenant, microservices architecture.

Generally, known systems provide siloed access to applications provided by different environments, e.g., enterprise cloud applications, partner cloud applications, third-party cloud applications, and customer applications. Such siloed access may require multiple passwords, different password policies, different account provisioning and de-provisioning schemes, disparate audit, etc. However, one embodiment implements IDCS to provide unified IAM functionality over such applications. FIG. 1 is a block diagram 100 of an example embodiment with IDCS 118, providing a unified identity platform 126 for onboarding users and applications. The embodiment provides seamless user experience across various applications such as enterprise cloud applications 102, partner cloud applications 104, third-party cloud applications 110, and customer applications 112. Applications 102, 104, 110, 112 may be accessed through different channels, for example, by a mobile phone user 108, via a mobile phone 106, by a desktop computer user 116, via a browser 114, etc. A web browser (commonly referred to as a browser) is a software application for retrieving, presenting, and traversing information resources on the World Wide Web. Examples of web browsers are Mozilla Firefox®, Google Chrome®, Microsoft Internet Explorer®, and Apple Safari®.

IDCS 118 provides a unified view 124 of a user's applications, a unified secure credential across devices and applications (via identity platform 126), and a unified way of administration (via an admin console 122). IDCS services may be obtained by calling IDCS APIs 142. Such services may include, for example, login/SSO services 128 (e.g., OpenID Connect), federation services 130 (e.g., SAML), token services 132 (e.g., OAuth), directory services 134 (e.g., SCIM), provisioning services 136 (e.g., SCIM or Any Transport over Multiprotocol ("AToM")), event services 138 (e.g., REST), and role-based access control ("RBAC") services 140 (e.g., SCIM). IDCS 118 may further provide reports and dashboards 120 related to the offered services.

Integration Tools

Generally, it is common for large corporations to have an IAM system in place to secure access to their on-premise applications. Business practices are usually matured and standardized around an in-house IAM system such as "Oracle IAM Suite" from Oracle Corp. Even small to medium organizations usually have their business processes designed around managing user access through a simple directory solution such as Microsoft Active Directory ("AD"). To enable on-premise integration, embodiments provide tools that allow customers to integrate their applications with IDCS.

Figure 2:
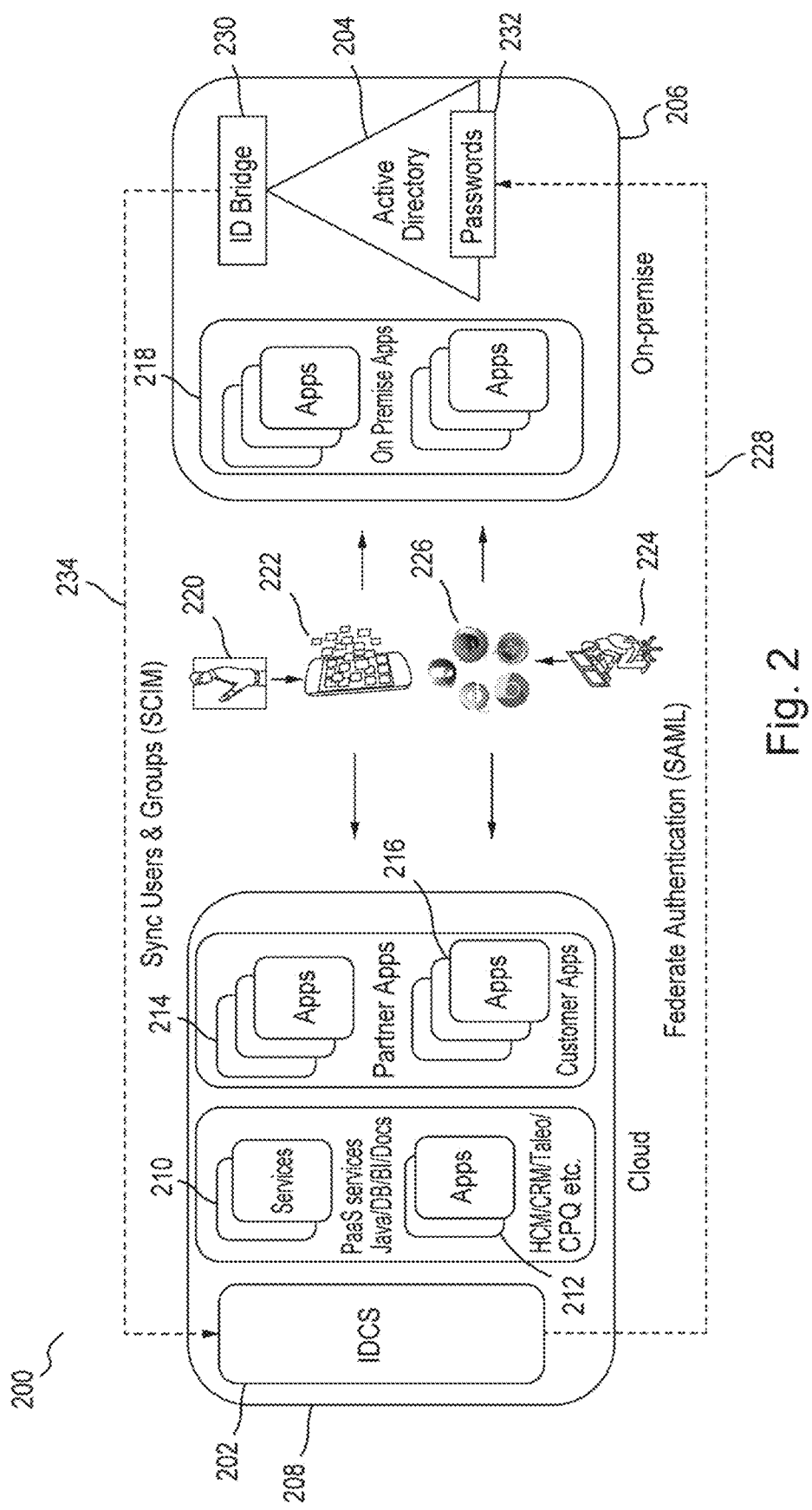

FIG. 2 is a block diagram 200 of an example embodiment with IDCS 202 in a cloud environment 208, providing integration with an AD 204 that is on-premise 206. The embodiment provides seamless user experience across all applications including on-premise and third-party applications, for example, on-premise applications 218 and various applications/services in cloud 208 such as cloud services 210, cloud applications 212, partner applications 214, and customer applications 216. Cloud applications 212 may include, for example, Human Capital Management ("HCM"), CRM, talent acquisition (e.g., Oracle Taleo cloud service from Oracle Corp.), Configure Price and Quote ("CPQ"), etc. Cloud services 210 may include, for example, Platform as a Service ("PaaS"), Java, database, business intelligence ("BI"), documents, etc.

Applications 210, 212, 214, 216, 218, may be accessed through different channels, for example, by a mobile phone user 220 via a mobile phone 222, by a desktop computer user 224 via a browser 226, etc. The embodiment provides automated identity synchronization from on-premise AD data to cloud data via a SCIM identity bus 234 between cloud 208 and the enterprise 206. The embodiment further provides a SAML bus 228 for federating authentication from cloud 208 to on-premise AD 204 (e.g., using passwords 232).

Generally, an identity bus is a service bus for identity related services. A service bus provides a platform for communicating messages from one system to another system. It is a controlled mechanism for exchanging information between trusted systems, for example, in a service oriented architecture ("SOA"). An identity bus is a logical bus built according to standard HTTP based mechanisms such as web service, web server proxies, etc. The communication in an identity bus may be performed according to a respective protocol (e.g., SCIM, SAML, OpenID Connect, etc.). For example, a SAML bus is an HTTP based connection between two systems for communicating messages for SAML services. Similarly, a SCIM bus is used to communicate SCIM messages according to the SCIM protocol.

The embodiment of FIG. 2 implements an identity ("ID") bridge 230 that is a small binary (e.g., 1 MB in size) that can be downloaded and installed on-premise 206 alongside a customer's AD 204. ID Bridge 230 listens to users and groups (e.g., groups of users) from the organizational units ("OUs") chosen by the customer and synchronizes those users to cloud 208. In one embodiment, users' passwords 232 are not synchronized to cloud 208. Customers can manage application access for users by mapping IDCS users' groups to cloud applications managed in IDCS 208. Whenever the users' group membership is changed on-premise 206, their corresponding cloud application access changes automatically.

For example, an employee moving from engineering to sales can get near instantaneous access to the sales cloud and lose access to the developer cloud. When this change is reflected in on-premise AD 204, cloud application access change is accomplished in near-real-time. Similarly, access to cloud applications managed in IDCS 208 is revoked for users leaving the company. For full automation, customers may set up SSO between on-premise AD 204 and IDCS 208 through, e.g., AD federation service ("AD/FS", or some other mechanism that implements SAML federation) so that end users can get access to cloud applications 210, 212, 214, 216, and on-premise applications 218 with a single corporate password 332.

Figure 3:
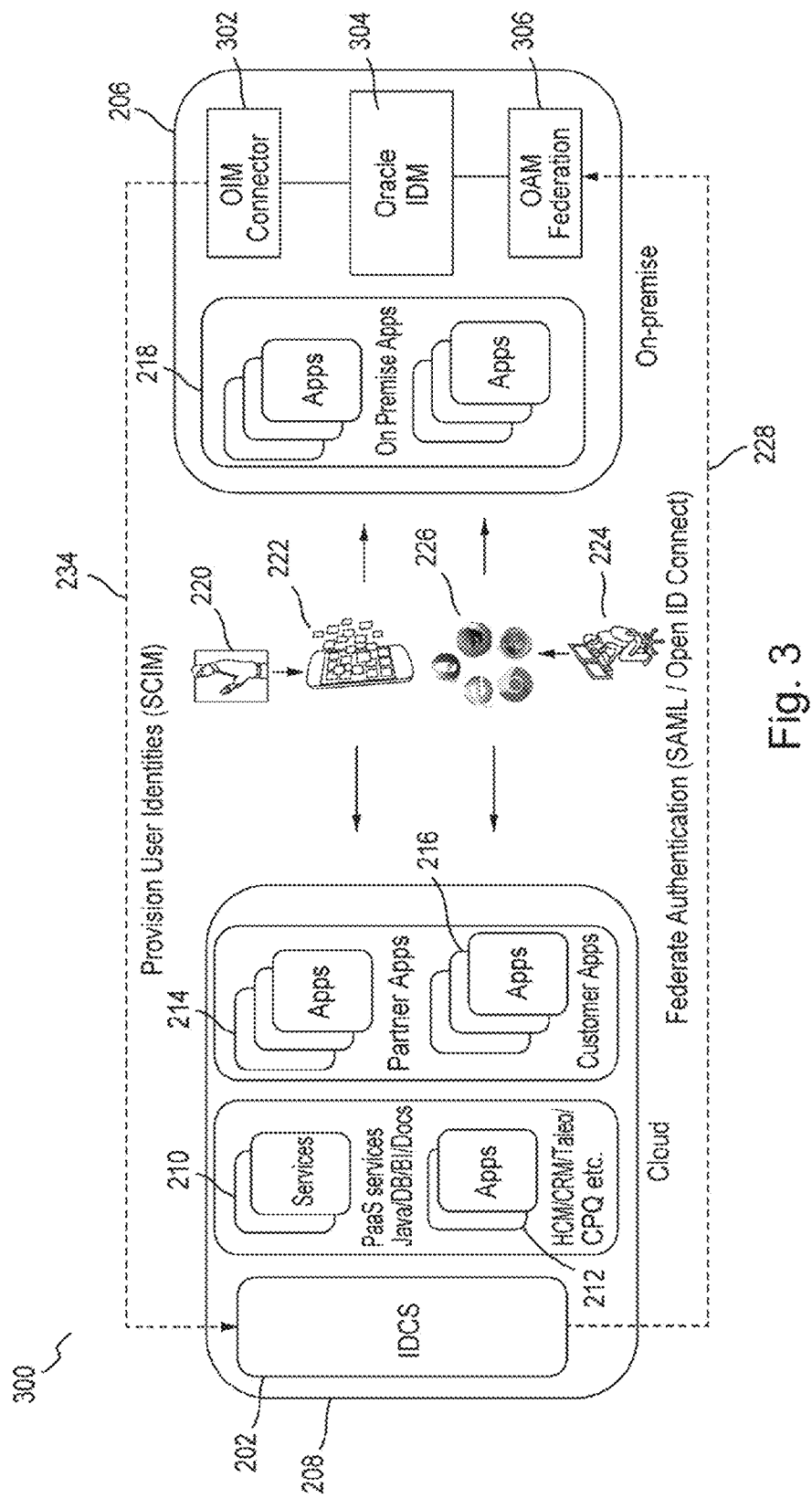

FIG. 3 is a block diagram 300 of an example embodiment that includes the same components 202, 206, 208, 210, 212, 214, 216, 218, 220, 222, 224, 226, 228, 234 as in FIG. 2. However, in the embodiment of FIG. 3, IDCS 202 provides integration with an on-premise IDM 304 such as Oracle IDM. Oracle IDM 304 is a software suite from Oracle Corp. for providing IAM functionality. The embodiment provides seamless user experience across all applications including on-premise and third-party applications. The embodiment provisions user identities from on-premise IDM 304 to IDCS 208 via SCIM identity bus 234 between cloud 202 and enterprise 206. The embodiment further provides SAML bus 228 (or an OpenID Connect bus) for federating authentication from cloud 208 to on-premise 206.

In the embodiment of FIG. 3, an Oracle Identity Manager ("OIM") Connector 302 from Oracle Corp., and an Oracle Access Manager ("OAM") federation module 306 from Oracle Corp., are implemented as extension modules of Oracle IDM 304. A connector is a module that has physical awareness about how to talk to a system. OIM is an application configured to manage user identities (e.g., manage user accounts in different systems based on what a user should and should not have access to). OAM is a security application that provides access management functionality such as web SSO; identity context, authentication and authorization; policy administration; testing; logging; auditing; etc. OAM has built-in support for SAML. If a user has an account in IDCS 202, OIM connector 302 and OAM federation 306 can be used with Oracle IDM 304 to create/delete that account and manage access from that account.

Figure 4:
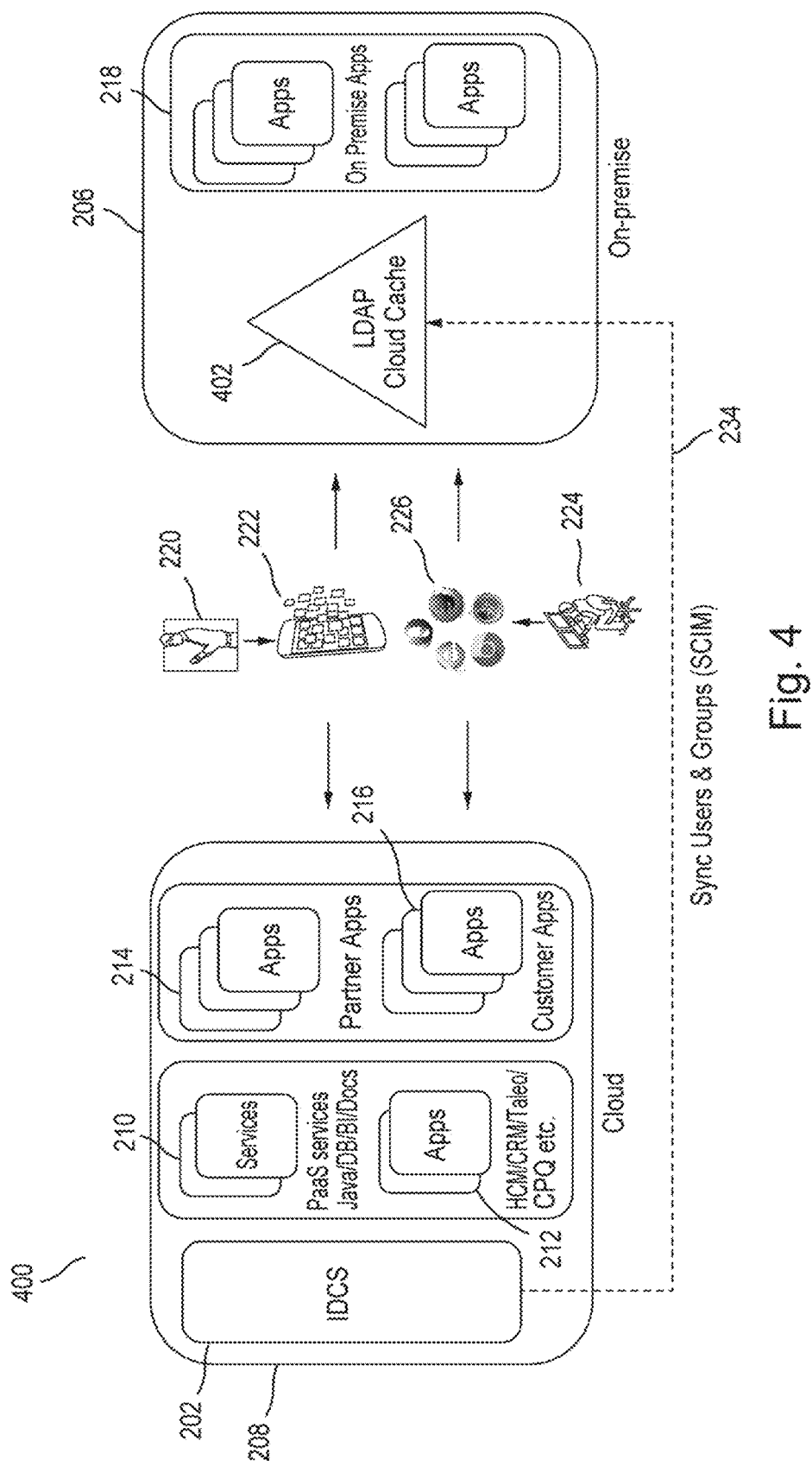

FIG. 4 is a block diagram 400 of an example embodiment that includes the same components 202, 206, 208, 210, 212, 214, 216, 218, 220, 222, 224, 226, 234 as in FIGS. 2 and 3. However, in the embodiment of FIG. 4, IDCS 202 provides functionality to extend cloud identities to on-premise applications 218. The embodiment provides seamless view of the identity across all applications including on-premise and third-party applications. In the embodiment of FIG. 4, SCIM identity bus 234 is used to synchronize data in IDCS 202 with on-premise LDAP data called "Cloud Cache" 402. Cloud Cache 402 is disclosed in more detail below.

Generally, an application that is configured to communicate based on LDAP needs an LDAP connection. An LDAP connection may not be established by such application through a URL (unlike, e.g., "www.google.com" that makes a connection to Google) since the LDAP needs to be on a local network. In the embodiment of FIG. 4, an LDAP-based application 218 makes a connection to Cloud Cache 402, and Cloud Cache 402 establishes a connection to IDCS 202 and then pulls data from IDCS 202 as it is being requested. The communication between IDCS 202 and Cloud Cache 402 may be implemented according to the SCIM protocol. For example, Cloud Cache 402 may use SCIM bus 234 to send a SCIM request to IDCS 202 and receive corresponding data in return.

Generally, fully implementing an application includes building a consumer portal, running marketing campaigns on the external user population, supporting web and mobile channels, and dealing with user authentication, sessions, user profiles, user groups, application roles, password policies, self-service/registration, social integration, identity federation, etc. Generally, application developers are not identity/security experts. Therefore, on-demand identity management services are desired.

Figure 5:
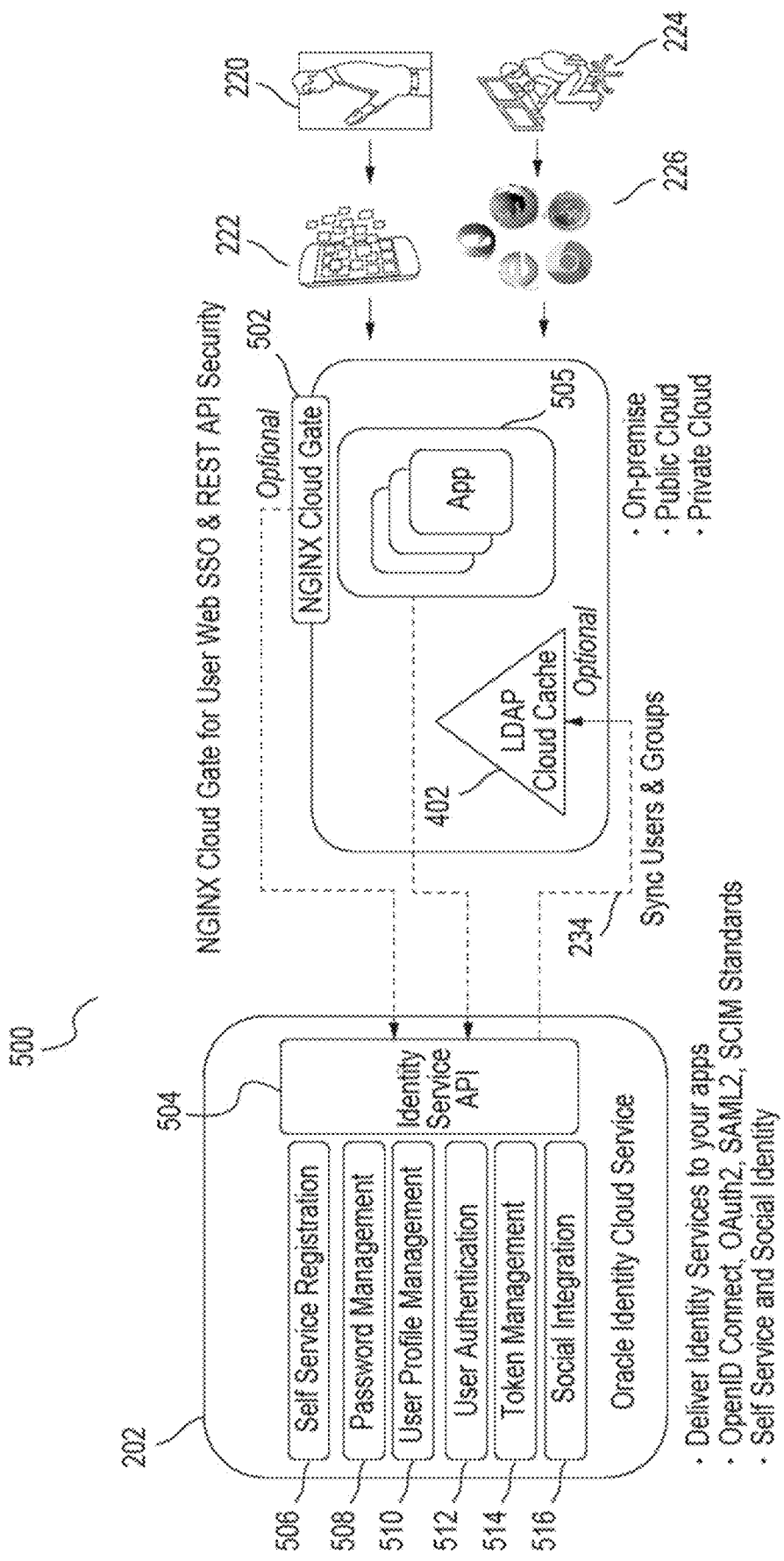

FIG. 5 is a block diagram 500 of an example embodiment that includes the same components 202, 220, 222, 224, 226, 234, 402, as in FIGS. 2-4. However, in the embodiment of FIG. 5, IDCS 202 provides secure identity management on demand. The embodiment provides on demand integration with identity services of IDCS 202 (e.g., based on standards such as OpenID Connect, OAuth2, SAML2, or SCIM). Applications 505 (which may be on-premise, in a public cloud, or in a private cloud) may call identity service APIs 504 in IDCS 202. The services provided by IDCS 202 may include, for example, self-service registration 506, password management 508, user profile management 510, user authentication 512, token management 514, social integration 516, etc.

In this embodiment, SCIM identity bus 234 is used to synchronize data in IDCS 202 with data in on-premise LDAP Cloud Cache 402. Further, a "Cloud Gate" 502 running on a web server/proxy (e.g., NGINX, Apache, etc.) may be used by applications 505 to obtain user web SSO and REST API security from IDCS 202. Cloud Gate 502 is a component that secures access to multi-tenant IDCS microservices by ensuring that client applications provide valid access tokens, and/or users successfully authenticate in order to establish SSO sessions. Cloud Gate 502 is further disclosed below. Cloud Gate 502 (enforcement point similar to webgate/webagent) enables applications running behind supported web servers to participate in SSO.

One embodiment provides SSO and cloud SSO functionality. A general point of entry for both on-premise IAM and IDCS in many organizations is SSO. Cloud SSO enables users to access multiple cloud resources with a single user sign-in. Often, organizations will want to federate their on-premise identities. Accordingly, embodiments utilize open standards to allow for integration with existing SSO to preserve and extend investment (e.g., until a complete, eventual transition to an identity cloud service approach is made).

One embodiment may provide the following functionalities:
    maintain an identity store to track user accounts, ownership, access, and permissions that have been authorized,
    integrate with workflow to facilitate various approvals (e.g., management, IT, human resources, legal, and compliance) needed for applications access,
    provision SaaS user accounts for selective devices (e.g., mobile and personal computer ("PC")) with access to user portal containing many private and public cloud resources, and
    facilitate periodic management attestation review for compliance with regulations and current job responsibilities.

In addition to these functions, embodiments may further provide:
    cloud account provisioning to manage account life cycle in cloud applications,
    more robust multifactor authentication ("MFA") integration,
    extensive mobile security capabilities, and
    dynamic authentication options.

One embodiment provides adaptive authentication and MFA. Generally, passwords and challenge questions have been seen as inadequate and susceptible to common attacks such as phishing. Most business entities today are looking at some form of MFA to reduce risk. To be successfully deployed, however, solutions need to be easily provisioned, maintained, and understood by the end user, as end users usually resist anything that interferes with their digital experience. Companies are looking for ways to securely incorporate bring your own device ("BYOD"), social identities, remote users, customers, and contractors, while making MFA an almost transparent component of a seamless user access experience. Within an MFA deployment, industry standards such as OAuth and OpenID Connect are essential to ensure integration of existing multifactor solutions and the incorporation of newer, adaptive authentication technology. Accordingly, embodiments define dynamic (or adaptive) authentication as the evaluation of available information (i.e., IP address, location, time of day, and biometrics) to prove an identity after a user session has been initiated. With the appropriate standards (e.g., open authentication ("OATH") and fast identity online ("FIDO")) integration and extensible identity management framework, embodiments provide MFA solutions that can be adopted, upgraded, and integrated easily within an IT organization as part of an end-to-end secure IAM deployment. When considering MFA and adaptive policies, organizations must implement consistent policies across on-premise and cloud resources, which in a hybrid IDCS and on-premise IAM environment requires integration between systems.

One embodiment provides user provisioning and certification. Generally, the fundamental function of an IAM solution is to enable and support the entire user provisioning life cycle. This includes providing users with the application access appropriate for their identity and role within the organization, certifying that they have the correct ongoing access permissions (e.g., as their role or the tasks or applications used within their role change over time), and promptly de-provisioning them as their departure from the organization may require. This is important not only for meeting various compliance requirements but also because inappropriate insider access is a major source of security breaches and attacks. An automated user provisioning capability within an identity cloud solution can be important not only in its own right but also as part of a hybrid IAM solution whereby IDCS provisioning may provide greater flexibility than an on-premise solution for transitions as a company downsizes, upsizes, merges, or looks to integrate existing systems with IaaS/PaaS/SaaS environments. An IDCS approach can save time and effort in one-off upgrades and ensure appropriate integration among necessary departments, divisions, and systems. The need to scale this technology often sneaks up on corporations, and the ability to deliver a scalable IDCS capability immediately across the enterprise can provide benefits in flexibility, cost, and control.

Generally, an employee is granted additional privileges (i.e., "privilege creep") over the years as her/his job changes. Companies that are lightly regulated generally lack an "attestation" process that requires managers to regularly audit their employees' privileges (e.g., access to networks, servers, applications, and data) to halt or slow the privilege creep that results in over-privileged accounts. Accordingly, one embodiment may provide a regularly conducted (at least once a year) attestation process. Further, with mergers and acquisitions, the need for these tools and services increases exponentially as users are on SaaS systems, on-premise, span different departments, and/or are being de-provisioned or re-allocated. The move to cloud can further confuse this situation, and things can quickly escalate beyond existing, often manually managed, certification methods. Accordingly, one embodiment automates these functions and applies sophisticated analytics to user profiles, access history, provisioning/de-provisioning, and fine-grained entitlements.

One embodiment provides identity analytics. Generally, the ability to integrate identity analytics with the IAM engine for comprehensive certification and attestation can be critical to securing an organization's risk profile. Properly deployed identity analytics can demand total internal policy enforcement. Identity analytics that provide a unified single management view across cloud and on-premise are much needed in a proactive governance, risk, and compliance ("GRC") enterprise environment, and can aid in providing a closed-loop process for reducing risk and meeting compliance regulations. Accordingly, one embodiment provides identity analytics that are easily customizable by the client to accommodate specific industry demands and government regulations for reports and analysis required by managers, executives, and auditors.

One embodiment provides self-service and access request functionality to improve the experience and efficiency of the end user and to reduce costs from help desk calls. Generally, while a number of companies deploy on-premise self-service access request for their employees, many have not extended these systems adequately outside the formal corporate walls. Beyond employee use, a positive digital customer experience increases business credibility and ultimately contributes to revenue increase, and companies not only save on customer help desk calls and costs but also improve customer satisfaction. Accordingly, one embodiment provides an identity cloud service environment that is based on open standards and seamlessly integrates with existing access control software and MFA mechanisms when necessary. The SaaS delivery model saves time and effort formerly devoted to systems upgrades and maintenance, freeing professional IT staff to focus on more core business applications.

One embodiment provides privileged account management ("PAM"). Generally, every organization, whether using SaaS, PaaS, IaaS, or on-premise applications, is vulnerable to unauthorized privileged account abuse by insiders with super-user access credentials such as system administrators, executives, HR officers, contractors, systems integrators, etc. Moreover, outside threats typically first breach a low-level user account to eventually reach and exploit privileged user access controls within the enterprise system. Accordingly, one embodiment provides PAM to prevent such unauthorized insider account use. The main component of a PAM solution is a password vault which may be delivered in various ways, e.g., as software to be installed on an enterprise server, as a virtual appliance also on an enterprise server, as a packaged hardware/software appliance, or as part of a cloud service. PAM functionality is similar to a physical safe used to store passwords kept in an envelope and changed periodically, with a manifest for signing them in and out. One embodiment allows for a password checkout as well as setting time limits, forcing periodic changes, automatically tracking checkout, and reporting on all activities. One embodiment provides a way to connect directly through to a requested resource without the user ever knowing the password. This capability also paves the way for session management and additional functionality.

Generally, most cloud services utilize APIs and administrative interfaces, which provide opportunities for infiltrators to circumvent security. Accordingly, one embodiment accounts for these holes in PAM practices as the move to the cloud presents new challenges for PAM. Many small to medium sized businesses now administer their own SaaS systems (e.g., Office 365), while larger companies increasingly have individual business units spinning up their own SaaS and IaaS services. These customers find themselves with PAM capabilities within the identity cloud service solutions or from their IaaS/PaaS provider but with little experience in handling this responsibility. Moreover, in some cases, many different geographically dispersed business units are trying to segregate administrative responsibilities for the same SaaS applications. Accordingly, one embodiment allows customers in these situations to link existing PAM into the overall identity framework of the identity cloud service and move toward greater security and compliance with the assurance of scaling to cloud load requirements as business needs dictate.

API Platform

Embodiments provide an API platform that exposes a collection of capabilities as services. The APIs are aggregated into microservices and each microservice exposes one or more of the APIs. That is, each microservice may expose different types of APIs. In one embodiment, each microservice communicates only through its APIs. In one embodiment, each API may be a microservice. In one embodiment, multiple APIs are aggregated into a service based on a target capability to be provided by that service (e.g., OAuth, SAML, Admin, etc.). As a result, similar APIs are not exposed as separate runtime processes. The APIs are what is made available to a service consumer to use the services provided by IDCS.

Generally, in the web environment of IDCS, a URL includes three parts: a host, a microservice, and a resource (e.g., host/microservice/resource). In one embodiment, the microservice is characterized by having a specific URL prefix, e.g., "host/oauth/v1" where the actual microservice is "oauth/v1", and under "oauth/v1" there are multiple APIs, e.g., an API to request tokens: "host/oauth/v1/token", an API to authenticate a user: "host/oauth/v1/authorize", etc. That is, the URL implements a microservice, and the resource portion of the URL implements an API. Accordingly, multiple APIs are aggregated under the same microservice. In one embodiment, the host portion of the URL identifies a tenant (e.g., https://tenant3.identity.oraclecloud.com:/oauth/v1/token").

Configuring applications that integrate with external services with the necessary endpoints and keeping that configuration up to date is typically a challenge. To meet this challenge, embodiments expose a public discovery API at a well-known location from where applications can discover the information about IDCS they need in order to consume IDCS APIs. In one embodiment, two discovery documents are supported: IDCS Configuration (which includes IDCS, SAML, SCIM, OAuth, and OpenID Connect configuration, at e.g., <IDCS-URL>/.well-known/idcs-configuration), and Industry-standard OpenID Connect Configuration (at, e.g., <IDCS-URL>/.well-known/openid-configuration). Applications can retrieve discovery documents by being configured with a single IDCS URL.

Figure 6:
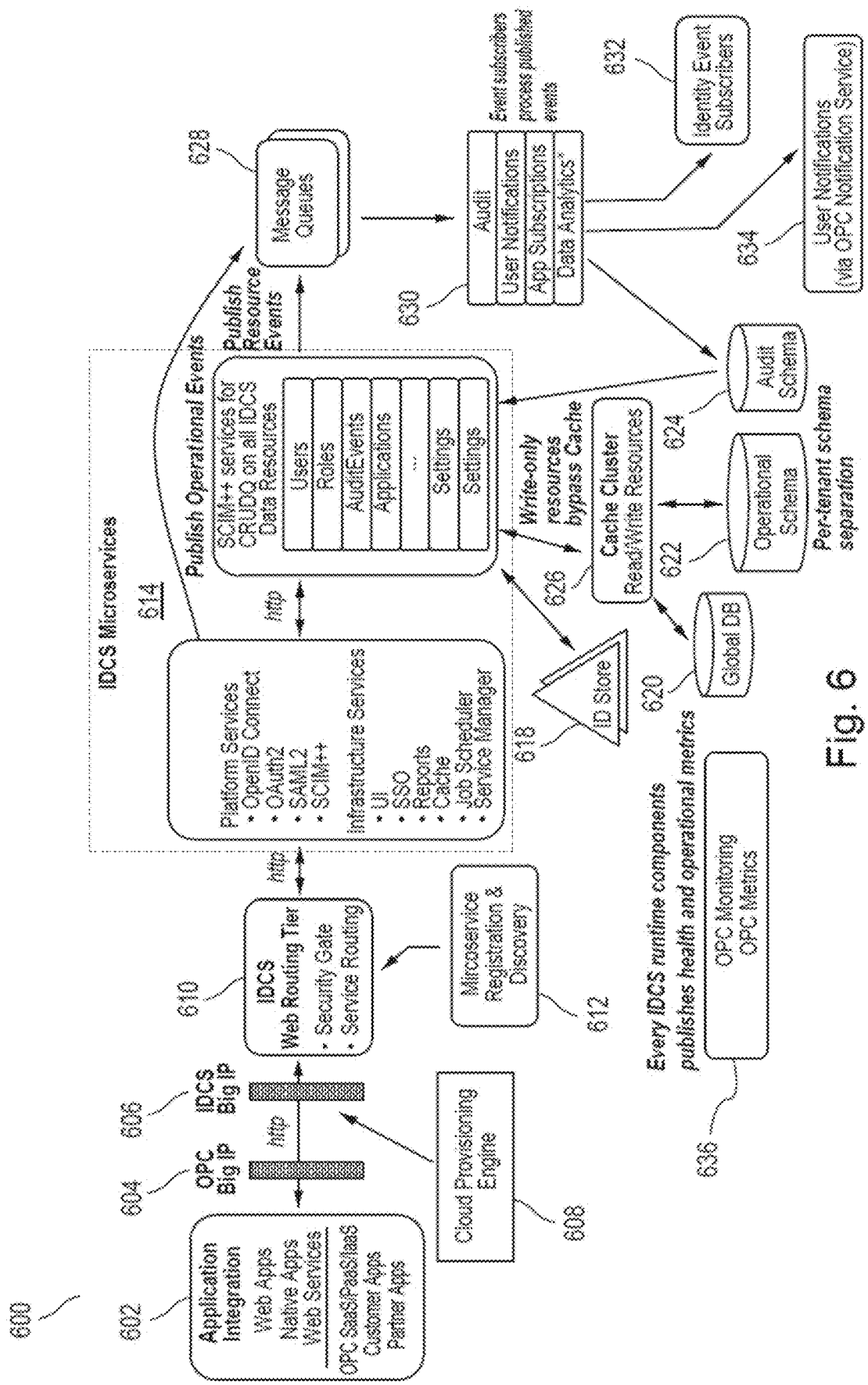
FIG. 6 is a block diagram providing a system view of an embodiment.

FIG. 6 is a block diagram providing a system view 600 of IDCS in one embodiment. In FIG. 6, any one of a variety of applications/services 602 may make HTTP calls to IDCS APIs to use IDCS services. Examples of such applications/services 602 are web applications, native applications (e.g., applications that are built to run on a specific operating system, such as Windows applications, iOS applications, Android applications, etc.), web services, customer applications, partner applications, or any services provided by a public cloud, such as Software as a Service ("SaaS"), PaaS, and Infrastructure as a Service ("IaaS").

In one embodiment, the HTTP requests of applications/services 602 that require IDCS services go through an Oracle Public Cloud BIG-IP appliance 604 and an IDCS BIG-IP appliance 606 (or similar technologies such as a Load Balancer, or a component called a Cloud Load Balancer as a Service ("LBaaS") that implements appropriate security rules to protect the traffic). However, the requests can be received in any manner. At IDCS BIG-IP appliance 606 (or, as applicable, a similar technology such as a Load Balancer or a Cloud LBaaS), a cloud provisioning engine 608 performs tenant and service orchestration. In one embodiment, cloud provisioning engine 608 manages internal security artifacts associated with a new tenant being on-boarded into the cloud or a new service instance purchased by a customer.

The HTTP requests are then received by an IDCS web routing tier 610 that implements a security gate (i.e., Cloud Gate) and provides service routing and microservices registration and discovery 612. Depending on the service requested, the HTTP request is forwarded to an IDCS microservice in the IDCS middle tier 614. IDCS microservices process external and internal HTTP requests. IDCS microservices implement platform services and infrastructure services. IDCS platform services are separately deployed Java-based runtime services implementing the business of IDCS. IDCS infrastructure services are separately deployed runtime services providing infrastructure support for IDCS. IDCS further includes infrastructure libraries that are common code packaged as shared libraries used by IDCS services and shared libraries. Infrastructure services and libraries provide supporting capabilities as required by platform services for implementing their functionality.

Platform Services

In one embodiment, IDCS supports standard authentication protocols, hence IDCS microservices include platform services such as OpenID Connect, OAuth, SAML2, System for Cross-domain Identity Management++ ("SCIM++"), etc.

The OpenID Connect platform service implements standard OpenID Connect Login/Logout flows. Interactive web-based and native applications leverage standard browser-based OpenID Connect flow to request user authentication, receiving standard identity tokens that are JavaScript Object Notation ("JSON") Web Tokens ("JWTs") conveying the user's authenticated identity. Internally, the runtime authentication model is stateless, maintaining the user's authentication/session state in the form of a host HTTP cookie (including the JWT identity token). The authentication interaction initiated via the OpenID Connect protocol is delegated to a trusted SSO service that implements the user login/logout ceremonies for local and federated logins. Further details of this functionality are disclosed below with reference to FIGS. 10 and 11. In one embodiment, OpenID Connect functionality is implemented according to, for example, OpenID Foundation standards.

The OAuth2 platform service provides token authorization services. It provides a rich API infrastructure for creating and validating access tokens conveying user rights to make API calls. It supports a range of useful token grant types, enabling customers to securely connect clients to their services. It implements standard 2-legged and 3-legged OAuth2 token grant types. Support for OpenID Connect ("OIDC") enables compliant applications (OIDC relaying parties ("RP"s)) to integrate with IDCS as the identity provider (OIDC OpenID provider ("OP")). Similarly, the integration of IDCS as OIDC RP with social OIDC OP (e.g., Facebook, Google, etc.) enables customers to allow social identities policy-based access to applications. In one embodiment, OAuth functionality is implemented according to, for example, Internet Engineering Task Force ("IETF"), Request for Comments ("RFC") 6749.

The SAML2 platform service provides identity federation services. It enables customers to set up federation agreements with their partners based on SAML identity provider ("IDP") and SAML service provider ("SP") relationship models. In one embodiment, the SAML2 platform service implements standard SAML2 Browser POST Login and Logout Profiles. In one embodiment, SAML functionality is implemented according to, for example, IETF, RFC 7522.

SCIM is an open standard for automating the exchange of user identity information between identity domains or information technology ("IT") systems, as provided by, e.g., IETF, RFCs 7642, 7643, 7644. The SCIM++ platform service provides identity administration services and enables customers to access IDP features of IDCS. The administration services expose a set of stateless REST interfaces (i.e., APIs) that cover identity lifecycle, password management, group management, etc., exposing such artifacts as web-accessible resources.

All IDCS configuration artifacts are resources, and the APIs of the administration services allow for managing IDCS resources (e.g., users, roles, password policies, applications, SAML/OIDC identity providers, SAML service providers, keys, certifications, notification templates, etc.). Administration services leverage and extend the SCIM standard to implement schema-based REST APIs for Create, Read, Update, Delete, and Query ("CRUDQ") operations on all IDCS resources. Additionally, all internal resources of IDCS used for administration and configuration of IDCS itself are exposed as SCIM-based REST APIs. Access to the identity store 618 is isolated to the SCIM++ API.

In one embodiment, for example, the SCIM standard is implemented to manage the users and groups resources as defined by the SCIM specifications, while SCIM++ is configured to support additional IDCS internal resources (e.g., password policies, roles, settings, etc.) using the language defined by the SCIM standard.

The Administration service supports the SCIM 2.0 standard endpoints with the standard SCIM 2.0 core schemas and schema extensions where needed. In addition, the Administration service supports several SCIM 2.0 compliant endpoint extensions to manage other IDCS resources, for example, Users, Groups, Applications, Settings, etc. The Administration service also supports a set of remote procedure call-style ("RPC-style") REST interfaces that do not perform CRUDQ operations but instead provide a functional service, for example, "UserPasswordGenerator," "UserPasswordValidator," etc.

IDCS Administration APIs use the OAuth2 protocol for authentication and authorization. IDCS supports common OAuth2 scenarios such as scenarios for web server, mobile, and JavaScript applications. Access to IDCS APIs is protected by access tokens. To access IDCS Administration APIs, an application needs to be registered as an OAuth2 client or an IDCS Application (in which case the OAuth2 client is created automatically) through the IDCS Administration console and be granted desired IDCS Administration Roles. When making IDCS Administration API calls, the application first requests an access token from the IDCS OAuth2 Service. After acquiring the token, the application sends the access token to the IDCS API by including it in the HTTP authorization header. Applications can use IDCS Administration REST APIs directly, or use an IDCS Java Client API Library.

Infrastructure Services

The IDCS infrastructure services support the functionality of IDCS platform services. These runtime services include an event processing service (for asynchronously processing user notifications, application subscriptions, and auditing to database); a job scheduler service (for scheduling and executing jobs, e.g., executing immediately or at a configured time long-running tasks that do not require user intervention); a cache management service; a storage management service (for integrating with a public cloud storage service); a reports service (for generating reports and dashboards); an SSO service (for managing internal user authentication and SSO); a user interface ("UI") service (for hosting different types of UI clients); and a service manager service. Service manager is an internal interface between the Oracle Public Cloud and IDCS. Service manager manages commands issued by the Oracle Public Cloud, where the commands need to be implemented by IDCS. For example, when a customer signs up for an account in a cloud store before they can buy something, the cloud sends a request to IDCS asking to create a tenant. In this case, service manager implements the cloud specific operations that the cloud expects IDCS to support.

An IDCS microservice may call another IDCS microservice through a network interface (i.e., an HTTP request).

In one embodiment, IDCS may also provide a schema service (or a persistence service) that allows for using a database schema. A schema service allows for delegating the responsibility of managing database schemas to IDCS. Accordingly, a user of IDCS does not need to manage a database since there is an IDCS service that provides that functionality. For example, the user may use the database to persist schemas on a per tenant basis, and when there is no more space in the database, the schema service will manage the functionality of obtaining another database and growing the space so that the users do not have to manage the database themselves.

IDCS further includes data stores which are data repositories required/generated by IDCS, including an identity store 618 (storing users, groups, etc.), a global database 620 (storing configuration data used by IDCS to configure itself), an operational schema 622 (providing per tenant schema separation and storing customer data on a per customer basis), an audit schema 624 (storing audit data), a caching cluster 626 (storing cached objects to speed up performance), etc. All internal and external IDCS consumers integrate with the identity services over standards-based protocols. This enables use of a domain name system ("DNS") to resolve where to route requests, and decouples consuming applications from understanding the internal implementation of identity services.

Real-Time and Near Real-Time Tasks

IDCS separates the tasks of a requested service into synchronous real-time and asynchronous near-real-time tasks, where real-time tasks include only the operations that are needed for the user to proceed. In one embodiment, a real-time task is a task that is performed with minimal delay, and a near-real-time task is a task that is performed in the background without the user having to wait for it. In one embodiment, a real-time task is a task that is performed with substantially no delay or with negligible delay, and appears to a user as being performed almost instantaneously.

The real-time tasks perform the main business functionality of a specific identity service. For example, when requesting a login service, an application sends a message to authenticate a user's credentials and get a session cookie in return. What the user experiences is logging into the system. However, several other tasks may be performed in connection with the user's logging in, such as validating who the user is, auditing, sending notifications, etc. Accordingly, validating the credentials is a task that is performed in real-time so that the user is given an HTTP cookie to start a session, but the tasks related to notifications (e.g., sending an email to notify the creation of an account), audits (e.g., tracking/recording), etc., are near-real-time tasks that can be performed asynchronously so that the user can proceed with least delay.

When an HTTP request for a microservice is received, the corresponding real-time tasks are performed by the microservice in the middle tier, and the remaining near-real-time tasks such as operational logic/events that are not necessarily subject to real-time processing are offloaded to message queues 628 that support a highly scalable asynchronous event management system 630 with guaranteed delivery and processing. Accordingly, certain behaviors are pushed from the front end to the backend to enable IDCS to provide high level service to the customers by reducing latencies in response times. For example, a login process may include validation of credentials, submission of a log report, updating of the last login time, etc., but these tasks can be offloaded to a message queue and performed in near-real-time as opposed to real-time.

In one example, a system may need to register or create a new user. The system calls an IDCS SCIM API to create a user. The end result is that when the user is created in identity store 618, the user gets a notification email including a link to reset their password. When IDCS receives a request to register or create a new user, the corresponding microservice looks at configuration data in the operational database (located in global database 620 in FIG. 6) and determines that the "create user" operation is marked with a "create user" event which is identified in the configuration data as an asynchronous operation. The microservice returns to the client and indicates that the creation of the user is done successfully, but the actual sending of the notification email is postponed and pushed to the backend. In order to do so, the microservice uses a messaging API 616 to queue the message in queue 628 which is a store.

In order to dequeue queue 628, a messaging microservice, which is an infrastructure microservice, continually runs in the background and scans queue 628 looking for events in queue 628. The events in queue 628 are processed by event subscribers 630 such as audit, user notification, application subscriptions, data analytics, etc. Depending on the task indicated by an event, event subscribers 630 may communicate with, for example, audit schema 624, a user notification service 634, an identity event subscriber 632, etc. For example, when the messaging microservice finds the "create user" event in queue 628, it executes the corresponding notification logic and sends the corresponding email to the user.

In one embodiment, queue 628 queues operational events published by microservices 614 as well as resource events published by APIs 616 that manage IDCS resources.

IDCS uses a real-time caching structure to enhance system performance and user experience. The cache itself may also be provided as a microservice. IDCS implements an elastic cache cluster 626 that grows as the number of customers supported by IDCS scales. Cache cluster 626 may be implemented with a distributed data grid which is disclosed in more detail below. In one embodiment, write-only resources bypass cache.

In one embodiment, IDCS runtime components publish health and operational metrics to a public cloud monitoring module 636 that collects such metrics of a public cloud such as Oracle Public Cloud from Oracle Corp.

In one embodiment, IDCS may be used to create a user. For example, a client application 602 may issue a REST API call to create a user. Admin service (a platform service in 614) delegates the call to a user manager (an infrastructure library/service in 614), which in turn creates the user in the tenant-specific ID store stripe in ID store 618. On "User Create Success", the user manager audits the operation to the audit table in audit schema 624, and publishes an "identity.user.create.success" event to message queue 628. Identity subscriber 632 picks up the event and sends a "Welcome" email to the newly created user, including newly created login details.

In one embodiment, IDCS may be used to grant a role to a user, resulting in a user provisioning action. For example, a client application 602 may issue a REST API call to grant a user a role. Admin service (a platform service in 614) delegates the call to a role manager (an infrastructure library/service in 614), who grants the user a role in the tenant-specific ID store stripe in ID store 618. On "Role Grant Success", the role manager audits the operations to the audit table in audit schema 624, and publishes an "identity.user.role.grant.success" event to message queue 628. Identity subscriber 632 picks up the event and evaluates the provisioning grant policy. If there is an active application grant on the role being granted, a provisioning subscriber performs some validation, initiates account creation, calls out the target system, creates an account on the target system, and marks the account creation as successful. Each of these functionalities may result in publishing of corresponding events, such as "prov.account.create.initiate", "prov.target.create.initiate", "prov.target.create.success", or "prov.account.create.success". These events may have their own business metrics aggregating number of accounts created in the target system over the last N days.

In one embodiment, IDCS may be used for a user to log in. For example, a client application 602 may use one of the supported authentication flows to request a login for a user. IDCS authenticates the user, and upon success, audits the operation to the audit table in audit schema 624. Upon failure, IDCS audits the failure in audit schema 624, and publishes "login.user.login.failure" event in message queue 628. A login subscriber picks up the event, updates its metrics for the user, and determines if additional analytics on the user's access history need to be performed.

Accordingly, by implementing "inversion of control" functionality (e.g., changing the flow of execution to schedule the execution of an operation at a later time so that the operation is under the control of another system), embodiments enable additional event queues and subscribers to be added dynamically to test new features on a small user sample before deploying to broader user base, or to process specific events for specific internal or external customers.

Stateless Functionality

IDCS microservices are stateless, meaning the microservices themselves do not maintain state. "State" refers to the data that an application uses in order to perform its capabilities. IDCS provides multi-tenant functionality by persisting all state into tenant specific repositories in the IDCS data tier. The middle tier (i.e., the code that processes the requests) does not have data stored in the same location as the application code. Accordingly, IDCS is highly scalable, both horizontally and vertically.

To scale vertically (or scale up/down) means to add resources to (or remove resources from) a single node in a system, typically involving the addition of CPUs or memory to a single computer. Vertical scalability allows an application to scale up to the limits of its hardware. To scale horizontally (or scale out/in) means to add more nodes to (or remove nodes from) a system, such as adding a new computer to a distributed software application. Horizontal scalability allows an application to scale almost infinitely, bound only by the amount of bandwidth provided by the network.

Stateless-ness of the middle tier of IDCS makes it horizontally scalable just by adding more CPUs, and the IDCS components that perform the work of the application do not need to have a designated physical infrastructure where a particular application is running. Stateless-ness of the IDCS middle tier makes IDCS highly available, even when providing identity services to a very large number of customers/tenants. Each pass through an IDCS application/service is focused on CPU usage only to perform the application transaction itself but not use hardware to store data. Scaling is accomplished by adding more slices when the application is running, while data for the transaction is stored at a persistence layer where more copies can be added when needed.

The IDCS web tier, middle tier, and data tier can each scale independently and separately. The web tier can be scaled to handle more HTTP requests. The middle tier can be scaled to support more service functionality. The data tier can be scaled to support more tenants.

IDCS Functional View

Figure 6A:
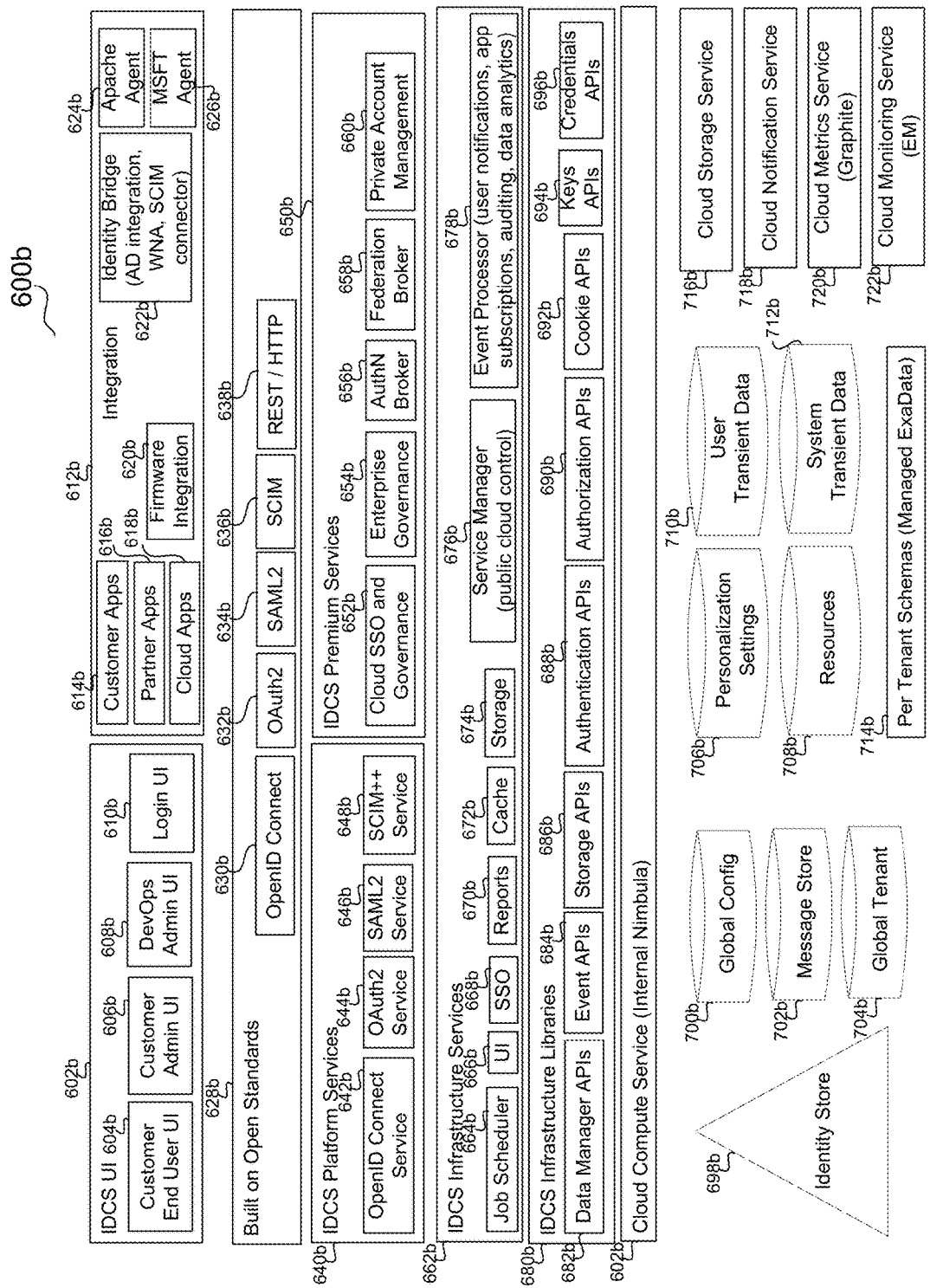
FIG. 6A is a block diagram providing a functional view of an embodiment.

FIG. 6A is an example block diagram 600b of a functional view of IDCS in one embodiment. In block diagram 600b, the IDCS functional stack includes services, shared libraries, and data stores. The services include IDCS platform services 640b, IDCS premium services 650b, and IDCS infrastructure services 662b. In one embodiment, IDCS platform services 640b and IDCS premium services 650b are separately deployed Java-based runtime services implementing the business of IDCS, and IDCS infrastructure services 662b are separately deployed runtime services providing infrastructure support for IDCS. The shared libraries include IDCS infrastructure libraries 680b which are common code packaged as shared libraries used by IDCS services and shared libraries. The data stores are data repositories required/generated by IDCS, including identity store 698b, global configuration 700b, message store 702b, global tenant 704b, personalization settings 706b, resources 708b, user transient data 710b, system transient data 712b, per-tenant schemas (managed ExaData) 714b, operational store (not shown), caching store (not shown), etc.

In one embodiment, IDCS platform services 640b include, for example, OpenID Connect service 642b, OAuth2 service 644b, SAML2 service 646b, and SCIM++ service 648b. In one embodiment, IDCS premium services include, for example, cloud SSO and governance 652b, enterprise governance 654b, AuthN broker 656b, federation broker 658b, and private account management 660b.

IDCS infrastructure services 662b and IDCS infrastructure libraries 680b provide supporting capabilities as required by IDCS platform services 640b to do their work. In one embodiment, IDCS infrastructure services 662b include job scheduler 664b, UI 666b, SSO 668b, reports 670b, cache 672b, storage 674b, service manager 676b (public cloud control), and event processor 678b (user notifications, app subscriptions, auditing, data analytics). In one embodiment, IDCS infrastructure libraries 680b include data manager APIs 682b, event APIs 684b, storage APIs 686b, authentication APIs 688b, authorization APIs 690b, cookie APIs 692b, keys APIs 694b, and credentials APIs 696b. In one embodiment, cloud compute service 602b (internal Nimbula) supports the function of IDCS infrastructure services 662b and IDCS infrastructure libraries 680b.

In one embodiment, IDCS provides various UIs 602b for a consumer of IDCS services, such as customer end user UI 604b, customer admin UI 606b, DevOps admin UI 608b, and login UI 610b. In one embodiment, IDCS allows for integration 612b of applications (e.g., customer apps 614b, partner apps 616b, and cloud apps 618b) and firmware integration 620b. In one embodiment, various environments may integrate with IDCS to support their access control needs. Such integration may be provided by, for example, identity bridge 622b (providing AD integration, WNA, and SCIM connector), Apache agent 624b, or MSFT agent 626b.

In one embodiment, internal and external IDCS consumers integrate with the identity services of IDCS over standards-based protocols 628b, such as OpenID Connect 630b, OAuth2 632b, SAML2 634b, SCIM 636b, and REST/HTTP 638b. This enables use of a domain name system ("DNS") to resolve where to route requests, and decouples the consuming applications from understanding internal implementation of the identity services.

The IDCS functional view in FIG. 6A further includes public cloud infrastructure services that provide common functionality that IDCS depends on for user notifications (cloud notification service 718b), file storage (cloud storage service 716b), and metrics/alerting for DevOps (cloud monitoring service (EM) 722b and cloud metrics service (Graphite) 720b).

Cloud Gate

In one embodiment, IDCS implements a "Cloud Gate" in the web tier. Cloud Gate is a web server plugin that enables web applications to externalize user SSO to an identity management system (e.g., IDCS), similar to WebGate or WebAgent technologies that work with enterprise IDM stacks. Cloud Gate acts as a security gatekeeper that secures access to IDCS APIs. In one embodiment, Cloud Gate is implemented by a web/proxy server plugin that provides a web Policy Enforcement Point ("PEP") for protecting HTTP resources based on OAuth.

Figure 7:
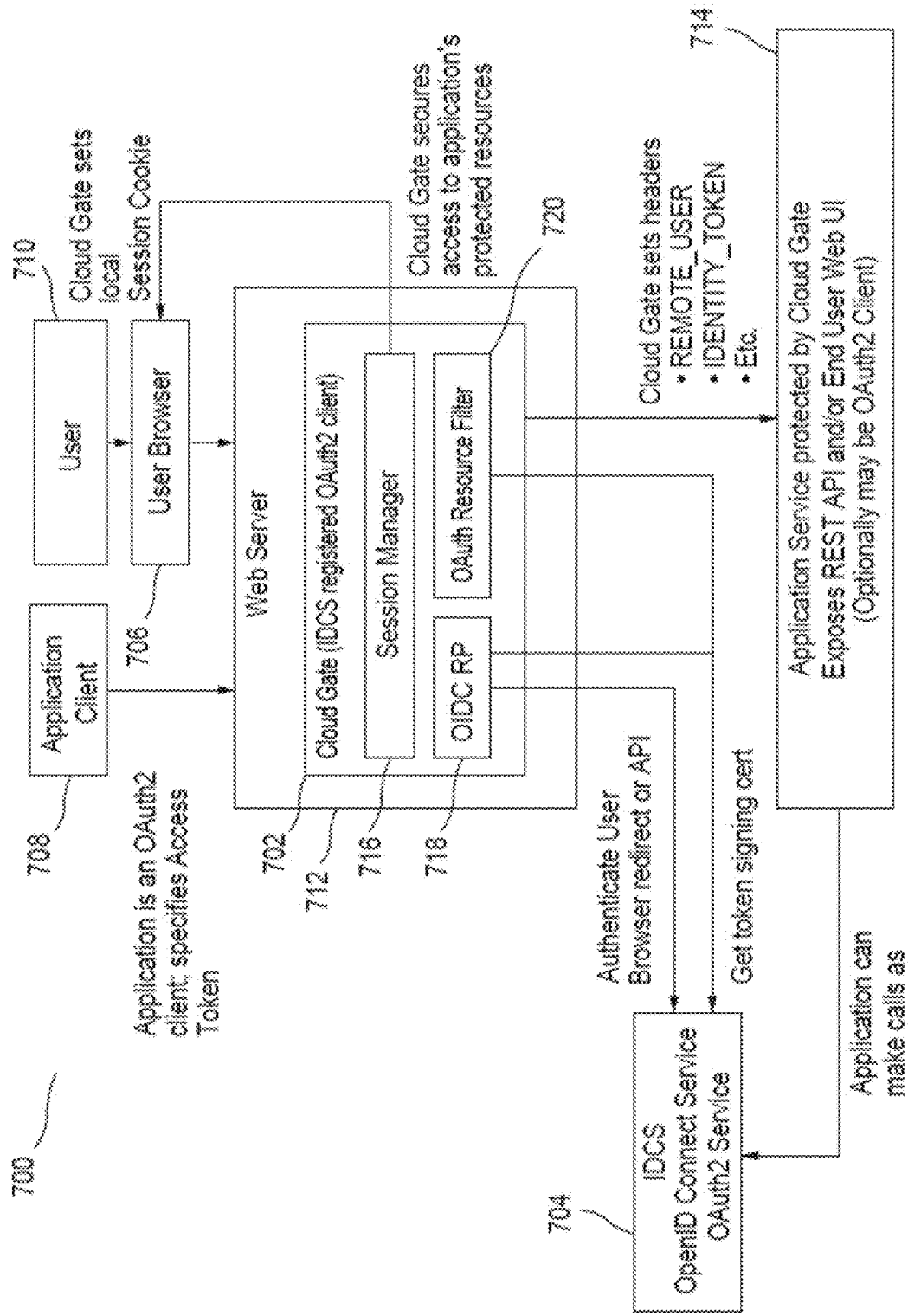
FIG. 7 is a block diagram of an embodiment that implements Cloud Gate.

FIG. 7 is a block diagram 700 of an embodiment that implements a Cloud Gate 702 running in a web server 712 and acting as a Policy Enforcement Point ("PEP") configured to integrate with IDCS Policy Decision Point ("PDP") using open standards (e.g., OAuth2, OpenID Connect, etc.) while securing access to web browser and REST API resources 714 of an application. In some embodiments, the PDP is implemented at OAuth and/or OpenID Connect microservices 704. For example, when a user browser 706 sends a request to IDCS for a login of a user 710, a corresponding IDCS PDP validates the credentials and then decides whether the credentials are sufficient (e.g., whether to request for further credentials such as a second password). In the embodiment of FIG. 7, Cloud Gate 702 may act both as the PEP and as the PDP since it has a local policy.

As part of one-time deployment, Cloud Gate 702 is registered with IDCS as an OAuth2 client, enabling it to request OIDC and OAuth2 operations against IDCS. Thereafter, it maintains configuration information about an application's protected and unprotected resources, subject to request matching rules (how to match URLs, e.g., with wild cards, regular expressions, etc.). Cloud Gate 702 can be deployed to protect different applications having different security policies, and the protected applications can be multi-tenant.

During web browser-based user access, Cloud Gate 702 acts as an OIDC RP 718 initiating a user authentication flow. If user 710 has no valid local user session, Cloud Gate 702 re-directs the user to the SSO microservice and participates in the OIDC "Authorization Code" flow with the SSO microservice. The flow concludes with the delivery of a JWT as an identity token. Cloud Gate 708 validates the JWT (e.g., looks at signature, expiration, destination/audience, etc.) and issues a local session cookie for user 710. It acts as a session manager 716 securing web browser access to protected resources and issuing, updating, and validating the local session cookie. It also provides a logout URL for removal of its local session cookie.

Cloud Gate 702 also acts as an HTTP Basic Auth authenticator, validating HTTP Basic Auth credentials against IDCS. This behavior is supported in both session-less and session-based (local session cookie) modes. No server-side IDCS session is created in this case.

During programmatic access by REST API clients 708, Cloud Gate 702 may act as an OAuth2 resource server/filter 720 for an application's protected REST APIs 714. It checks for the presence of a request with an authorization header and an access token. When client 708 (e.g., mobile, web apps, JavaScript, etc.) presents an access token (issued by IDCS) to use with a protected REST API 714, Cloud Gate 702 validates the access token before allowing access to the API (e.g., signature, expiration, audience, etc.). The original access token is passed along unmodified.

Generally, OAuth is used to generate either a client identity propagation token (e.g., indicating who the client is) or a user identity propagation token (e.g., indicating who the user is). In the embodiments, the implementation of OAuth in Cloud Gate is based on a JWT which defines a format for web tokens, as provided by, e.g., IETF, RFC 7519.

When a user logs in, a JWT is issued. The JWT is signed by IDCS and supports multi-tenant functionality in IDCS. Cloud Gate validates the JWT issued by IDCS to allow for multi-tenant functionality in IDCS. Accordingly, IDCS provides multi-tenancy in the physical structure as well as in the logical business process that underpins the security model.

Tenancy Types

IDCS specifies three types of tenancies: customer tenancy, client tenancy, and user tenancy. Customer or resource tenancy specifies who the customer of IDCS is (i.e., for whom is the work being performed). Client tenancy specifies which client application is trying to access data (i.e., what application is doing the work). User tenancy specifies which user is using the application to access data (i.e., by whom is the work being performed). For example, when a professional services company provides system integration functionality for a warehouse club and uses IDCS for providing identity management for the warehouse club systems, user tenancy corresponds to the professional services company, client tenancy is the application that is used to provide system integration functionality, and customer tenancy is the warehouse club.

Separation and identification of these three tenancies enables multi-tenant functionality in a cloud-based service. Generally, for on-premise software that is installed on a physical machine on-premise, there is no need to specify three different tenancies since a user needs to be physically on the machine to log in. However, in a cloud-based service structure, embodiments use tokens to determine who is using what application to access which resources. The three tenancies are codified by tokens, enforced by Cloud Gate, and used by the business services in the middle tier. In one embodiment, an OAuth server generates the tokens. In various embodiments, the tokens may be used in conjunction with any security protocol other than OAuth.

Decoupling user, client, and resource tenancies provides substantial business advantages for the users of the services provided by IDCS. For example, it allows a service provider that understands the needs of a business (e.g., a healthcare business) and their identity management problems to buy services provided by IDCS, develop their own backend application that consumes the services of IDCS, and provide the backend applications to the target businesses. Accordingly, the service provider may extend the services of IDCS to provide their desired capabilities and offer those to certain target businesses. The service provider does not have to build and run software to provide identity services but can instead extend and customize the services of IDCS to suit the needs of the target businesses.

Some known systems only account for a single tenancy which is customer tenancy. However, such systems are inadequate when dealing with access by a combination of users such as customer users, customer's partners, customer's clients, clients themselves, or clients that customer has delegated access to. Defining and enforcing multiple tenancies in the embodiments facilitates the identity management functionality over such variety of users.

In one embodiment, one entity of IDCS does not belong to multiple tenants at the same time; it belongs to only one tenant, and a "tenancy" is where artifacts live. Generally, there are multiple components that implement certain functions, and these components can belong to tenants or they can belong to infrastructure. When infrastructure needs to act on behalf of tenants, it interacts with an entity service on behalf of the tenant. In that case, infrastructure itself has its own tenancy and customer has its own tenancy. When a request is submitted, there can be multiple tenancies involved in the request.

For example, a client that belongs to "tenant 1 " may execute a request to get a token for "tenant 2 " specifying a user in "tenant 3. " As another example, a user living in "tenant 1 " may need to perform an action in an application owned by "tenant 2 ". Thus, the user needs to go to the resource namespace of "tenant 2 " and request a token for themselves. Accordingly, delegation of authority is accomplished by identifying "who" can do "what" to "whom." As yet another example, a first user working for a first organization ("tenant 1 ") may allow a second user working for a second organization ("tenant 2 ") to have access to a document hosted by a third organization ("tenant 3 ").

In one example, a client in "tenant 1 " may request an access token for a user in "tenant 2 " to access an application in "tenant 3 ". The client may do so by invoking an OAuth request for the token by going to "http://tenant3/oauth/token". The client identifies itself as a client that lives in "tenant 1 " by including a "client assertion" in the request. The client assertion includes a client ID (e.g., "client 1 ") and the client tenancy "tenant 1 ". As "client 1 " in "tenant 1 ", the client has the right to invoke a request for a token on "tenant 3 ", and the client wants the token for a user in "tenant 2 ". Accordingly, a "user assertion" is also passed as part of the same HTTP request. The access token that is generated will be issued in the context of the target tenancy which is the application tenancy ("tenant 3 ") and will include the user tenancy ("tenant 2 ").

Figure 8:
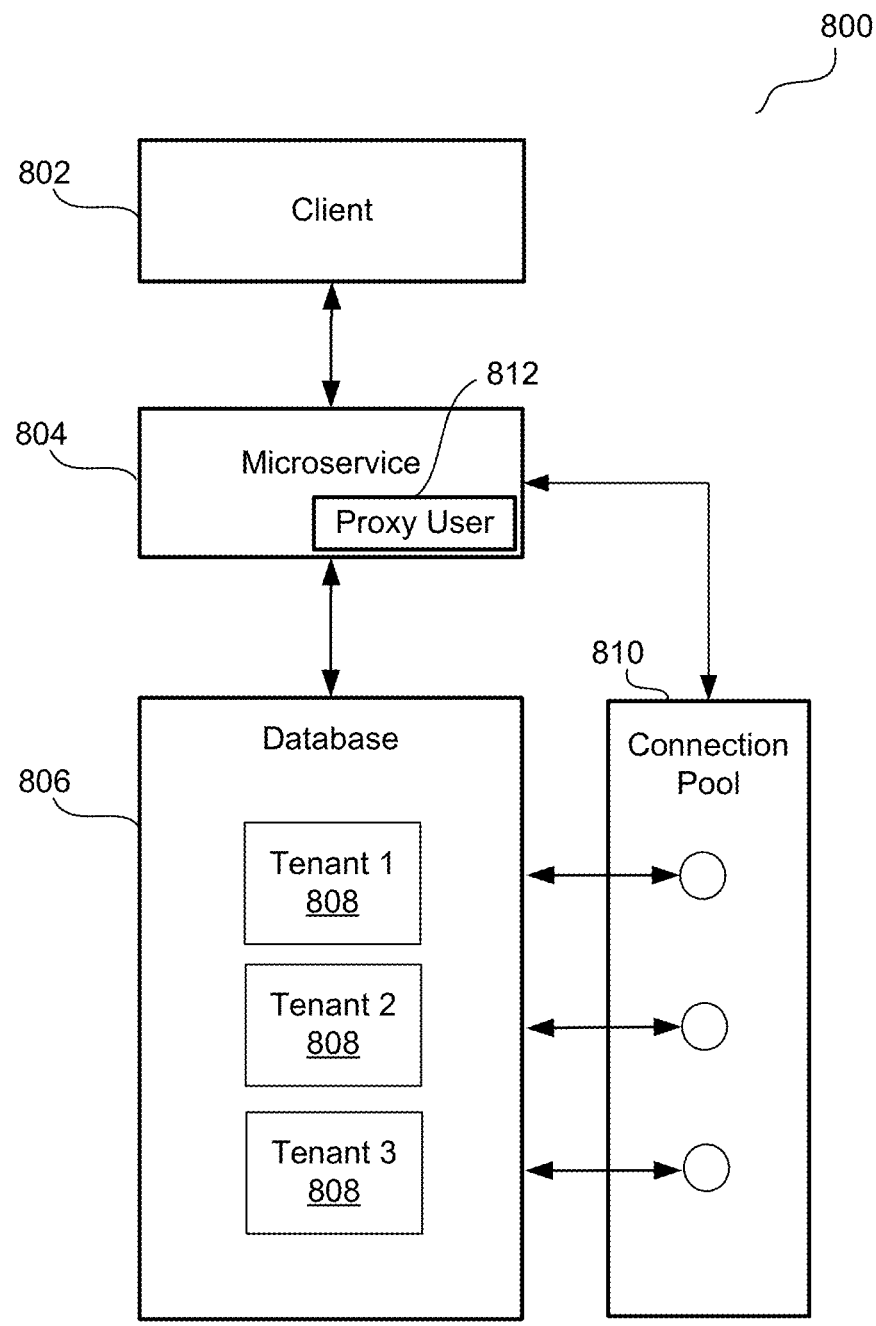
FIG. 8 illustrates an example system that implements multiple tenancies in one embodiment.

In one embodiment, in the data tier, each tenant is implemented as a separate stripe. From a data management perspective, artifacts live in a tenant. From a service perspective, a service knows how to work with different tenants, and the multiple tenancies are different dimensions in the business function of a service. FIG. 8 illustrates an example system 800 implementing multiple tenancies in an embodiment. System 800 includes a client 802 that requests a service provided by a microservice 804 that understands how to work with data in a database 806. The database includes multiple tenants 808 and each tenant includes the artifacts of the corresponding tenancy. In one embodiment, microservice 804 is an OAuth microservice requested through https://tenant3/oauth/token for getting a token. The function of the OAuth microservice is performed in microservice 804 using data from database 806 to verify that the request of client 802 is legitimate, and if it is legitimate, use the data from different tenancies 808 to construct the token. Accordingly, system 800 is multi-tenant in that it can work in a cross-tenant environment by not only supporting services coming into each tenancy, but also supporting services that can act on behalf of different tenants.

System 800 is advantageous since microservice 804 is physically decoupled from the data in database 806, and by replicating the data across locations that are closer to the client, microservice 804 can be provided as a local service to the clients and system 800 can manage the availability of the service and provide it globally.

In one embodiment, microservice 804 is stateless, meaning that the machine that runs microservice 804 does not maintain any markers pointing the service to any specific tenants. Instead, a tenancy may be marked, for example, on the host portion of a URL of a request that comes in. That tenancy points to one of tenants 808 in database 806. When supporting a large number of tenants (e.g., millions of tenants), microservice 804 cannot have the same number of connections to database 806, but instead uses a connection pool 810 which provides the actual physical connections to database 806 in the context of a database user.

Generally, connections are built by supplying an underlying driver or provider with a connection string, which is used to address a specific database or server and to provide instance and user authentication credentials (e.g., "Server=sql_box;Database=Common;User ID=uid; Pwd=password;"). Once a connection has been built, it can be opened and closed, and properties (e.g., the command time-out length, or transaction, if one exists) can be set. The connection string includes a set of key-value pairs, dictated by the data access interface of the data provider. A connection pool is a cache of database connections maintained so that the connections can be reused when future requests to a database are required. In connection pooling, after a connection is created, it is placed in the pool and it is used again so that a new connection does not have to be established. For example, when there needs to be ten connections between microservice 804 and database 808, there will be ten open connections in connection pool 810, all in the context of a database user (e.g., in association with a specific database user, e.g., who is the owner of that connection, whose credentials are being validated, is it a database user, is it a system credential, etc.).

The connections in connection pool 810 are created for a system user that can access anything. Therefore, in order to correctly handle auditing and privileges by microservice 804 processing requests on behalf of a tenant, the database operation is performed in the context of a "proxy user" 812 associated with the schema owner assigned to the specific tenant. This schema owner can access only the tenancy that the schema was created for, and the value of the tenancy is the value of the schema owner. When a request is made for data in database 806, microservice 804 uses the connections in connection pool 810 to provide that data. Accordingly, multi-tenancy is achieved by having stateless, elastic middle tier services process incoming requests in the context of (e.g., in association with) the tenant-specific data store binding established on a per request basis on top of the data connection created in the context of (e.g., in association with) the data store proxy user associated with the resource tenancy, and the database can scale independently of the services.

The following provides an example functionality for implementing proxy user 812:

```
dbOperation = <prepare DB command to execute>
dbConnection = getDBConnectionFromPool( )
dbConnection.setProxyUser (resourceTenant)
    result = dbConnection.executeOperation (dbOperation)
```

In this functionality, microservice 804 sets the "Proxy User" setting on the connection pulled from connection pool 810 to the "Tenant," and performs the database operation in the context of the tenant while using the database connection in connection pool 810.

When striping every table to configure different columns in a same database for different tenants, one table may include all tenants' data mixed together. In contrast, one embodiment provides a tenant-driven data tier. The embodiment does not stripe the same database for different tenants, but instead provides a different physical database per tenant. For example, multi-tenancy may be implemented by using a pluggable database (e.g., Oracle Database 12c from Oracle Corp.) where each tenant is allocated a separate partition. At the data tier, a resource manager processes the request and then asks for the data source for the request (separate from metadata). The embodiment performs runtime switch to a respective data source/store per request. By isolating each tenant's data from the other tenants, the embodiment provides improved data security.

In one embodiment, various tokens codify different tenancies. A URL token may identify the tenancy of the application that requests a service. An identity token may codify the identity of a user that is to be authenticated. An access token may identify multiple tenancies. For example, an access token may codify the tenancy that is the target of such access (e.g., an application tenancy) as well as the user tenancy of the user that is given access. A client assertion token may identify a client ID and the client tenancy. A user-assertion token may identify the user and the user tenancy.

In one embodiment, an identity token includes at least a claim indicating the user tenant name (i.e., where the user lives).

In one embodiment, an access token includes at least a claim indicating the resource tenant name at the time the request for the access token was made (e.g., the customer), a claim indicating the user tenant name, a claim indicating the name of the OAuth client making the request, and a claim indicating the client tenant name. In one embodiment, an access token may be implemented according to the following JSON functionality:

```
{
    ...
    " tok_type " : "AT",
    "user_id" : "testuser",
    "user_tenantname" : "<value-of-identity-tenant>"
    "tenant" : "<value-of-resource-tenant>"
    "client_id" : "testclient",
    "client_tenantname": "<value-of-client-tenant>"
    ...
}
```

In one embodiment, a client assertion token includes at least a claim indicating the client tenant name, and a claim indicating the name of the OAuth client making the request.

The tokens and/or multiple tenancies described herein may be implemented in any multi-tenant cloud-based service other than IDCS. For example, the tokens and/or multiple tenancies described herein may be implemented in SaaS or Enterprise Resource Planning ("ERP") services.

Figure 9:
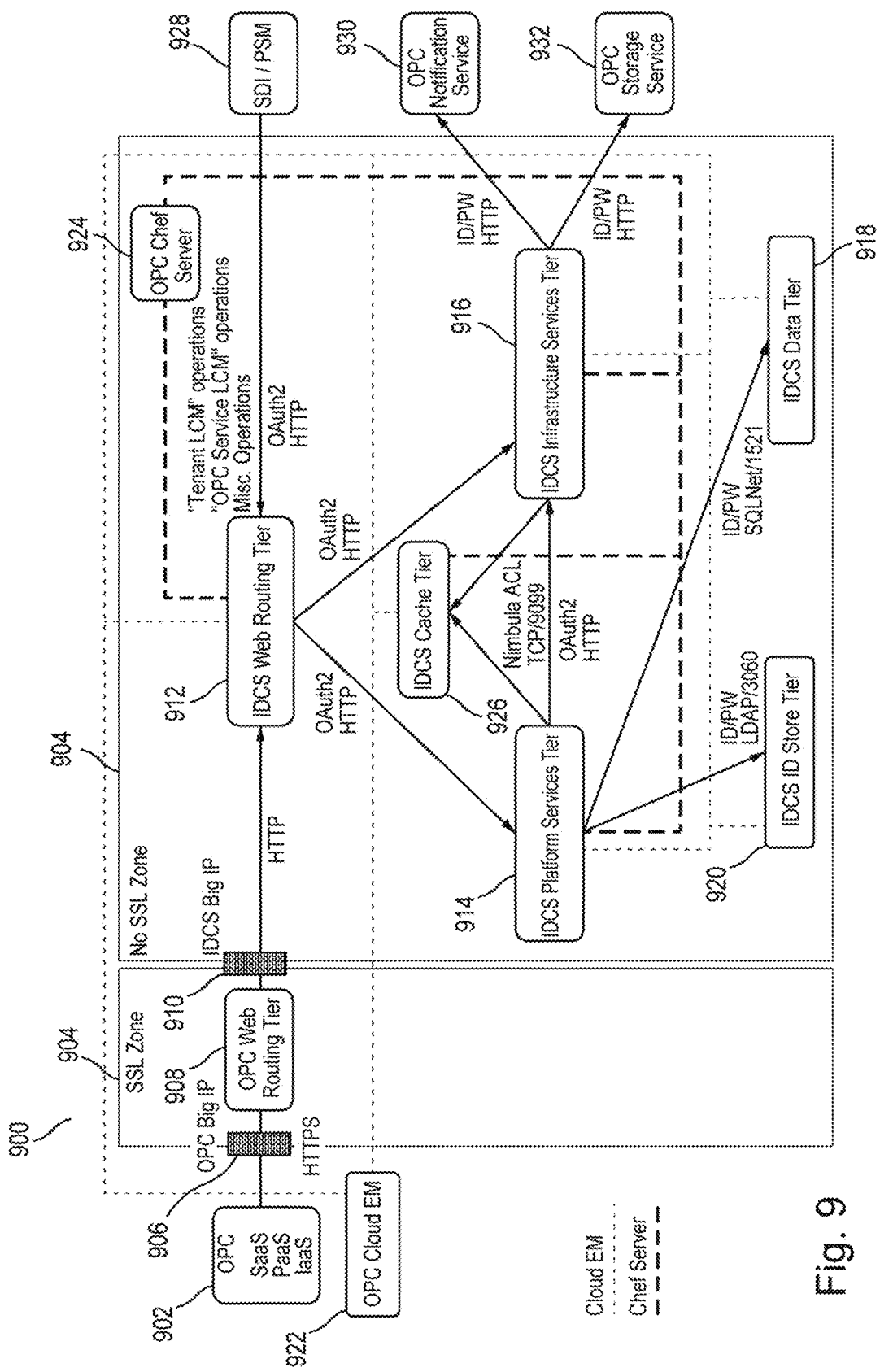
FIG. 9 is a block diagram of a network view of an embodiment.

FIG. 9 is a block diagram of a network view 900 of IDCS in one embodiment. FIG. 9 illustrates network interactions that are performed in one embodiment between application "zones" 904. Applications are broken into zones based on the required level of protection and the implementation of connections to various other systems (e.g., SSL zone, no SSL zone, etc.). Some application zones provide services that require access from the inside of IDCS, while some application zones provide services that require access from the outside of IDCS, and some are open access. Accordingly, a respective level of protection is enforced for each zone.

In the embodiment of FIG. 9, service to service communication is performed using HTTP requests. In one embodiment, IDCS uses the access tokens described herein not only to provide services but also to secure access to and within IDCS itself. In one embodiment, IDCS microservices are exposed through RESTful interfaces and secured by the tokens described herein.

In the embodiment of FIG. 9, any one of a variety of applications/services 902 may make HTTP calls to IDCS APIs to use IDCS services. In one embodiment, the HTTP requests of applications/services 902 go through an Oracle Public Cloud Load Balancing External Virtual IP address ("VIP") 906 (or other similar technologies), a public cloud web routing tier 908, and an IDCS Load Balancing Internal VIP appliance 910 (or other similar technologies), to be received by IDCS web routing tier 912. IDCS web routing tier 912 receives the requests coming in from the outside or from the inside of IDCS and routes them across either an IDCS platform services tier 914 or an IDCS infrastructure services tier 916. IDCS platform services tier 914 includes IDCS microservices that are invoked from the outside of IDCS, such as OpenID Connect, OAuth, SAML, SCIM, etc. IDCS infrastructure services tier 916 includes supporting microservices that are invoked from the inside of IDCS to support the functionality of other IDCS microservices. Examples of IDCS infrastructure microservices are UI, SSO, reports, cache, job scheduler, service manager, functionality for making keys, etc. An IDCS cache tier 926 supports caching functionality for IDCS platform services tier 914 and IDCS infrastructure services tier 916.

By enforcing security both for outside access to IDCS and within IDCS, customers of IDCS can be provided with outstanding security compliance for the applications they run.

In the embodiment of FIG. 9, other than the data tier 918 which communicates based on Structured Query Language ("SQL") and the ID store tier 920 that communicates based on LDAP, OAuth protocol is used to protect the communication among IDCS components (e.g., microservices) within IDCS, and the same tokens that are used for securing access from the outside of IDCS are also used for security within IDCS. That is, web routing tier 912 uses the same tokens and protocols for processing the requests it receives regardless of whether a request is received from the outside of IDCS or from the inside of IDCS. Accordingly, IDCS provides a single consistent security model for protecting the entire system, thereby allowing for outstanding security compliance since the fewer security models implemented in a system, the more secure the system is.

In the IDCS cloud environment, applications communicate by making network calls. The network call may be based on an applicable network protocol such as HTTP, Transmission Control Protocol ("TCP"), User Datagram Protocol ("UDP"), etc. For example, an application "X" may communicate with an application "Y" based on HTTP by exposing application "Y" as an HTTP Uniform Resource Locator ("URL"). In one embodiment, "Y" is an IDCS microservice that exposes a number of resources each corresponding to a capability. When "X" (e.g., another IDCS microservice) needs to call "Y", it constructs a URL that includes "Y" and the resource/capability that needs to be invoked (e.g., https:/host/Y/resource), and makes a corresponding REST call which goes through web routing tier 912 and gets directed to "Y".

In one embodiment, a caller outside the IDCS may not need to know where "Y" is, but web routing tier 912 needs to know where application "Y" is running. In one embodiment, IDCS implements discovery functionality (implemented by an API of OAuth service) to determine where each application is running so that there is no need for the availability of static routing information.

In one embodiment, an enterprise manager ("EM") 922 provides a "single pane of glass" that extends on-premise and cloud-based management to IDCS. In one embodiment, a "Chef" server 924 which is a configuration management tool from Chef Software, Inc., provides configuration management functionality for various IDCS tiers. In one embodiment, a service deployment infrastructure and/or a persistent stored module 928 may send OAuth2 HTTP messages to IDCS web routing tier 912 for tenant lifecycle management operations, public cloud lifecycle management operations, or other operations. In one embodiment, IDCS infrastructure services tier 916 may send ID/password HTTP messages to a public cloud notification service 930 or a public cloud storage service 932.

Cloud Access Control—SSO

One embodiment supports lightweight cloud standards for implementing a cloud scale SSO service. Examples of lightweight cloud standards are HTTP, REST, and any standard that provides access through a browser (since a web browser is lightweight). On the contrary, SOAP is an example of a heavy cloud standard which requires more management, configuration, and tooling to build a client with. The embodiment uses OpenID Connect semantics for applications to request user authentication against IDCS. The embodiment uses lightweight HTTP cookie-based user session tracking to track user's active sessions at IDCS without statefull server-side session support. The embodiment uses JWT-based identity tokens for applications to use in mapping an authenticated identity back to their own local session. The embodiment supports integration with federated identity management systems, and exposes SAML IDP support for enterprise deployments to request user authentication against IDCS.

Figure 10:
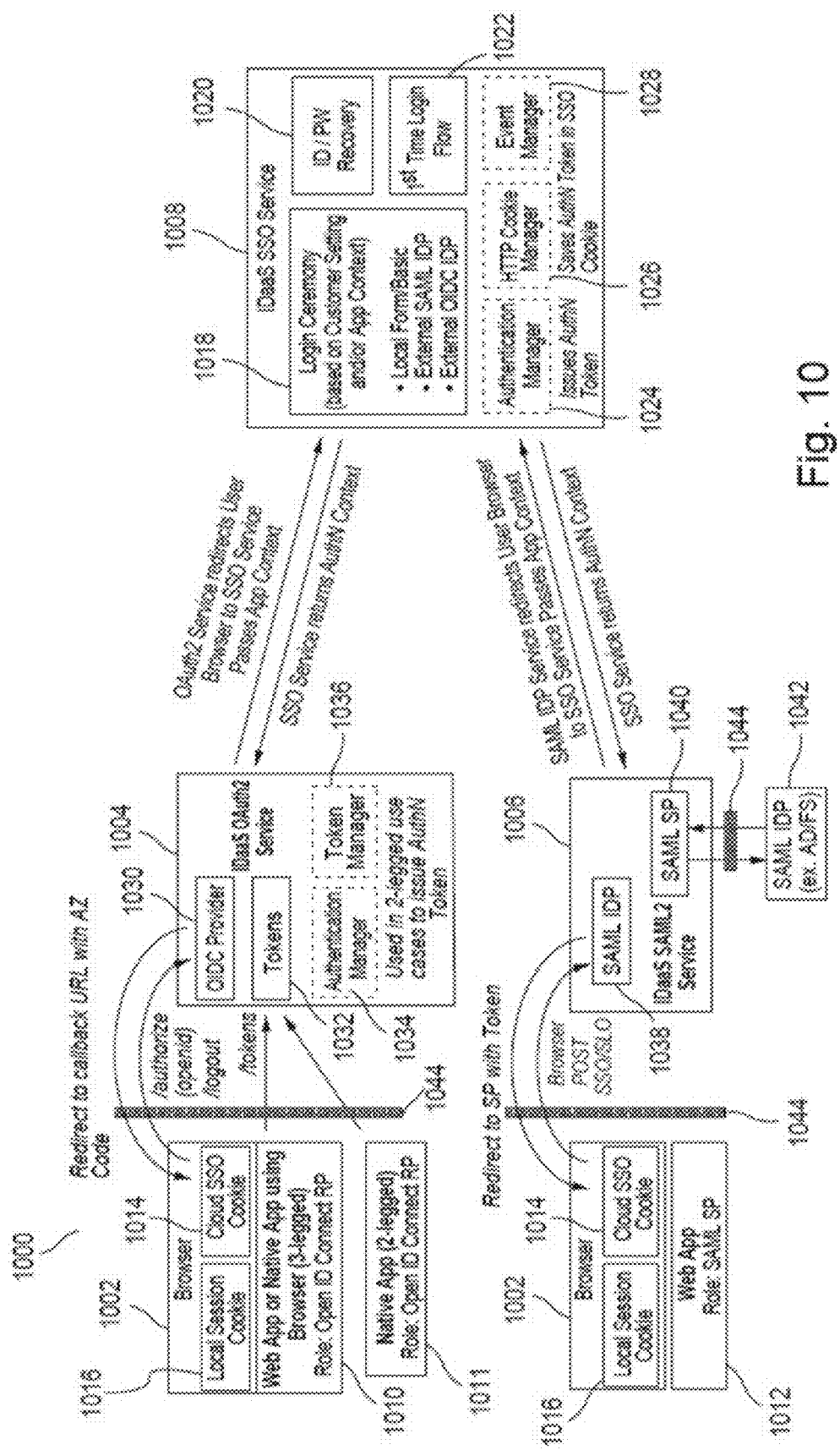
FIG. 10 is a block diagram of a system architecture view of single sign on ("SSO") functionality in one embodiment.

FIG. 10 is a block diagram 1000 of a system architecture view of SSO functionality in IDCS in one embodiment. The embodiment enables client applications to leverage standards-based web protocols to initiate user authentication flows. Applications requiring SSO integration with a cloud system may be located in enterprise data centers, in remote partner data centers, or even operated by a customer on-premise. In one embodiment, different IDCS platform services implement the business of SSO, such as OpenID Connect for processing login/logout requests from connected native applications (i.e., applications utilizing OpenID Connect to integrate with IDCS); SAML IDP service for processing browser-based login/logout requests from connected applications; SAML SP service for orchestrating user authentication against an external SAML IDP; and an internal IDCS SSO service for orchestrating end user login ceremony including local or federated login flows, and for managing IDCS host session cookie. Generally, HTTP works either with a form or without a form. When it works with a form, the form is seen within a browser. When it works without a form, it functions as a client to server communication. Both OpenID Connect and SAML require the ability to render a form, which may be accomplished by presence of a browser or virtually performed by an application that acts as if there is a browser. In one embodiment, an application client implementing user authentication/SSO through IDCS needs to be registered in IDCS as an OAuth2 client and needs to obtain client identifier and credentials (e.g., ID/password, ID/certificate, etc.).

The example embodiment of FIG. 10 includes three components/microservices that collectively provide login capabilities, including two platform microservices: OAuth2 1004 and SAML2 1006, and one infrastructure microservice: SSO 1008. In the embodiment of FIG. 10, IDCS provides an "Identity Metasystem" in which SSO services 1008 are provided over different types of applications, such as browser based web or native applications 1010 requiring 3-legged OAuth flow and acting as an OpenID Connect relaying party ("RP," an application that outsources its user authentication function to an IDP), native applications 1011 requiring 2-legged OAuth flow and acting as an OpenID Connect RP, and web applications 1012 acting as a SAML SP.

Generally, an Identity Metasystem is an interoperable architecture for digital identity, allowing for employing a collection of digital identities based on multiple underlying technologies, implementations, and providers. LDAP, SAML, and OAuth are examples of different security standards that provide identity capability and can be the basis for building applications, and an Identity Metasystem may be configured to provide a unified security system over such applications. The LDAP security model specifies a specific mechanism for handling identity, and all passes through the system are to be strictly protected. SAML was developed to allow one set of applications securely exchange information with another set of applications that belong to a different organization in a different security domain. Since there is no trust between the two applications, SAML was developed to allow for one application to authenticate another application that does not belong to the same organization. OAuth provides OpenID Connect that is a lightweight protocol for performing web based authentication.

In the embodiment of FIG. 10, when an OpenID application 1010 connects to an OpenID server in IDCS, its "channels" request SSO service. Similarly, when a SAML application 1012 connects to a SAML server in IDCS, its "channels" also request SSO service. In IDCS, a respective microservice (e.g., an OpenID microservice 1004 and a SAML microservice 1006) will handle each of the applications, and these microservices request SSO capability from SSO microservice 1008. This architecture can be expanded to support any number of other security protocols by adding a microservice for each protocol and then using SSO microservice 1008 for SSO capability. SSO microservice 1008 issues the sessions (i.e., an SSO cookie 1014 is provided) and is the only system in the architecture that has the authority to issue a session. An IDCS session is realized through the use of SSO cookie 1014 by browser 1002. Browser 1002 also uses a local session cookie 1016 to manage its local session.

In one embodiment, for example, within a browser, a user may use a first application based on SAML and get logged in, and later use a second application built with a different protocol such as OAuth. The user is provided with SSO on the second application within the same browser. Accordingly, the browser is the state or user agent and maintains the cookies.

In one embodiment, SSO microservice 1008 provides login ceremony 1018, ID/password recovery 1020, first time login flow 1022, an authentication manager 1024, an HTTP cookie manager 1026, and an event manager 1028. Login ceremony 1018 implements SSO functionality based on customer settings and/or application context, and may be configured according to a local form (i.e., basic Auth), an external SAML IDP, an external OIDC IDP, etc. ID/password recovery 1020 is used to recover a user's ID and/or password. First time login flow 1022 is implemented when a user logs in for the first time (i.e., an SSO session does not yet exist). Authentication manager 1024 issues authentication tokens upon successful authentication. HTTP cookie manager 1026 saves the authentication token in an SSO cookie. Event manager 1028 publishes events related to SSO functionality.

In one embodiment, interactions between OAuth microservice 1004 and SSO microservice 1008 are based on browser redirects so that SSO microservice 1008 challenges the user using an HTML form, validates credentials, and issues a session cookie.

In one embodiment, for example, OAuth microservice 1004 may receive an authorization request from browser 1002 to authenticate a user of an application according to 3-legged OAuth flow. OAuth microservice 1004 then acts as an OIDC provider 1030, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to OAuth microservice 1004. OAuth microservice 1004 then redirects browser 1002 to a callback URL with an authorization ("AZ") code. Browser 1002 sends the AZ code to OAuth microservice 1004 to request the required tokens 1032. Browser 1002 also includes its client credentials (obtained when registering in IDCS as an OAuth2 client) in the HTTP authorization header. OAuth microservice 1004 in return provides the required tokens 1032 to browser 1002. In one embodiment, tokens 1032 provided to browser 1002 include JW identity and access tokens signed by the IDCS OAuth2 server. Further details of this functionality are disclosed below with reference to FIG. 11.

In one embodiment, for example, OAuth microservice 1004 may receive an authorization request from a native application 1011 to authenticate a user according to a 2-legged OAuth flow. In this case, an authentication manager 1034 in OAuth microservice 1004 performs the corresponding authentication (e.g., based on ID/password received from a client 1011) and a token manager 1036 issues a corresponding access token upon successful authentication.

In one embodiment, for example, SAML microservice 1006 may receive an SSO POST request from a browser to authenticate a user of a web application 1012 that acts as a SAML SP. SAML microservice 1006 then acts as a SAML IDP 1038, redirects browser 1002 to SSO microservice 1008, and passes along application context. Depending on whether the user has a valid SSO session or not, SSO microservice 1008 either validates the existing session or performs a login ceremony. Upon successful authentication or validation, SSO microservice 1008 returns authentication context to SAML microservice 1006. SAML microservice then redirects to the SP with required tokens.

In one embodiment, for example, SAML microservice 1006 may act as a SAML SP 1040 and go to a remote SAML IDP 1042 (e.g., an active directory federation service ("ADFS")). One embodiment implements the standard SAML/AD flows. In one embodiment, interactions between SAML microservice 1006 and SSO microservice 1008 are based on browser redirects so that SSO microservice 1008 challenges the user using an HTML form, validates credentials, and issues a session cookie.

In one embodiment, the interactions between a component within IDCS (e.g., 1004, 1006, 1008) and a component outside IDCS (e.g., 1002, 1011, 1042) are performed through firewalls 1044.

Login/Logout Flow

Figure 11:
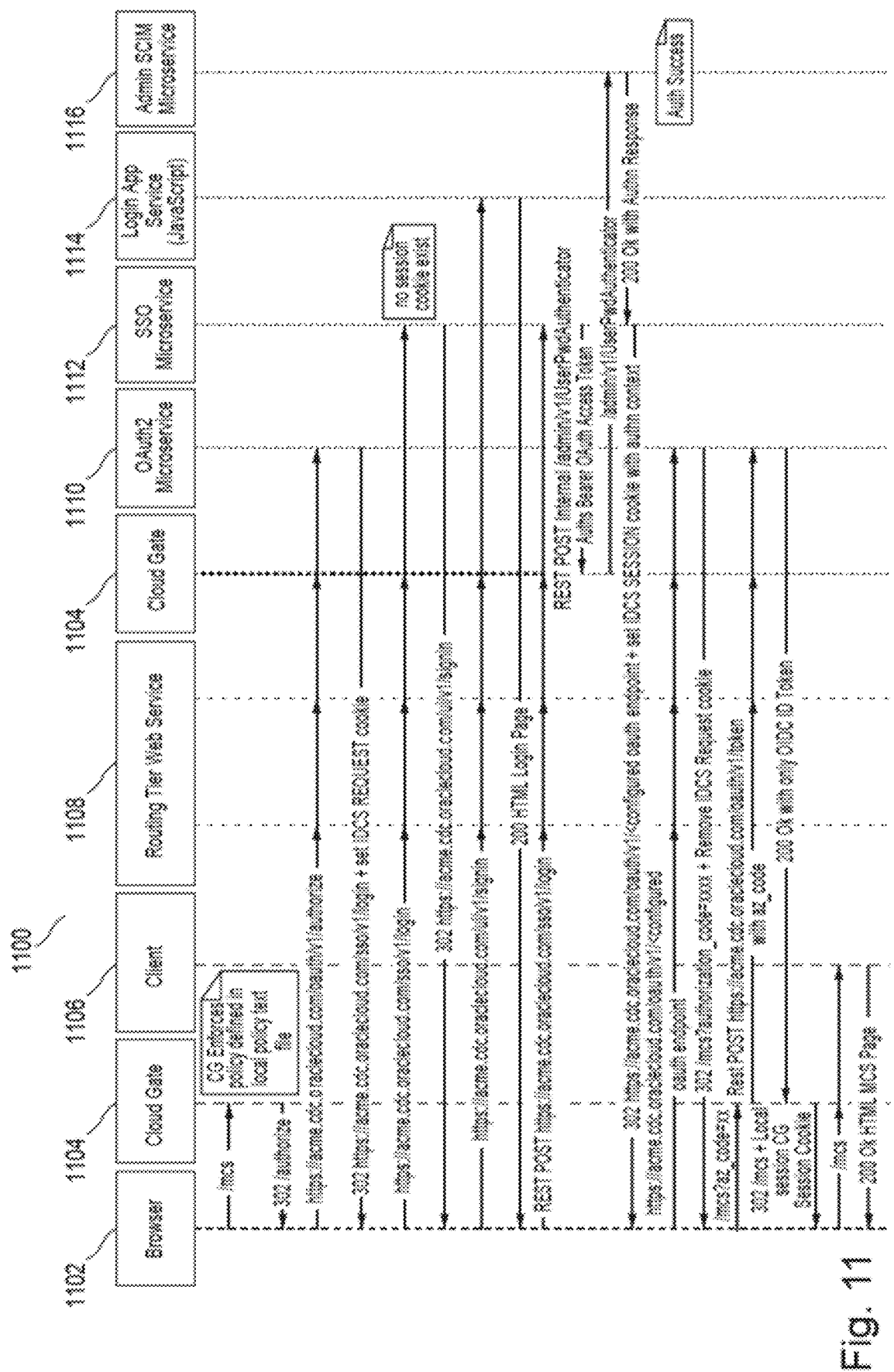
FIG. 11 is a message sequence flow of SSO functionality in one embodiment.

FIG. 11 is a message sequence flow 1100 of SSO functionality provided by IDCS in one embodiment. When a user uses a browser 1102 to access a client 1106 (e.g., a browser-based application or a mobile/native application), Cloud Gate 1104 acts as an application enforcement point and enforces a policy defined in a local policy text file. If Cloud Gate 1104 detects that the user has no local application session, it requires the user to be authenticated. In order to do so, Cloud Gate 1104 redirects browser 1102 to OAuth2 microservice 1110 to initiate OpenID Connect login flow against the OAuth2 microservice 1110 (3-legged AZ Grant flow with scopes="openid profile").

The request of browser 1102 traverses IDCS routing tier web service 1108 and Cloud Gate 1104 and reaches OAuth2 microservice 1110. OAuth2 microservice 1110 constructs the application context (i.e., metadata that describes the application, e.g., identity of the connecting application, client ID, configuration, what the application can do, etc.), and redirects browser 1102 to SSO microservice 1112 to log in.

If the user has a valid SSO session, SSO microservice 1112 validates the existing session without starting a login ceremony. If the user does not have a valid SSO session (i.e., no session cookie exists), the SSO microservice 1112 initiates the user login ceremony in accordance with customer's login preferences (e.g., displaying a branded login page). In order to do so, the SSO microservice 1112 redirects browser 1102 to a login application service 1114 implemented in JavaScript. Login application service 1114 provides a login page in browser 1102. Browser 1102 sends a REST POST to the SSO microservice 1112 including login credentials. The SSO microservice 1112 generates an access token and sends it to Cloud Gate 1104 in a REST POST. Cloud Gate 1104 sends the authentication information to Adm in SCIM microservice 1116 to validate the user's password. Admin SCIM microservice 1116 determines successful authentication and sends a corresponding message to SSO microservice 1112.

In one embodiment, during the login ceremony, the login page does not display a consent page, as "login" operation requires no further consent. Instead, a privacy policy is stated on the login page, informing the user about certain profile attributes being exposed to applications. During the login ceremony, the SSO microservice 1112 respects customer's IDP preferences, and if configured, redirects to the IDP for authentication against the configured IDP.

Upon successful authentication or validation, SSO microservice 1112 redirects browser 1102 back to OAuth2 microservice 1110 with the newly created/updated SSO host HTTP cookie (e.g., the cookie that is created in the context of the host indicated by "HOSTURL") containing the user's authentication token. OAuth2 microservice 1110 returns AZ Code (e.g., an OAuth concept) back to browser 1102 and redirects to Cloud Gate 1104. Browser 1102 sends AZ Code to Cloud Gate 1104, and Cloud Gate 1104 sends a REST POST to OAuth2 microservice 1110 to request the access token and the identity token. Both tokens are scoped to OAuth microservice 1110 (indicated by the audience token claim). Cloud Gate 1104 receives the tokens from OAuth2 microservice 1110.

Cloud Gate 1104 uses the identity token to map the user's authenticated identity to its internal account representation, and it may save this mapping in its own HTTP cookie. Cloud Gate 1104 then redirects browser 1102 to client 1106. Browser 1102 then reaches client 1106 and receives a corresponding response from client 1106. From this point on, browser 1102 can access the application (i.e., client 1106) seamlessly for as long as the application's local cookie is valid. Once the local cookie becomes invalid, the authentication process is repeated.

Cloud Gate 1104 further uses the access token received in a request to obtain "userinfo" from OAuth2 microservice 1110 or the SCIM microservice. The access token is sufficient to access the "userinfo" resource for the attributes allowed by the "profile" scope. It is also sufficient to access "/me" resources via the SCIM microservice. In one embodiment, by default, the received access token is only good for user profile attributes that are allowed under the "profile" scope. Access to other profile attributes is authorized based on additional (optional) scopes submitted in the AZ grant login request issued by Cloud Gate 1104.

When the user accesses another OAuth2 integrated connecting application, the same process repeats.

In one embodiment, the SSO integration architecture uses a similar OpenID Connect user authentication flow for browser-based user logouts. In one embodiment, a user with an existing application session accesses Cloud Gate 1104 to initiate a logout. Alternatively, the user may have initiated the logout on the IDCS side. Cloud Gate 1104 terminates the application-specific user session, and initiates OAuth2 OpenID Provider ("OP") logout request against OAuth2 microservice 1110. OAuth2 microservice 1110 redirects to SSO microservice 1112 that kills the user's host SSO cookie. SSO microservice 1112 initiates a set of redirects (OAuth2 OP and SAML IDP) against known logout endpoints as tracked in user's SSO cookie.

In one embodiment, if Cloud Gate 1104 uses SAML protocol to request user authentication (e.g., login), a similar process starts between the SAML microservice and SSO microservice 1112.

Cloud Cache

One embodiment provides a service/capability referred to as Cloud Cache. Cloud Cache is provided in IDCS to support communication with applications that are LDAP based (e.g., email servers, calendar servers, some business applications, etc.) since IDCS does not communicate according to LDAP while such applications are configured to communicate only based on LDAP. Typically, cloud directories are exposed via REST APIs and do not communicate according to the LDAP protocol. Generally, managing LDAP connections across corporate firewalls requires special configurations that are difficult to set up and manage.

To support LDAP based applications, Cloud Cache translates LDAP communications to a protocol suitable for communication with a cloud system. Generally, an LDAP based application uses a database via LDAP. An application may be alternatively configured to use a database via a different protocol such as SQL. However, LDAP provides a hierarchical representation of resources in tree structures, while SQL represents data as tables and fields. Accordingly, LDAP may be more desirable for searching functionality, while SQL may be more desirable for transactional functionality.

In one embodiment, services provided by IDCS may be used in an LDAP based application to, for example, authenticate a user of the applications (i.e., an identity service) or enforce a security policy for the application (i.e., a security service). In one embodiment, the interface with IDCS is through a firewall and based on HTTP (e.g., REST). Typically, corporate firewalls do not allow access to internal LDAP communication even if the communication implements Secure Sockets Layer ("SSL"), and do not allow a TCP port to be exposed through the firewall. However, Cloud Cache translates between LDAP and HTTP to allow LDAP based applications reach services provided by IDCS, and the firewall will be open for HTTP.

Generally, an LDAP directory may be used in a line of business such as marketing and development, and defines users, groups, works, etc. In one example, a marketing and development business may have different targeted customers, and for each customer, may have their own applications, users, groups, works, etc. Another example of a line of business that may run an LDAP cache directory is a wireless service provider. In this case, each call made by a user of the wireless service provider authenticates the user's device against the LDAP directory, and some of the corresponding information in the LDAP directory may be synchronized with a billing system. In these examples, LDAP provides functionality to physically segregate content that is being searched at runtime.

In one example, a wireless service provider may handle its own identity management services for their core business (e.g., regular calls), while using services provided by IDCS in support of a short term marketing campaign. In this case, Cloud Cache "flattens" LDAP when it has a single set of users and a single set of groups that it runs against the cloud. In one embodiment, any number of Cloud Caches may be implemented in IDCS.

Distributed Data Grid

In one embodiment, the cache cluster in IDCS is implemented based on a distributed data grid, as disclosed, for example, in U.S. Pat. Pub. No. 2016/0092540, the disclosure of which is hereby incorporated by reference. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the Oracle Coherence data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, IDCS implements a distributed data grid such as Coherence so that every microservice can request access to shared cache objects without getting blocked. Coherence is a proprietary Java-based in-memory data grid, designed to have better reliability, scalability, and performance than traditional relational database management systems. Coherence provides a peer to peer (i.e., with no central manager), in-memory, distributed cache.

Figure 12:
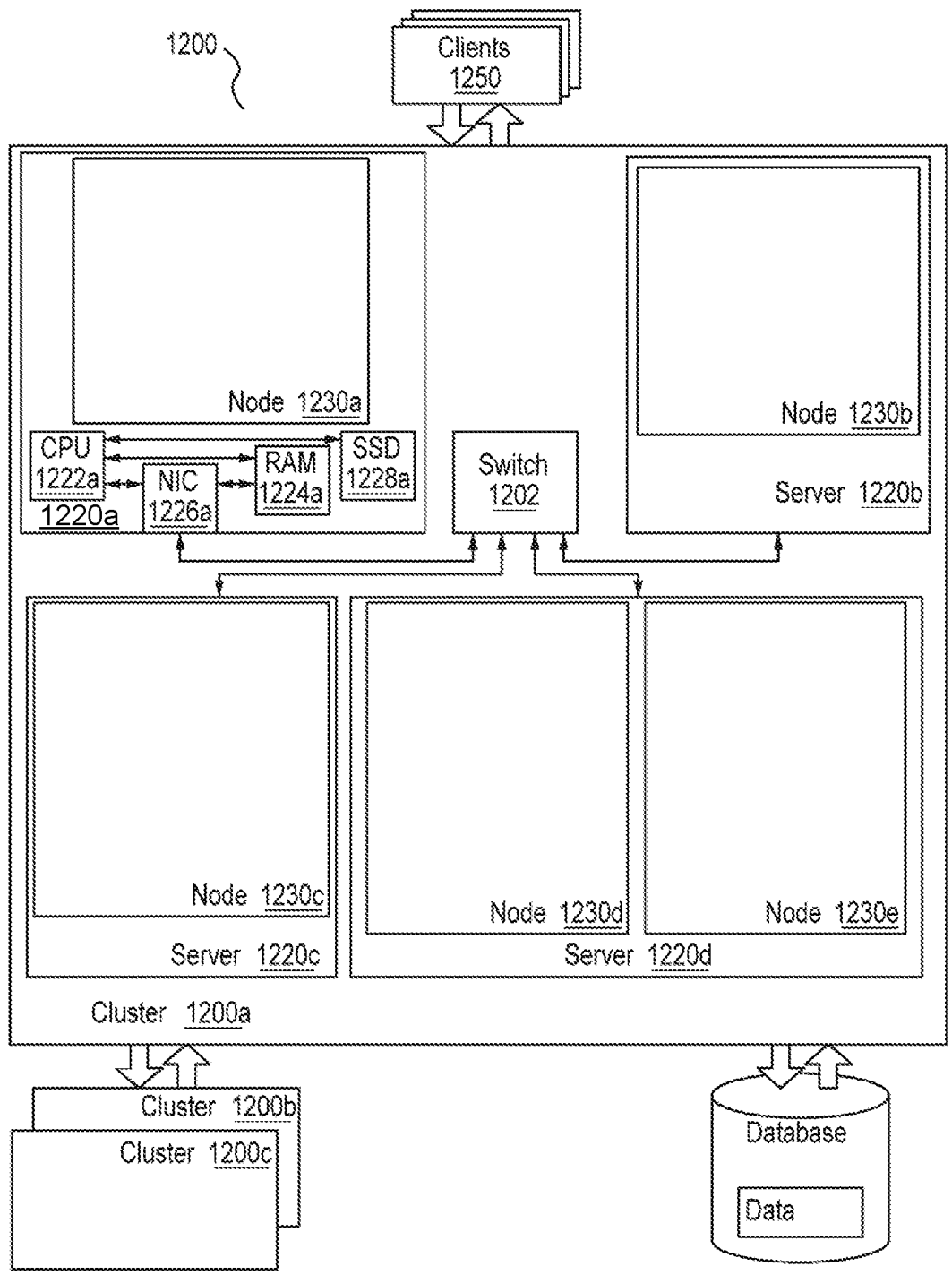
FIG. 12 illustrates an example of a distributed data grid in one embodiment.

FIG. 12 illustrates an example of a distributed data grid 1200 which stores data and provides data access to clients 1250 and implements embodiments of the invention. A "data grid cluster", or "distributed data grid", is a system comprising a plurality of computer servers (e.g., 1220a, 1220b, 1220c, and 1220d) which work together in one or more clusters (e.g., 1200a, 1200b, 1200c) to store and manage information and related operations, such as computations, within a distributed or clustered environment. While distributed data grid 1200 is illustrated as comprising four servers 1220a, 1220b, 1220c, 1220d, with five data nodes 1230a, 1230b, 1230c, 1230d, and 1230e in a cluster 1200a, the distributed data grid 1200 may comprise any number of clusters and any number of servers and/or nodes in each cluster. In an embodiment, distributed data grid 1200 implements the present invention.

As illustrated in FIG. 12, a distributed data grid provides data storage and management capabilities by distributing data over a number of servers (e.g., 1220a, 1220b, 1220c, and 1220d) working together. Each server of the data grid cluster may be a conventional computer system such as, for example, a "commodity x86" server hardware platform with one to two processor sockets and two to four CPU cores per processor socket. Each server (e.g., 1220a, 1220b, 1220c, and 1220d) is configured with one or more CPUs, Network Interface Cards ("NIC"), and memory including, for example, a minimum of 4 GB of RAM up to 64 GB of RAM or more. Server 1220a is illustrated as having CPU 1222a, Memory 1224a, and NIC 1226a (these elements are also present but not shown in the other Servers 1220b, 1220c, 1220d). Optionally, each server may also be provided with flash memory (e.g., SSD 1228a) to provide spillover storage capacity. When provided, the SSD capacity is preferably ten times the size of the RAM. The servers (e.g., 1220a, 1220b, 1220c, 1220d) in a data grid cluster 1200a are connected using high bandwidth NICs (e.g., PCI-X or PCIe) to a high-performance network switch 1220 (for example, gigabit Ethernet or better).

A cluster 1200a preferably contains a minimum of four physical servers to avoid the possibility of data loss during a failure, but a typical installation has many more servers. Failover and failback are more efficient the more servers that are present in each cluster and the impact of a server failure on a cluster is lessened. To minimize communication time between servers, each data grid cluster is ideally confined to a single switch 1202 which provides single hop communication between servers. A cluster may thus be limited by the number of ports on the switch 1202. A typical cluster will therefore include between 4 and 96 physical servers.

In most Wide Area Network ("WAN") configurations of a distributed data grid 1200, each data center in the WAN has independent, but interconnected, data grid clusters (e.g., 1200a, 1200b, and 1200c). A WAN may, for example, include many more clusters than shown in FIG. 12. Additionally, by using interconnected but independent clusters (e.g., 1200a, 1200b, 1200c) and/or locating interconnected, but independent, clusters in data centers that are remote from one another, the distributed data grid can secure data and service to clients 1250 against simultaneous loss of all servers in one cluster caused by a natural disaster, fire, flooding, extended power loss, and the like.

One or more nodes (e.g., 1230a, 1230b, 1230c, 1230d and 1230e) operate on each server (e.g., 1220a, 1220b, 1220c, 1220d) of a cluster 1200a. In a distributed data grid, the nodes may be, for example, software applications, virtual machines, or the like, and the servers may comprise an operating system, hypervisor, or the like (not shown) on which the node operates. In an Oracle Coherence data grid, each node is a Java virtual machine ("JVM"). A number of JVMs/nodes may be provided on each server depending on the CPU processing power and memory available on the server. JVMs/nodes may be added, started, stopped, and deleted as required by the distributed data grid. JVMs that run Oracle Coherence automatically join and cluster when started. JVMs/nodes that join a cluster are called cluster members or cluster nodes.

Architecture

Each client or server includes a bus or other communication mechanism for communicating information, and a processor coupled to bus for processing information. The processor may be any type of general or specific purpose processor. Each client or server may further include a memory for storing information and instructions to be executed by processor. The memory can be comprised of any combination of random access memory ("RAM"), read only memory ("ROM"), static storage such as a magnetic or optical disk, or any other type of computer readable media. Each client or server may further include a communication device, such as a network interface card, to provide access to a network. Therefore, a user may interface with each client or server directly, or remotely through a network, or any other method.

Computer readable media may be any available media that can be accessed by processor and includes both volatile and non-volatile media, removable and non-removable media, and communication media. Communication media may include computer readable instructions, data structures, program modules, or other data in a modulated data signal such as a carrier wave or other transport mechanism, and includes any information delivery media.

The processor may further be coupled via bus to a display, such as a Liquid Crystal Display ("LCD"). A keyboard and a cursor control device, such as a computer mouse, may be further coupled to bus to enable a user to interface with each client or server.

In one embodiment, the memory stores software modules that provide functionality when executed by the processor. The modules include an operating system that provides operating system functionality each client or server. The modules may further include a cloud identity management module for providing cloud identity management functionality, and all other functionality disclosed herein.

The clients may access a web service such as a cloud service. The web service may be implemented on a Web-Logic Server from Oracle Corp. in one embodiment. In other embodiments, other implementations of a web service can be used. The web service accesses a database which stores cloud data.

As disclosed, embodiments implement a microservices based architecture to provide cloud-based multi-tenant IAM services. In one embodiment, each requested identity management service is broken into real-time tasks that are handled by a microservice in the middle tier, and near-real-time tasks that are offloaded to a message queue. Accordingly, embodiments provide a cloud-scale IAM platform.

IAM Functionality Example

In one embodiment, IAM functionality is implemented by software stored in memory or other computer readable or tangible medium, and executed by a processor.

A request is received for performing an identity management service. In one embodiment, the request includes a call to an API that identifies the identity management service and a microservice configured to perform the identity management service. In one embodiment, the microservice is a self-contained module that can communicate with other modules/microservices, and each microservice has an unnamed universal port that can be contacted by others. For example, in one embodiment, a variety of applications/services 602 may make HTTP calls to IDCS APIs to use IDCS microservices 614 as illustrated in FIG. 6. In one embodiment, a microservice is a runtime component/process.

In one embodiment, the request includes a URL. In one embodiment, the microservice is identified in a prefix of the URL. In one embodiment, a resource portion of the URL identifies the API. In one embodiment, a host portion of the URL identifies a tenancy of a resource related to the request. For example, in a URL such as "host/microservice/resource" in the web environment of IDCS, a microservice is characterized by having a specific URL prefix, e.g., "host/oauth/v1" where the actual microservice is "oauth/v1", and under "oauth/v1" there are multiple APIs, e.g., an API to request tokens: "host/oauth/v1/token", an API to authenticate a user: "host/oauth/v1/authorize", etc. That is, the URL implements a microservice, and the resource portion of the URL implements an API. Accordingly, multiple APIs are aggregated under the same microservice. In one embodiment, the host portion of the URL identifies a tenant (e.g., https://tenant3.identity.oraclecloud.com:/oauth/v1/token").

The request is then authenticated. In one embodiment, the request is authenticated by a security gate such as Cloud Gate as described herein, for example, with reference to web routing tier 610 in FIG. 6 and/or cloud gate 702 in FIG. 7.

The microservice is then accessed based on the API, for example, as described herein with reference to the IDCS "API platform" and accessing microservices in IDCS middle tier 614 in FIG. 6. In one embodiment, communicating with the microservice is configured through an unnamed universal port of the microservice. In one embodiment, the unnamed universal port of a microservice is a standard communication channel that the microservice exposes by convention (e.g., as a conventional HTTP port) and that allows any other module/microservice within the same service to talk to it. In one embodiment, the microservice provides one or more capabilities by exposing one or more APIs. In one embodiment, communication with the microservice is implemented only through the one or more APIs. That is, the microservice can be reached/contacted only by making calls to such APIs. In one embodiment, communication with the microservice is configured according to a lightweight protocol. In one embodiment, the lightweight protocol includes HTTP and REST. In one embodiment, the request includes a call to a RESTful HTTP API. Accordingly, one embodiment provides dispatching functionality. Each HTTP request includes a URI and a verb. The embodiment parses the endpoint (host/service/resource) from the URI and combines it with the HTTP verb (e.g., POST, PUT, PATCH, or Delete) to dispatch (or invoke) the appropriate method of the appropriate module. This pattern is common to REST and is supported by various packages (e.g., Jersey).

The identity management service is then performed by the microservice, for example, as described herein with reference to the IDCS "API platform" and accessing microservices in IDCS middle tier 614 in FIG. 6. In one embodiment, the microservice is stateless, horizontally scalable, and independently deployable. In one embodiment, each physical implementation of the microservice is configured to securely support multiple tenants. In one embodiment, the identity management service includes a login service, an SSO service, a federation service, a token service, a directory service, a provisioning service, or an RBAC service.

LDAP to SCIM Proxy Service

In certain hybrid cloud deployments, identities are first migrated from an on-premises LDAP server to an IDCS SCIM server. Legacy on-premises LDAP-based applications then access these identities in the IDCS SCIM server through an intermediary or proxy service. In certain embodiments, the Cloud Cache (discussed above) provides an LDAP to SCIM proxy service that allows legacy LDAP-based applications to interact seamlessly with the IDCS SCIM server. Newly-deployed on-premises SCIM-based applications may access the IDCS SCIM server directly, as well as those legacy on-premises LDAP-based applications that have been re-written to support SCIM.

In a hybrid cloud deployment, the LDAP to SCIM proxy service advantageously provides a single source of truth for identities, and avoids the complexities, disadvantages and limitations of identity federation and/or synchronization configurations.

During migration from the on-premises LDAP server to the IDCS SCIM server, the hierarchy associated with each migrated LDAP entry is preserved. Because SCIM represents data in a flat tree structure with no hierarchy, embodiments of the present invention provide a virtual LDAP hierarchy in IDCS so that every SCIM user and group can be associated with the correct LDAP specific organizations, domains and units.

Figure 13:
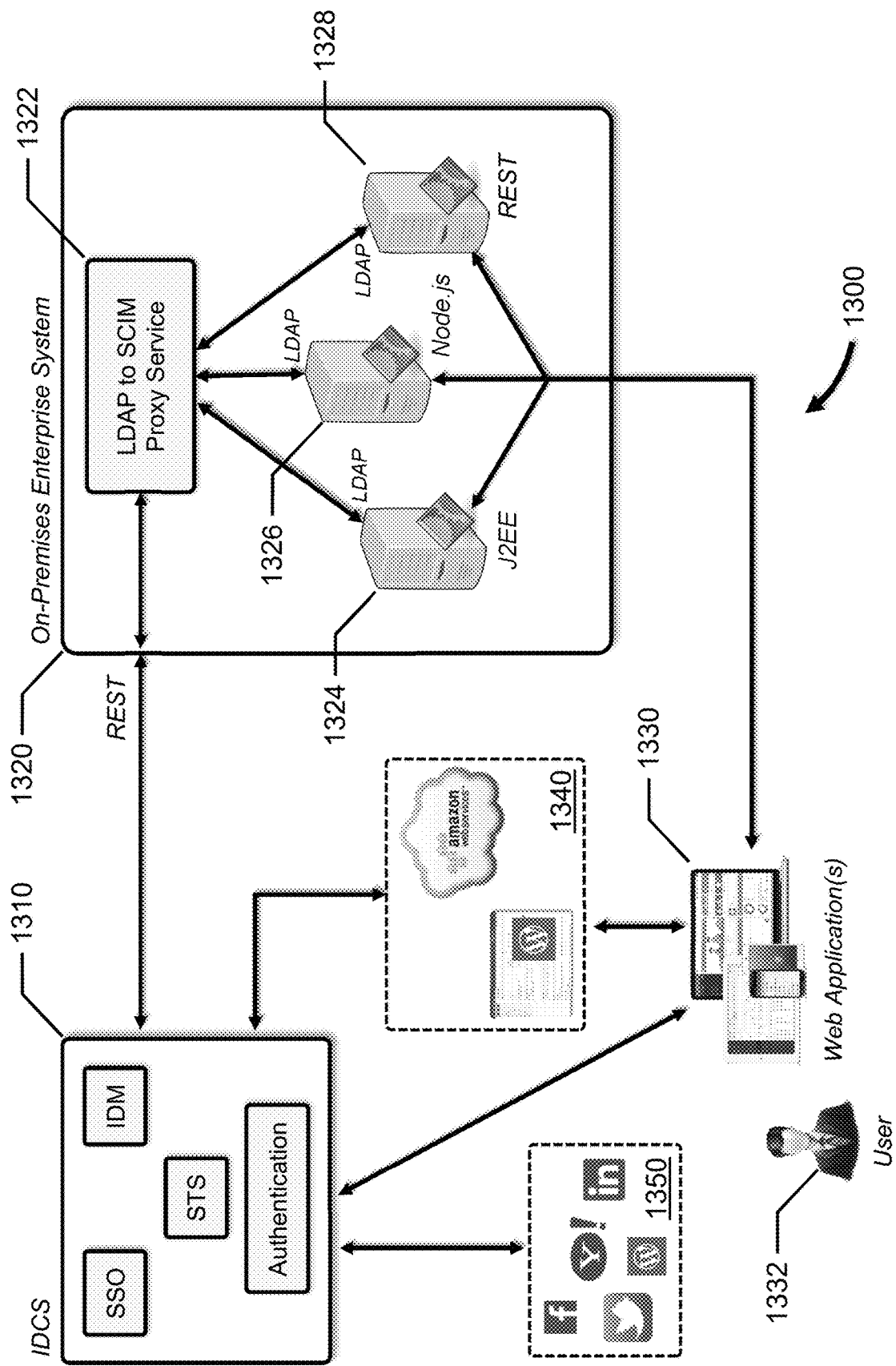
FIG. 13 depicts an LDAP to SCIM proxy service architecture, in accordance with an embodiment of the present invention.

FIG. 13 depicts an LDAP to SCIM proxy service architecture 1300, in accordance with an embodiment of the present invention. In this embodiment, on-premises enterprise system 1320 includes an LDAP to SCIM proxy service 1322, as well as several LDAP-based application servers 1324, 1326, 1328. The LDAP to SCIM proxy service 1322 may be provided by Cloud Cache (described above), which communicates with IDCS 1310 and LDAP-based application servers 1324, 1326, 1328. IDCS 1310 provides many different services, such as, for example, single sign on ("SSO") services, identity management ("IDM") services, security token services ("STS"), authentication services, etc.

In other embodiments, LINUX-based pluggable Authentication Modules (PAM), such as, for example, the System Security Services Daemon ("SSSD"), etc., can be configured to intercept and authenticate OS calls against an LDAP-based identity backend. These PAM modules may be configured to work with the LDAP to SCIM proxy service 1322 to indirectly perform OS authentication against IDCS.

In many embodiments, communications between LDAP to SCIM proxy service 1322 and IDCS 1310 are secured via OAuth. The LDAP to SCIM proxy service 1322 may be configured with an IDCS url, OAuth clientID and secret. These details may be used by the LDAP to SCIM proxy service 1322 during runtime to obtain an access token. Depending on the AppRole memberships defined for this OAuth Client in IDCS 1310, the access token will determine the set of privileges for LDAP to SCIM proxy service 1322 to query IDCS admin endpoints (Users/Groups/PasswordPolicy) for a particular tenant. If the access token expires, LDAP to SCIM proxy service 1322 will obtain a new access token. In one embodiment, these details are configured after installation, while in another embodiment, these details are provided during the installation phase itself.

Typically, user 1332 runs one or more web applications 1330 on a desktop or laptop computer, tablet, smart phone, etc., which communicate, over one or more networks, with LDAP-based applications running on LDAP-based application servers 1324, 1326, 1328 within on-premises enterprise system 1320. Web applications 1330 may communicate directly with IDCS 1310, as well as with cloud-based systems 1340, such as, for example, websites published by WordPress deployed on AWS ("Amazon Web Services"). Cloud-based systems 1340 and cloud-based applications 1350, such as, for example, Facebook, LinkedIn, Twitter, etc., may communicate with IDCS 1310 for identity management and user authentication purposes.

Figure 14A:
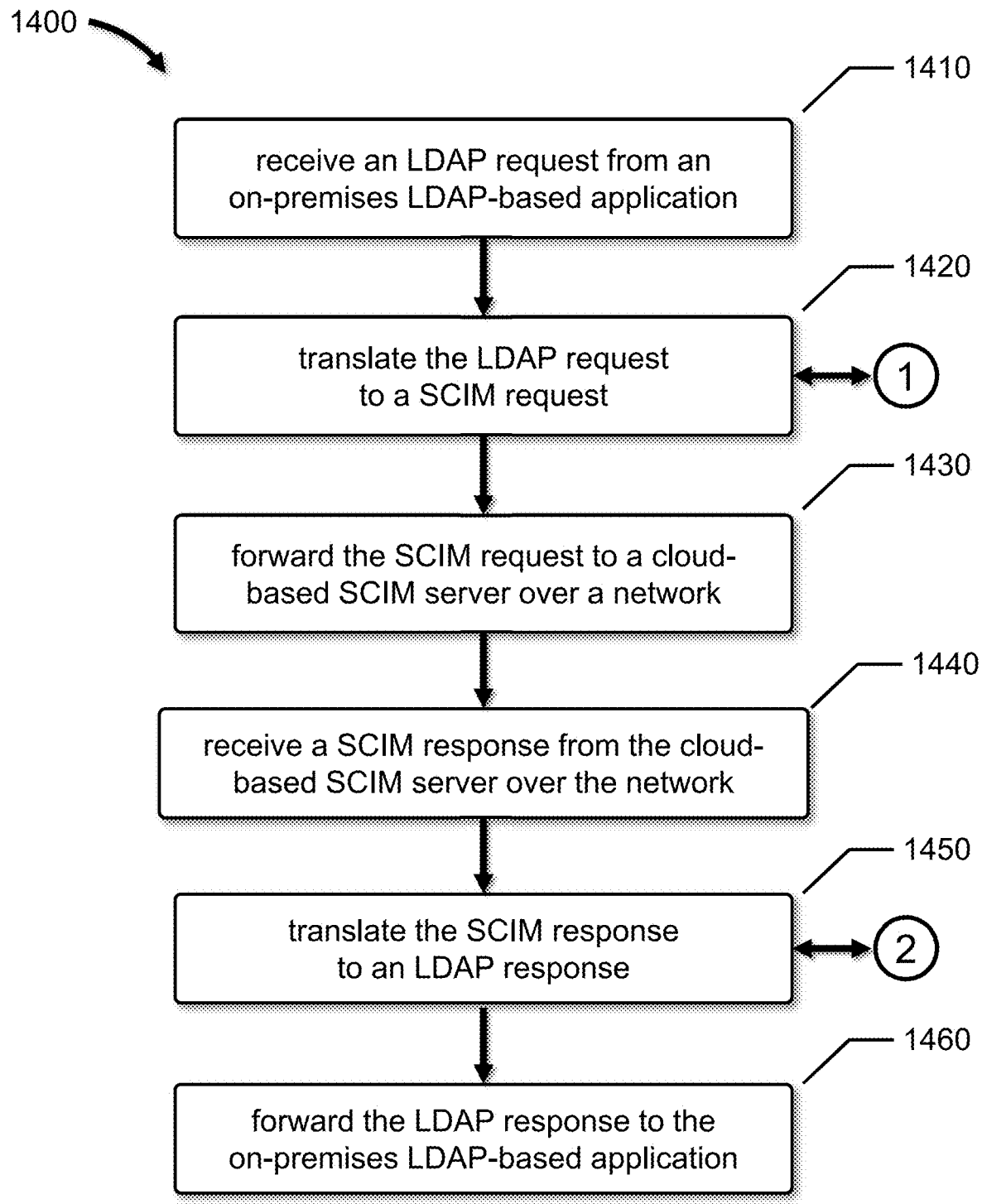
FIGS. 14A to 14I present a method for providing an LDAP to SCIM proxy service, in accordance with embodiments of the present invention.

FIGS. 14A to 14I present a method for providing an LDAP to SCIM proxy service, in accordance with embodiments of the present invention. FIG. 14A depicts method 1400, FIGS. 14B, 14C, 14D and 14E depict various embodiments of translating (1420) an LDAP request to a SCIM request, and FIGS. 14F, 14G, 14H and 14I depict various embodiments of translating (1460) a SCIM response to an LDAP response, as discussed below.

Referring to FIG. 14A, LDAP to SCIM proxy service 1322 receives (1410) an LDAP request from an LDAP-based application running on one of the LDAP-based application servers 1324, 1326, 1328, translates (1420) the LDAP request to a SCIM request, forwards (1430) the SCIM request to a SCIM server within IDCS 1310, receives (1440) a SCIM response from the SCIM server within IDCS 1310, translates (1450) the SCIM response to an LDAP response, and forwards (1460) the LDAP response to the LDAP-based application, according to an embodiment of the present invention.

In many embodiments, LDAP to SCIM proxy service 1322 includes several functional modules, such as, for example, an access control list ("ACL") evaluation module, an LDAP result set cache module, an LDAP-to-SCIM/SCIM-to-LDAP protocol conversion module, a SCIM REST utility module, a configuration module, etc.

In certain embodiments, the ACL evaluation module receives customer definitions for Global Access Control Lists (ACLs), which restrict the list of operations that a user may perform on the LDAP entries. If the bind user does not satisfy the ACL, the operation is not forwarded to IDCS 1310, and an LDAP error may be indicated.

In certain embodiments, the LDAP result set cache module stores information related to previously-searched Users, Groups, memberships and password policy in a cache, which significantly improves performance for frequently executed search queries. Each entry in the cache may represent a query object and its results. In one embodiment, a maximum age for each entry and a maximum size for the cache is specified when the cache is created. Whenever an LDAP Modify operation occurs or IDCS 1310 notifies that a change has occurred, then the LDAP result set cache module invalidates the related entry in the cache. Invalidation also occurs when an entry exceeds the maximum age, or when the cache exceeds the maximum size.

In certain embodiments, the LDAP-to-SCIM/SCIM-to-LDAP protocol conversion module converts the LDAP operations Add, Modify, Delete, and BIND to SCIM operations, converts SCIM responses to LDAP responses, converts exceptions obtained from executing SCIM REST calls to respective LDAP exceptions, flattens LDAP requests to match the SCIM flat tree structure, and reconstructs the DN and LDAP entries for IDCS response.

In certain embodiments, the SCIM REST utility module is built using IDCS Client library. After the SCIM operation is prepared, the SCIM REST utility module communicates with IDCS 1310.

In certain embodiments, the configuration module receives customer details such as, for example, IDCS URL, OAuth Client ID/Secret, User/Group/PasswordPolicy ObjectClass Mappings & Attribute Mappings, an RDn Attribute to be used for these SCIM resourceTypes, LDAP search realm Dn, etc. In certain embodiments, a new SCIM resourceType, different than the standard SCIM resource types (User, Group and PasswordPolicy) can also be registered with LDAP to SCIM proxy service. In these embodiments, the end customer provides details, such as, for example, the customer's equivalent SCIM resourceType rest endpoint details along with the customer's LDAP RDn attribute and objectclass and attribute mapping details. These customer details may be maintained in an IDCS server, and the LDAP to SCIM proxy service 1322 will fetch these values from IDCS 1310.

In these embodiments, LDAP to SCIM proxy service 1322 maps LDAP Search requests and filters to SCIM search requests and filters, converts LDAP "Add," "Modify," "Delete" and "BIND" operations to SCIM operations, converts SCIM responses to LDAP responses, converts exceptions (e.g., error codes) obtained from executing SCIM REST calls to respective LDAP exceptions (e.g., error codes), flattens LDAP requests to match the SCIM flat tree structure and reconstructs the DN and LDAP entries for response entries, etc.

LDAP to SCIM proxy service 1322 may include a Bind handler that validates the username/password provided in an LDAP BIND request against the IDCS SCIM server. The Bind handler performs a POST /PasswordAuthenticator for IDCS SCIM server to validate the password. The authentication may fail if the User status is locked or disabled in IDCS. An LDAP Bind operation works for both IDCS users and IDCS AppIDs.

LDAP to SCIM proxy service 1322 may include a Search handler that maps LDAP Search requests to SCIM search requests, converts LDAP search filters to SCIM search filters, handles LDAP return attributes mentioned in the LDAP Search request, maps SCIM Search responses to LDAP Search responses, etc. The scope of an LDAP Search request may be BASE, ONE LEVEL or SUBTREE.

When the search scope is BASE, the Search handler analyzes the search filter provided in the search request, and a GET call will be performed on /Users if the filter has (objectclass=<list of userobjectclass configured>), and on /Roles if the filter has (objectclass=<list of valid groupobjectclasses configured>) and on /PasswordPolicy if (objectclass=<list of valid passwordpolicy objectclasses>). If no specific object class is defined, then baseDN is analyzed to search for a User/Group or Password Policy container. If no specific container exists, then a REST GET call is performed on /Users, /Groups, and /PasswordPolicy. The REST GET call has an additional filter appended to the search filter present in the search request. In one embodiment, the additional filter is "<SCIM attribute corresponding to first RDn attribute in search request's baseDN>eq<value of the RDn attribute>."

When search scope is ONE LEVEL, the Search handler determines whether the baseDN mentioned in the search contains the REALM. If so, then the search request is processed; if not, then an error is returned. The Search handler takes the baseDN entry provided in the search and performs a REST GET call on /Users if the filter has (objectclass=<userobjectclass>), and on /Groups if the filter has (objectclass=<groupobjectclass>) and on /PasswordPolicy if (objectclass=<list of valid passwordpolicy objectclasses>). The search is performed on /Users,/Groups and /PasswordPolicy endpoints if no specific objectclass is specified in the search filter. The existing filter may be modified to add an additional filter. For a FLAT hierarchy, the searchBaseDN in the search request is not considered, no additional filter is introduced and all entries under /Users or /Groups IDCS REST endpoints that satisfy the original request filter criteria are returned. For entries returned by/Users REST endpoint, user object classes are added and corresponding attributes are returned; similar steps are taken for entries returned by /Groups and /PasswordPolicy endpoint.

When search scope is SUBTREE, the search operation is the same as the ONE_LEVEL search operation for a FLAT hierarchy because all entries are stored on the IDCS SCIM server in a flat structure.

In certain embodiments, the Search handler parses the LDAP search filter to form the SCIM request using a cloud-based library, such as, for example, an IDCS Java Client API Library. For each attribute in an LDAP expression, a corresponding SCIM attribute is determined based on an LDAP attribute to SCIM attribute mapping table. For example, FIG. 21 depicts an LDAP attribute to SCIM attribute mapping table, according to an embodiment of the present invention described in more detail below. Similarly, for each LDAP LOGIAL or COMPARISON operator in an LDAP expression, a corresponding SCIM LOGICAL or COMPARISON operator is determined.

The Search handler converts LDAP return attributes in the LDAP Search request to corresponding SCIM return attributes, which are used as query parameters in the GET request, e.g., attributes=<comma separated list of SCIM return attributes>. In the response sent by the IDCS SCIM server, only the values of these attributes are obtained and returned. The SCIM response contains the SCIM User/Group entries, which are mapped to LDAP entries. The LDAP entries are forwarded to the LDAP-based application in an LDAP Search response.

For entries returned on /Users endpoint, DN=<User RDn defined in configuration>=<Value of corresponding SCIM attribute>, <User Container defined in configuration>, <Search Realm configured by client in LDAP to SCIM proxy service>, while for entries returned on /Groups endpoint, DN =<Group RDn defined in configuration>=<Value of corresponding SCIM attribute>, <Group container defined in configuration>, <Search Realm configured by client in LDAP to SCIM proxy service>. The last parameter is an LDAP Search Realm configured by client in LDAP to SCIM proxy service.

Figure 14B:
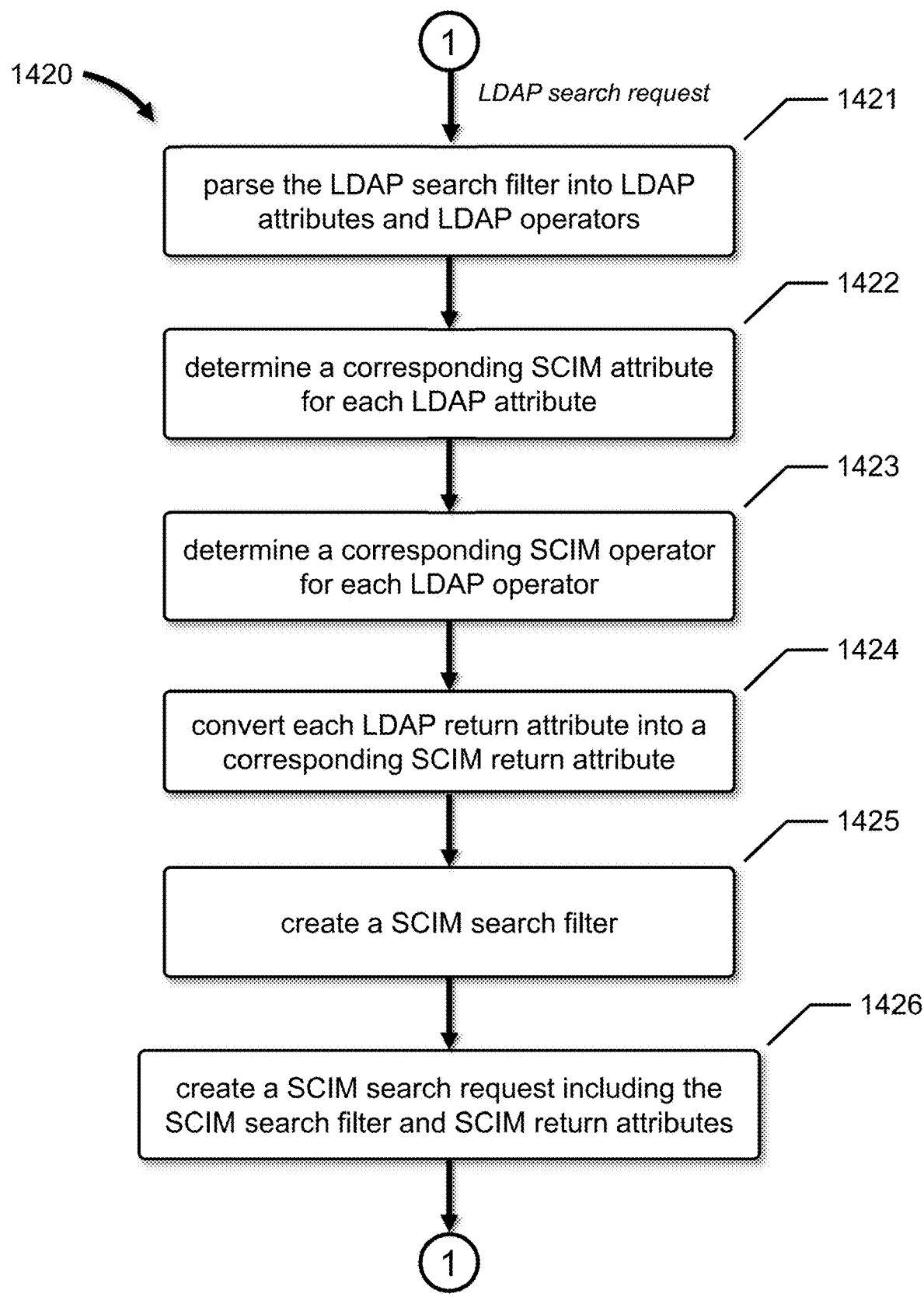

Referring to FIG. 14B, the Search handler translates (1420) the LDAP request into a SCIM request, according to an embodiment of the present invention. The Search handler parses (1421) the LDAP search filter in the LDAP Search request into a plurality of LDAP attributes and one or more LDAP operators. For each LDAP attribute, the Search handler determines (1422) a corresponding SCIM attribute based on an LDAP attribute to SCIM attribute mapping table. For each LDAP operator, the Search handler determines (1423) a corresponding SCIM operator. For each LDAP return attribute, the Search handler converts (1424) the LDAP return attribute into a corresponding SCIM return attribute. The Search handler then creates (1425) a SCIM search filter based on the corresponding SCIM attributes and the corresponding SCIM operators, and creates (1426) a SCIM search request including the SCIM search filter and the corresponding SCIM return attributes.

Figure 14C:
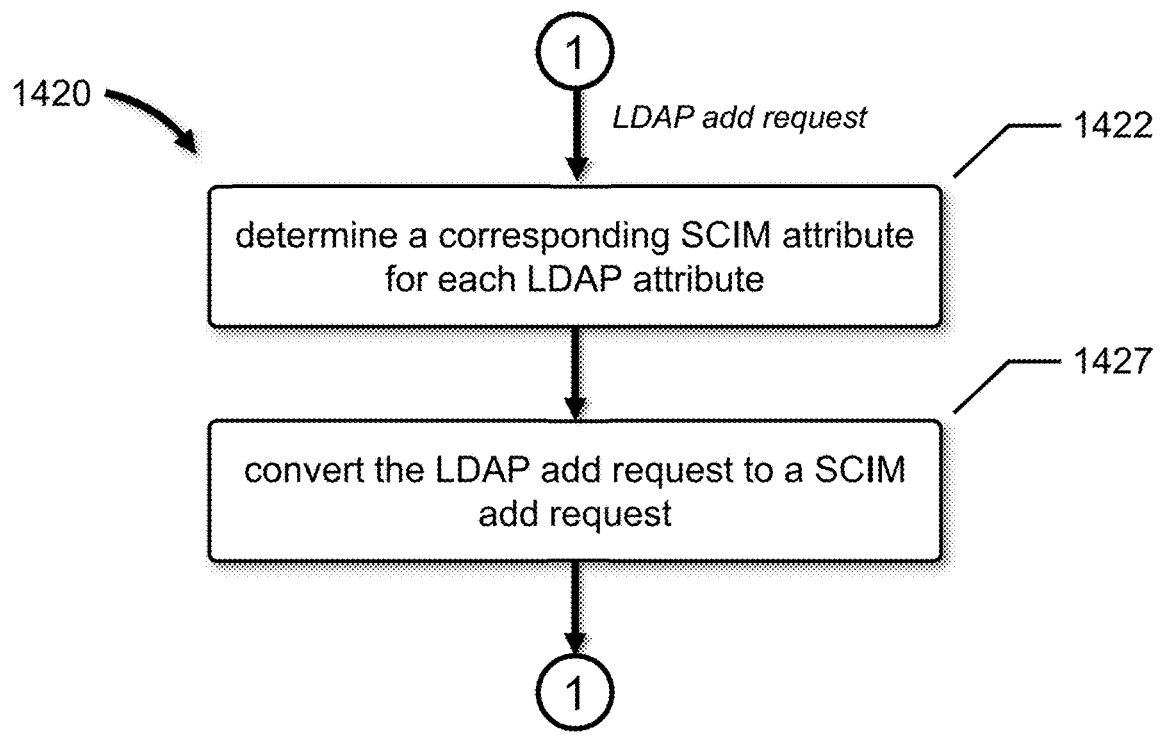
Figure 14D:
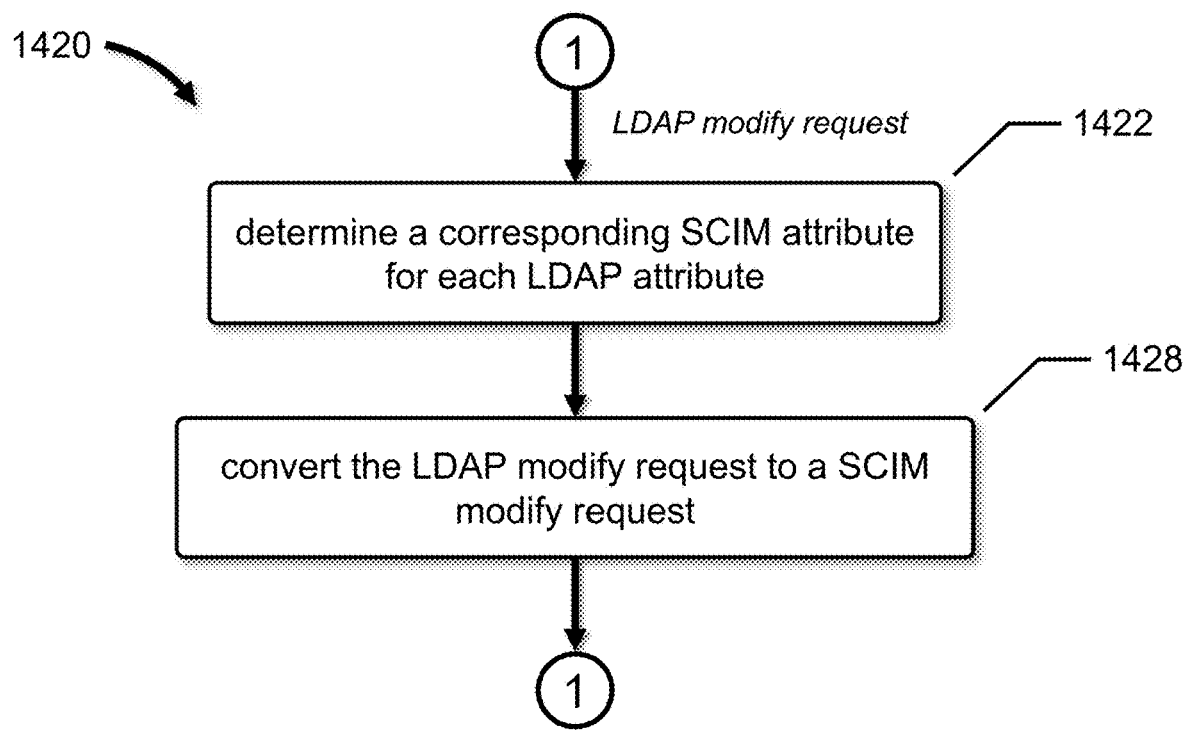
Figure 14E:
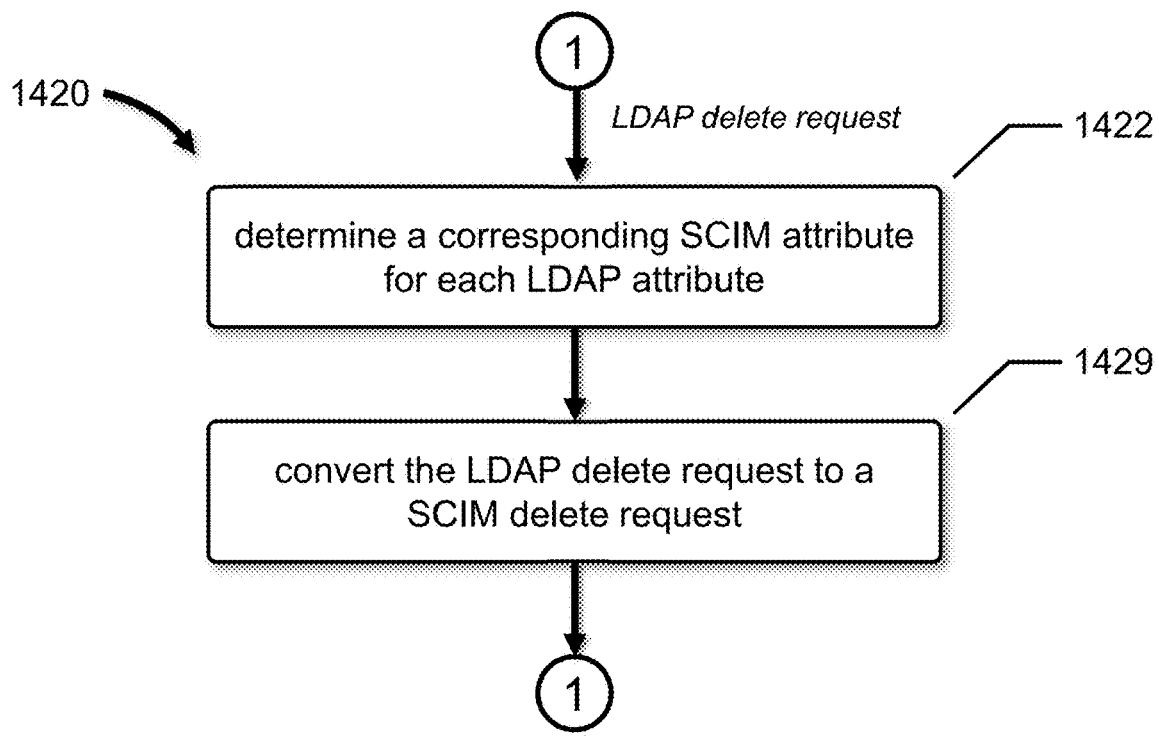
Figure 14F:
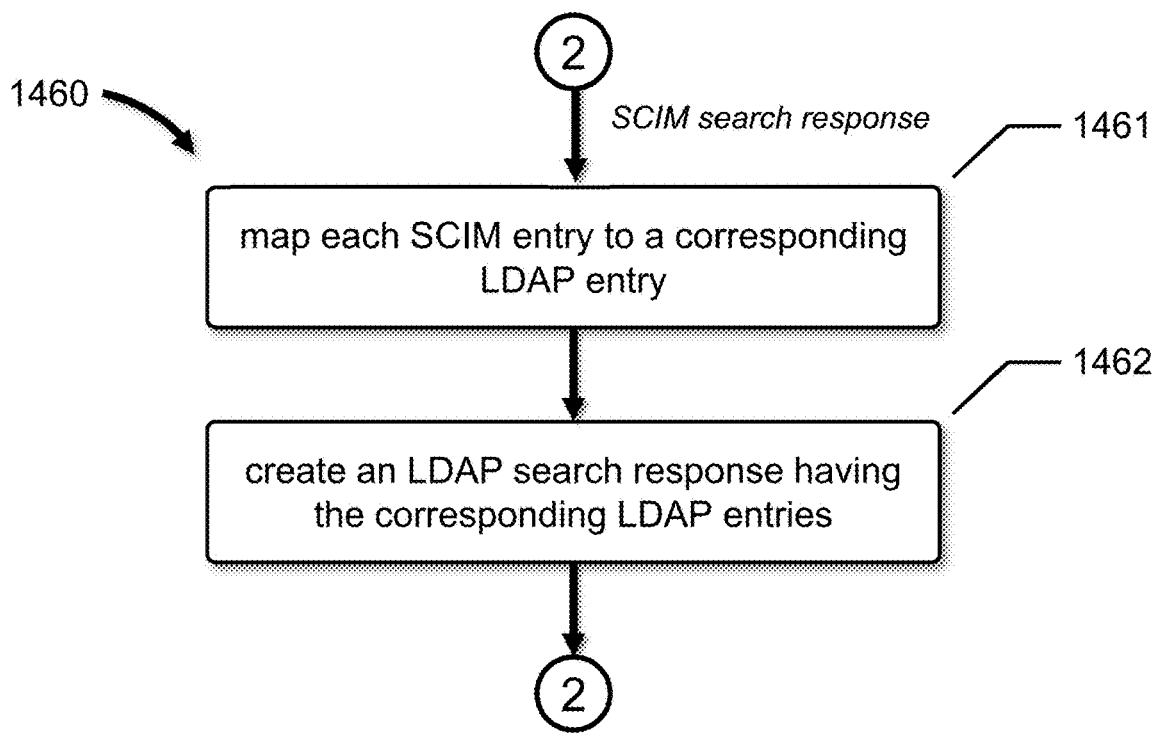

Referring to FIG. 14F, the Search handler translates (1460) the SCIM response into an LDAP response by mapping (1461) each SCIM entry in the SCIM Search response to a corresponding LDAP entry, and creating (1462) an LDAP Search response having the corresponding LDAP entries.

In certain embodiments, a local attribute mapping file for Users/Groups/PasswordPolicy may be maintained and included as part of an LDAP to SCIM proxy service software package. One embodiment of an attribute mapping file for a user resource that maps the user's IDCS SCIM attributes to some of the user's LDAP inetorgperson and posix objectclass attributes is:

```
userName = uid
name.formatted = cn
name.familyName = sn
name.givenName = givenName
name.middleName = middleName
displayName = displayName
title = title
preferredLanguage = preferredlanguage
password = userPassword
emails.value = mail
phoneNumbers.value = telephonenumber
photos.value = photo
addresses.formatted = postalAddress
addresses.streetAddress = street
addresses.locality = l
addresses.region = st
addresses.postalCode = postalCode
addresses.country = c
groups.value = ismemberof
x509Certificates.value = userCertificate
meta.created = createTimestamp
meta.lastModified = modifyTimestamp
urn\:ietf\:params\:scim\:schemas\:extension\:enterprise\:2.0\:User\:employeeNumber = employeeNumber
urn\:ietf\:params\:scim\:schemas\:extension\:enterprise\:2.0\:User\:manager.value = manager
urn\:ietf\:params\:scim\:schemas\:extension\:enterprise\:2.0\:User\:organization = o
urn\:ietf\:params\:scim\:schemas\:oracle\:idcs\:extension\:posix\:User\:loginShell = loginShell
urn\:ietf\:params\:scim\:schemas\:oracle\:idcs\:extension\:posix\:User\:gecos = gecos
urn\:ietf\:params\:scim\:schemas\:oracle\:idcs\:extension\:posix\:
```

```
User\:uidNumber= uidNumber
    urn\:ietf\:params\:scim\:schemas\:oracle\:idcs\:extension\:posix\:
User\:gidNumber= gidNumber
    urn\:ietf\:params\:scim\:schemas\:oracle\:idcs\:extension\:posix\:
User\:homeDirectory = homeDirectory
```

One embodiment of an attribute mapping file for a group resource that maps the group's IDCS SCIM attributes to some of the group's LDAP groupofuniquenames and posix objectclass attributes is:

```
displayName = cn
members.value = uniquemember
    urn\:ietf\:params\:scim\:schemas\:oracle\:idcs\:extension\:posix\:
Group\:gidNumber = gidNumber
    urn\:ietf\:params\:scim\:schemas\:oracle\:idcs\:extension\:group\:
Group\:description = description
    meta.created = createTimestamp
    meta.lastModified = modifyTimestamp
```

In other embodiments, attribute mappings may be defined in IDCS 1310. If the LDAP attribute's data type is different from the mapped SCIM attribute's data type, then LDAP to SCIM proxy service 1322 intelligently processes the input value (i.e., LDAP request or SCIM response), and converts this value to suit the target data type value (i.e., SCIM request or LDAP response). If the conversion to target data type value fails, then a suitable error is raised.

Additional embodiments for mapping LDAP requests are discussed in more detail below.

Similarly, LDAP to SCIM proxy service 1322 may include an Add handler that maps LDAP Add requests to SCIM Add requests and maps SCIM Add responses to LDAP Add responses, a Modify handler that maps LDAP Modify requests to SCIM Modify requests and maps SCIM Modify responses to LDAP Modify responses, a Delete handler that maps LDAP Delete requests to SCIM Delete requests and maps SCIM Delete responses to LDAP Delete responses, etc.

The Add handler maps LDAP Add requests to SCIM Add requests, and converts the SCIM results to LDAP results. In certain embodiments, the Add handler only processes User and Group additions. The container entry in the baseDN of the entry to be added is analyzed to determine whether a POST is necessary on /Users or /Groups. The DN value is "scraped off" to recover the entry name from first RDn attribute. All attributes of the User/Group present in the LDAP Add request are mapped to corresponding SCIM attributes. A SCIM REST POST request is constructed on the SCIM endpoint for /Users or /Groups, respectively, depending on whether the User ObjectClass or the Group ObjectClass is present, and the data of Add operation is sent to the IDCS SCIM server. In certain embodiments, the IDCS Client library may be used for constructing the SCIM Add request.

Referring to FIG. 14C, the Add handler translates (1420) the LDAP request into a SCIM request, according to an embodiment of the present invention. For each LDAP attribute, the Add handler determines (1422) a corresponding SCIM attribute based on an LDAP attribute to SCIM attribute mapping table. The Add handler then converts (1427) the LDAP Add request into a SCIM add request that includes a REST post operation performed on /Users or /Roles.

Figure 14G:
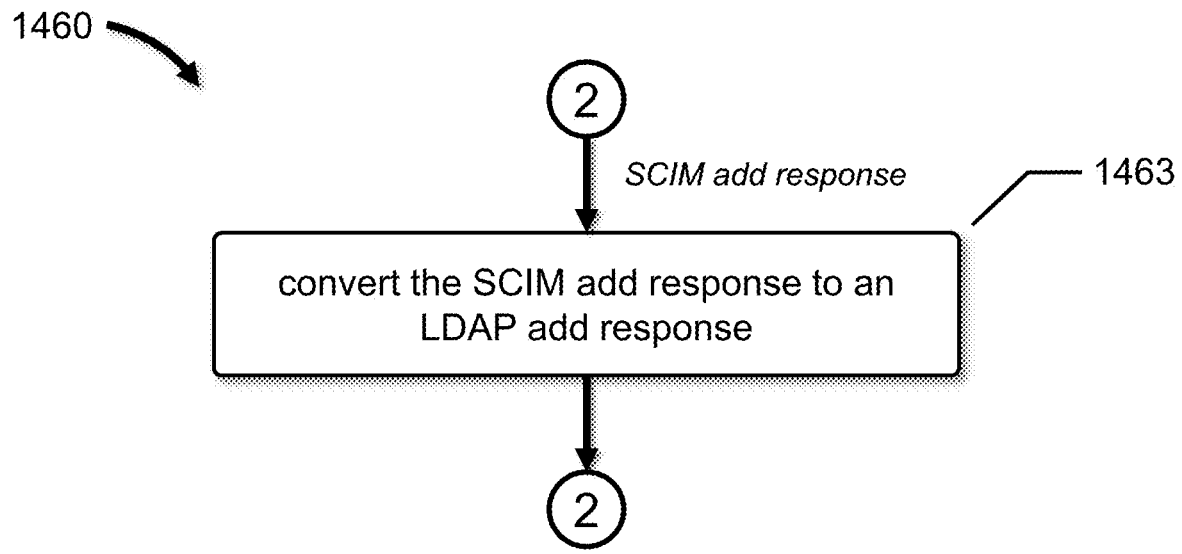

Referring to FIG. 14G, the Add handler translates (1460) the SCIM response into an LDAP response by converting (1463) the SCIM Add response into an LDAP Add response.

Table 1 presents a series of checks and corresponding actions performed by the Add handler.

TABLE 1

| Index | Check | Action |
|---|---|---|
| 1 | If the baseDN mentioned in LDAP Add request does not contain User RDn or Role RDn. | "Operation unwilling to perform" result is returned. |
| 2 | If baseDN does not contain RDns as defined in entity configuration file for Users and Roles | "no such object" result is returned. |
| 3 | If the add request includes an attribute which is not defined in LDAP to SCIM attribute mapping | "undefined attribute type" result is returned. |
| 4 | If the baseDN defined in search is not a proper LDAP Dn | "invalid DN syntax" result is returned. |
| 5 | If requestor does not have rights to add an entry | "insufficient access rights" result is returned. |
| 6 | If the baseDN contains user RDn and if objectclasses does not contain user objectclasses. | "operation not supported" result is returned. |
| 7 | If the baseDN contains groupSearchBase Dn and if objectclasses does not contain group objectclasses. | "operation not supported" result is returned. |

Table 2 presents a mapping of SCIM responses to LDAP results for the Add Operation.

TABLE 2

| Index | SCIM Response | LDAP Result |
|---|---|---|
| 1 | If the entry to be added does not contain a mandatory attribute required to create entry in SCIM server | "object class violation" result is returned telling which mandatory attribute is missing. |
| 2 | If the entry already exists in the SCIM server | "entry already exists" result is returned. |
| 3 | If the add request includes an attribute with a value that does not comply with the SCIM syntax constraints (Http status 400 with scimType invalidSyntax) | "invalid attribute syntax" result is returned. |
| 4 | If the add operation was processed successfully (Http status 201) | "success" result is returned. |

The Modify handler maps LDAP Modify requests to SCIM Modify requests, and converts the SCIM responses to LDAP results. The DN of the entry to be modified is analyzed to determine whether the entry is a User or Group based on the type of container that is defined. The DN value is "scraped off" to recover the entry name from the first RDn attribute. A SCIM GET call is performed on /Users or /Groups, depending on whether the resource is a User resource or Group resource, with the filter <SCIM attribute corresponding to first LDAP RDn present in Modify request's DN>=<Value>. The SCIM GET call returns the "id" of the SCIM entry. All attributes of the User/Group present in the LDAP Modify request are mapped to corresponding SCIM attributes. A SCIM REST PATCH request is constructed, by appending the "id" on the SCIM endpoint for /Users or /Groups, respectively, and sent to the IDCS SCIM server. In certain embodiments, the IDCS Client library may be used for constructing SCIM request.

Referring to FIG. 14D, the Modify handler translates (1420) the LDAP request into a SCIM request, according to an embodiment of the present invention. For each LDAP attribute, the Modify handler determines (1422) a corresponding SCIM attribute based on an LDAP attribute to SCIM attribute mapping table. The Modify handler then converts (1428) the LDAP Modify request into a SCIM modify request that includes a REST patch operation performed on /Users or /Groups.

Figure 14H:
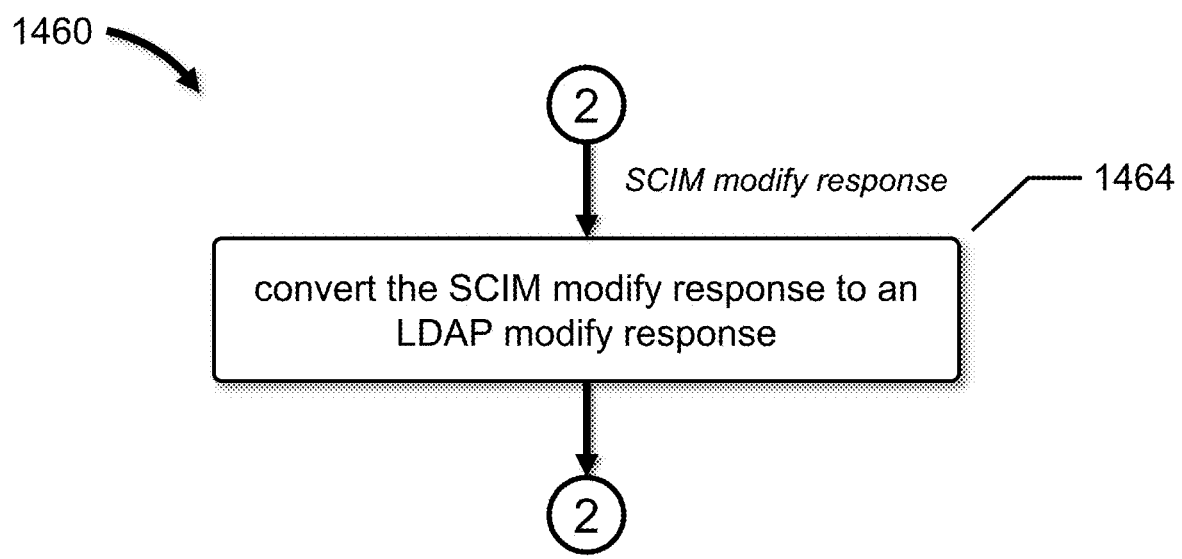
Figure 14I:
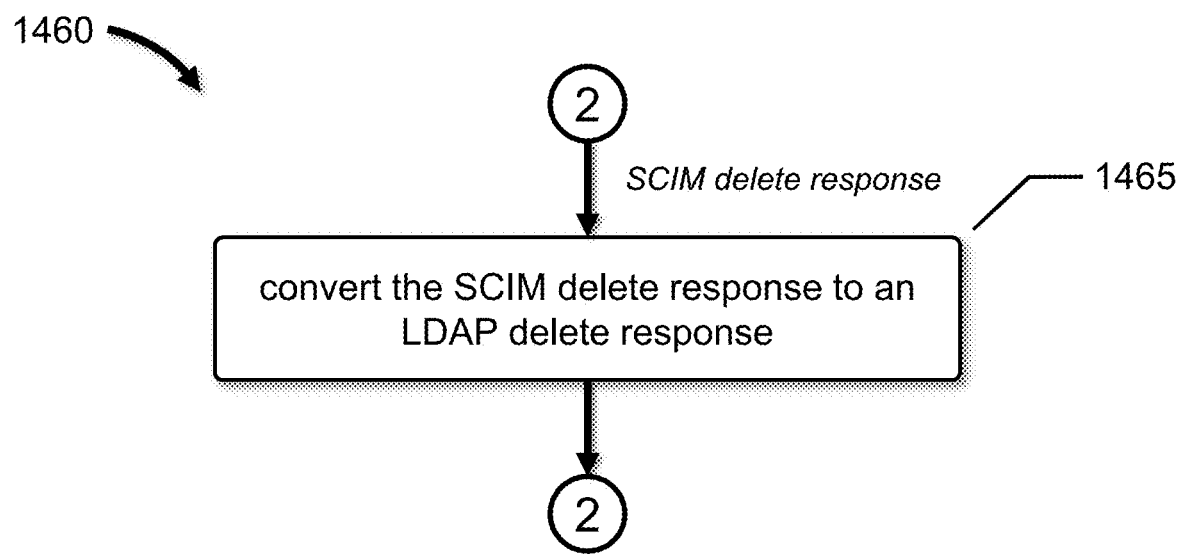

Referring to FIG. 14H, the Modify handler translates (1460) the SCIM response into an LDAP response by converting (1464) the SCIM Add response into an LDAP Add response.

Table 3 presents a series of checks and corresponding actions performed by the Modify handler.

TABLE 3

| Index | Check | Action |
|---|---|---|
| 1 | If baseDN does not contain either user RDN or group RDN | "Operation unwilling to perform" result is returned. |
| 2 | If the modify request attempts to target an attribute type that is not defined in LDAP to SCIM attribute mapping | "Undefined attribute type" result is returned. |
| 3 | If the baseDN defined in LDAP Modify request is not a proper LDAP Dn | "Invalid DN syntax" result is returned. |
| 4 | If requestor does not have rights to modify an entry | "Insufficient access rights" result is returned. |

Table 4 presents a mapping of SCIM responses to LDAP results for the Modify operation.

TABLE 4

| Index | SCIM Response | LDAP Result |
|---|---|---|
| 1 | If the modify includes an attribute with a value that does not comply with the SCIM attribute syntax constraints (Https Status 400 with invalidValue message) | "Invalid attribute syntax" result is returned. |
| 2 | If the modify requests attempts to change the value of an immutable SCIM attribute (Http status code 400 with mutable exception message) | "Operation not supported" result is returned. |
| 3 | If the modify operation was processed successfully (Http status 200) | "Success" result is returned. |

The Delete handler maps LDAP Delete requests to SCIM Delete requests, and converts the SCIM responses to LDAP results. The DN value is "scraped off" to recover the entry name from the first RDn attribute. A SCIM GET call is performed on the /Users or /Groups REST endpoint, depending on whether the User or Group RDn is present, with the filter <SCIM attribute corresponding to LDAP RDn>=<Value>. The SCIM GET call returns the "id" of the SCIM entry. A SCIM REST Delete request is constructed, and sent on the SCIM endpoint for /Users or /Groups by appending the "id" of the SCIM entry in the resource path. In certain embodiments, the IDCS Client library may be used for constructing SCIM Delete request.

Referring to FIG. 14E, the Delete handler translates (1420) the LDAP request into a SCIM request, according to an embodiment of the present invention. For each LDAP attribute, the Delete handler determines (1422) a corresponding SCIM attribute based on an LDAP attribute to SCIM attribute mapping table. The Delete handler then converts (1429) the LDAP Delete request into a SCIM delete request that includes a REST delete operation performed on /Users or /Roles .

Referring to FIG. 14H, the Delete handler translates (1460) the SCIM response into an LDAP response by converting (1465) the SCIM Delete response into an LDAP Delete response.

Table 5 presents a series of checks and corresponding actions performed by the Delete handler.

TABLE 5

| Index | Check | Action |
|---|---|---|
| 1 | If baseDN mentioned in LDAP Delete request does not contain either user RDN or group RDN | "Operation unwilling to perform" result is returned. |
| 2 | If the specified DN is malformed | "invalid DN syntax" result is returned. |
| 3 | If the requester does not have permission to perform the delete operation | "insufficient access rights" result result is returned. |

Table 6 presents a mapping of SCIM responses to LDAP results for the Delete operation.

TABLE 6

| Index | SCIM Response | LDAP Result |
|---|---|---|
| 1 | If LDAPDelete is done on a DN that does not returns any "id" value when SCIM GET call is done with the required filter. | "no such object" result is returned. |
| 2 | If the SCIM delete operation completes successfully and the entry is removed (Http status 204) | "success" result is returned. |

Figure 15:
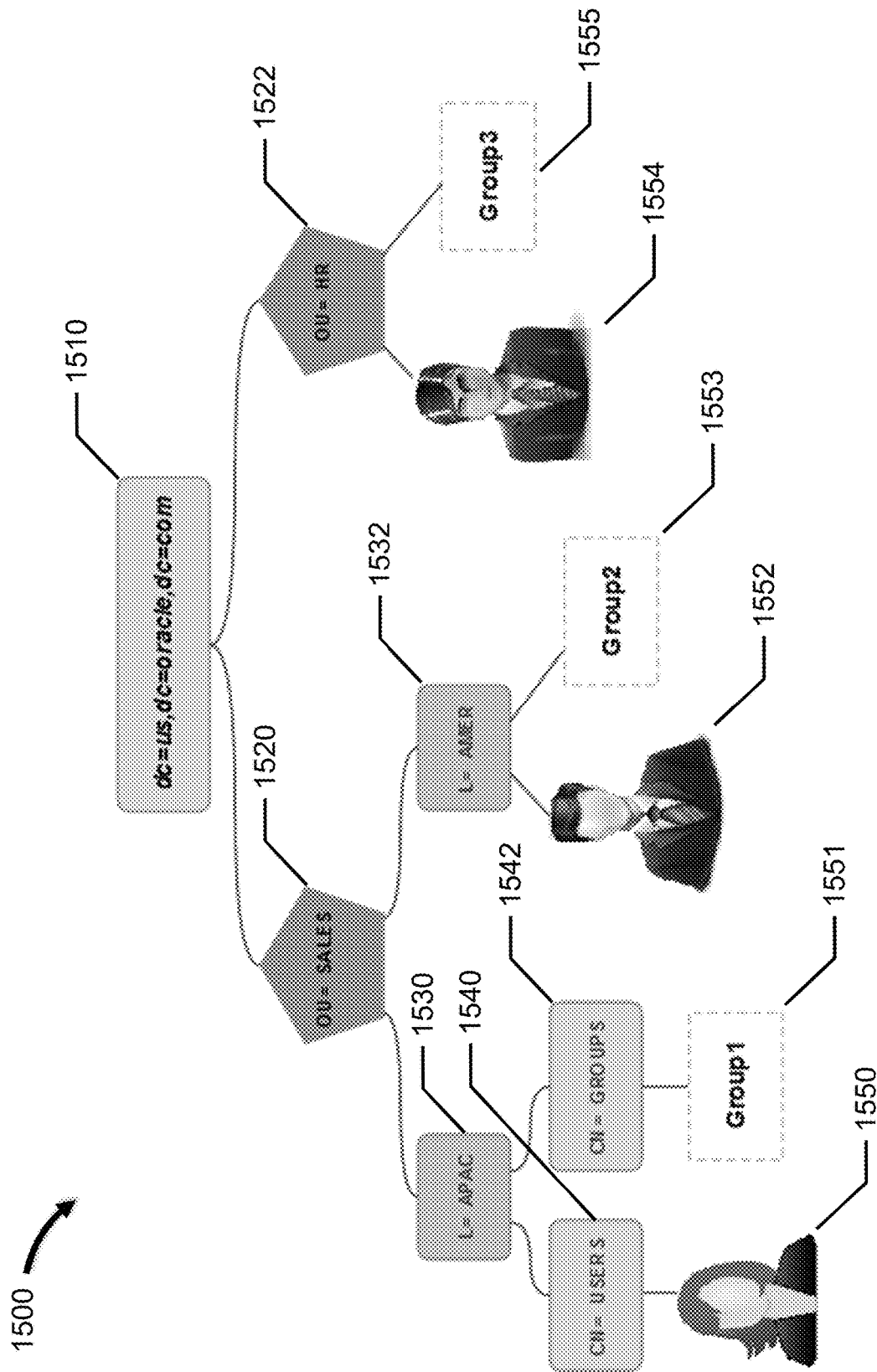
FIG. 15 presents a diagram of an on-premises LDAP backend, in accordance with an embodiment of the present invention.

FIG. 15 presents a diagram 1500 of an on-premises LDAP backend configuration, in accordance with an embodiment of the present invention. In this example, three domain components ("dc") 1510 are specified, i.e., "us," "oracle," and "com." Two organizational units ("ou") 1520, 1522 are specified, i.e., "SALES" and "HR." Under the "SALES" organizational unit, two locations ("l") 1530, 1532 are specified, i.e., "APAC," and "AMER," and under the "APAC" location, two common names ("cn") 1540, 1542 are specified, i.e., "USERS," and "GROUPS." Under cn 1540, a user 1550 is depicted, while under cn 1542, a "Group 1" 1551 is depicted. Under cn 1542, a 1552 and a "Group 2" 1553 are depicted. Under ou 1522, a user 1554 and a "Group 2" 1555 are depicted.

Figure 16A:
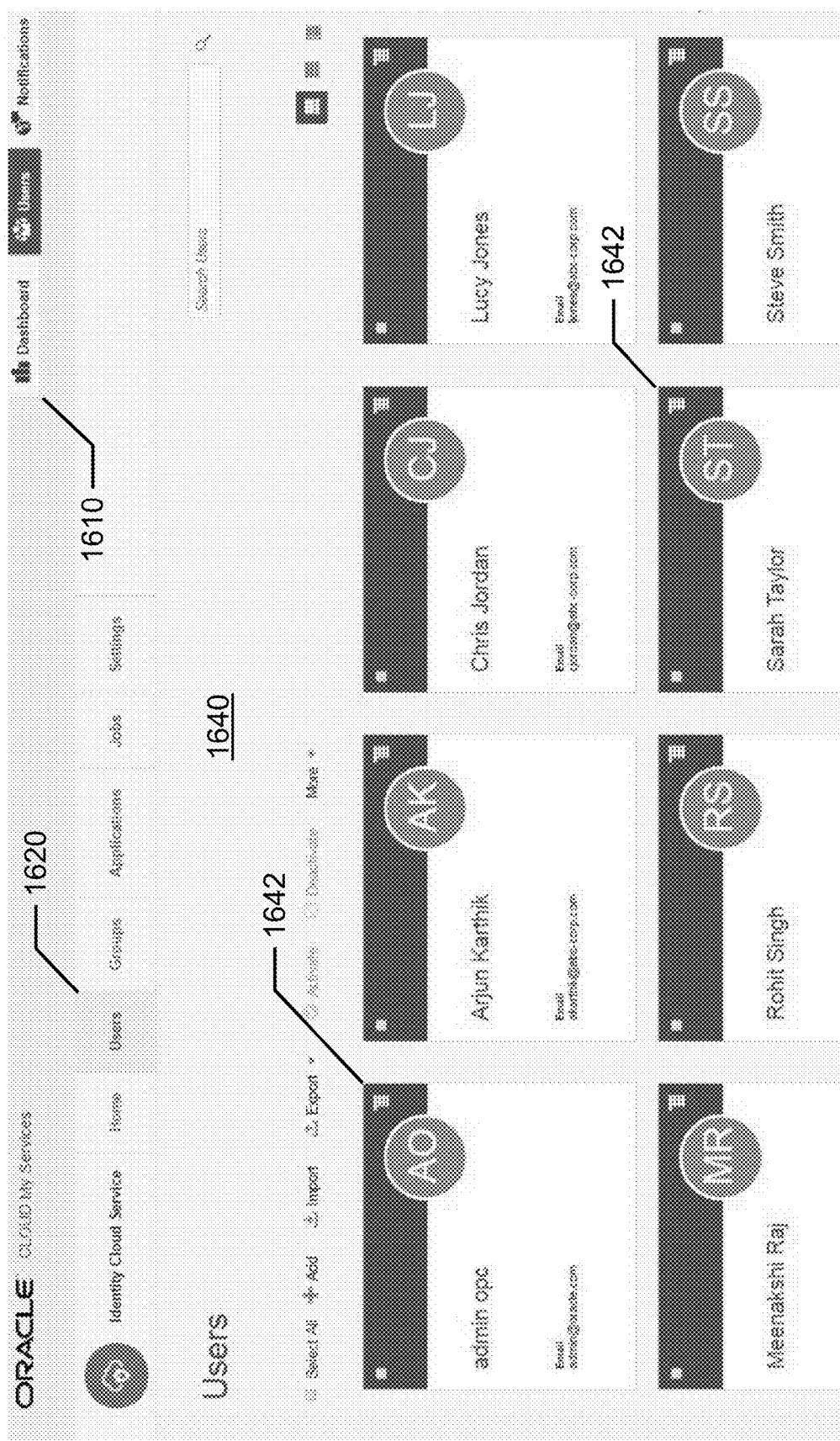
FIGS. 16A, 16B and 16C present a graphical user interface for an IDCS administrator console, in accordance with an embodiment of the present invention.

FIG. 16A presents a graphical user interface for an IDCS administrator console 1600, in accordance with an embodiment of the present invention. IDCS administrator console 1600 is displayed after an administrator logs in to the IDCS using a standard login screen (not shown). Top panel 1610 allows the administrator to view the Dashboard, Users and Notifications. Selection of "Users" icon 1620 displays "Users" page 1640, which displays information for all of the users within a particular identity domain, or tenancy, including the administrator (i.e., administrator information 1640). For example, the information for user "Sarah Taylor" 1642 may be displayed.

Figure 16B:
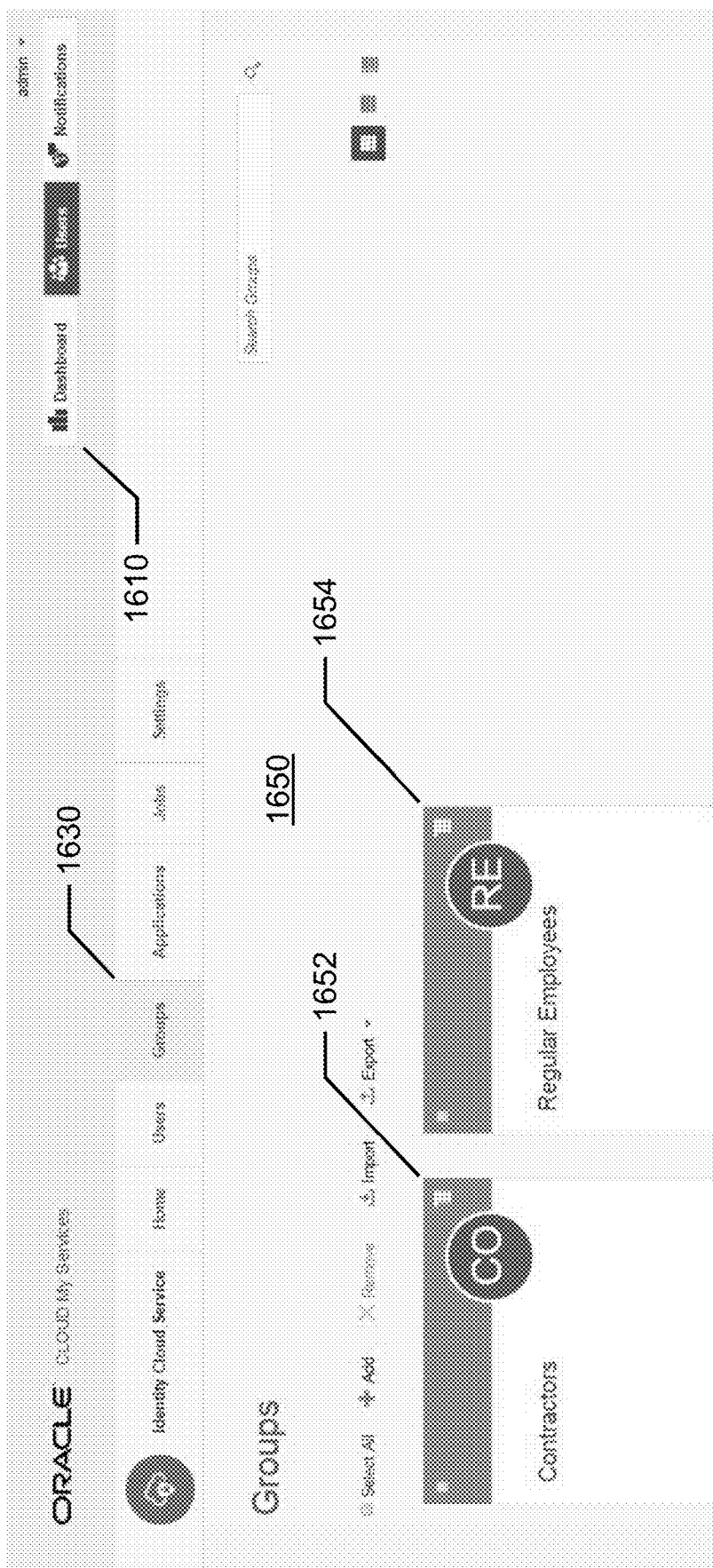

FIG. 16B presents IDCS administrator console 1600, in accordance with an embodiment of the present invention. Selection of "Groups" icon 1630 displays "Groups" page 1650, which displays the groups within a particular identity domain, or tenancy, such as the "Contractors" group 1652 and the "Regular Employees" group 1654.

Figure 16C:
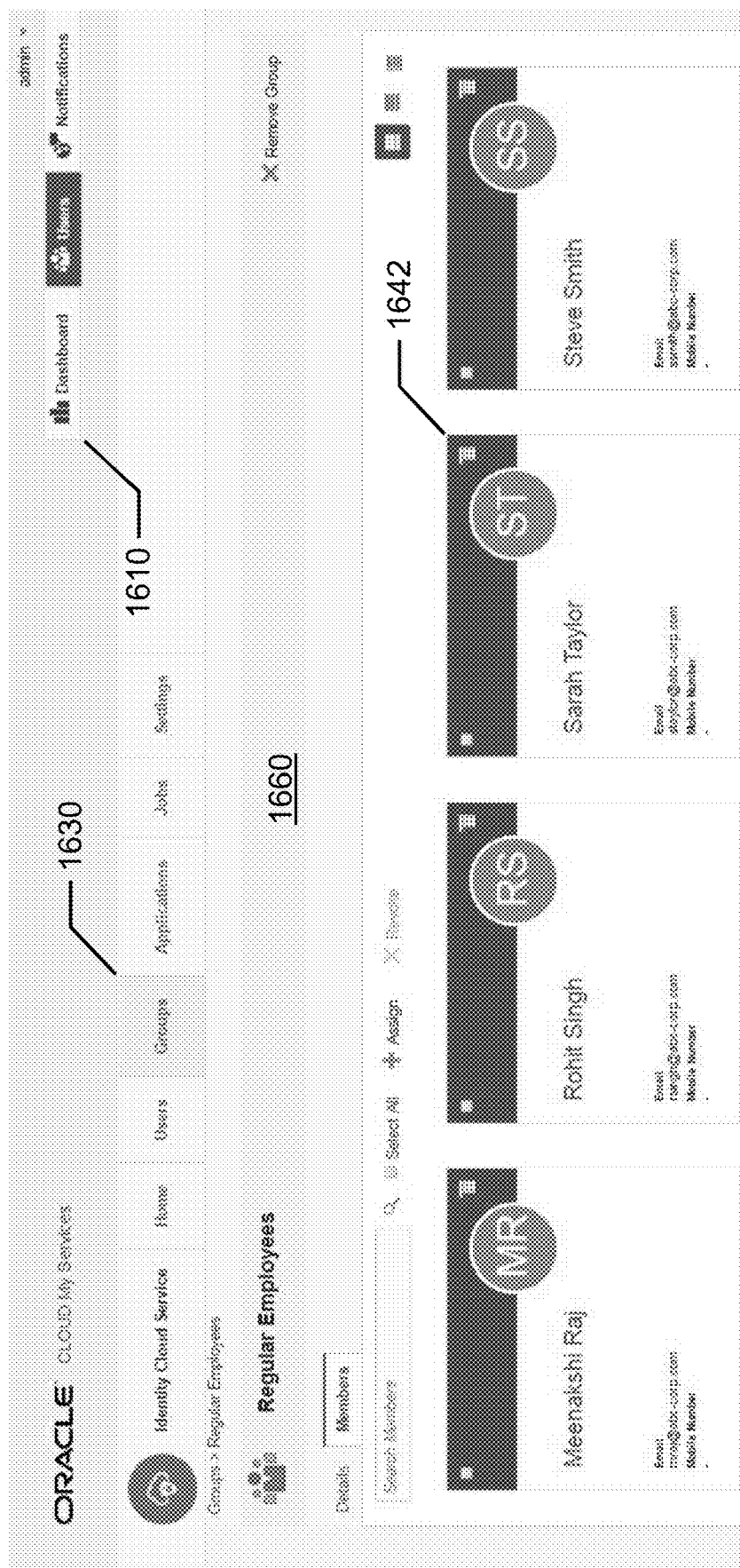

FIG. 16C presents IDCS administrator console 1600, in accordance with an embodiment of the present invention. Selection of "Regular Employees" icon 1642 displays "Regular Employees" page 1660, which displays all of the members of this group. For example, the information for user "Sarah Taylor" 1642 may be displayed.

Virtual Directory System for LDAP to SCIM Proxy Service

Generally, each entry in an LDAP directory information tree ("DIT") includes at least certain kinds of information, e.g., a distinguished name ("DN") and several attribute-value pairs. The DN uniquely identifies the entry in the DIT, and provides its position within the hierarchy. Each LDAP attribute-value pair includes an attribute name and one or more values. The DN for each entry includes at least one relative distinguished name ("RDN"), except for the root DSE (DSA-specific entry). The root DSE provides general information about the LDAP server, and has a null DN, i.e., a DN with zero RDNs, represented as an empty string. Each RDN includes at least one attribute-value pair, such as, for example, "uid=mraj," etc., and the order of the RDNs specifies the position of the entry within the DIT, such as, for example, "uid=mraj,l=apac,cn=users,dc=oracle,dc=com," where the right-most RDN specifies the level in the hierarchy that is closest to the root. Attributes may include, for example, "dc" for domain component, "ou" for organizational unit, "l" for location, "cn" for common name, "uid" for user id, etc.

Figure 17:
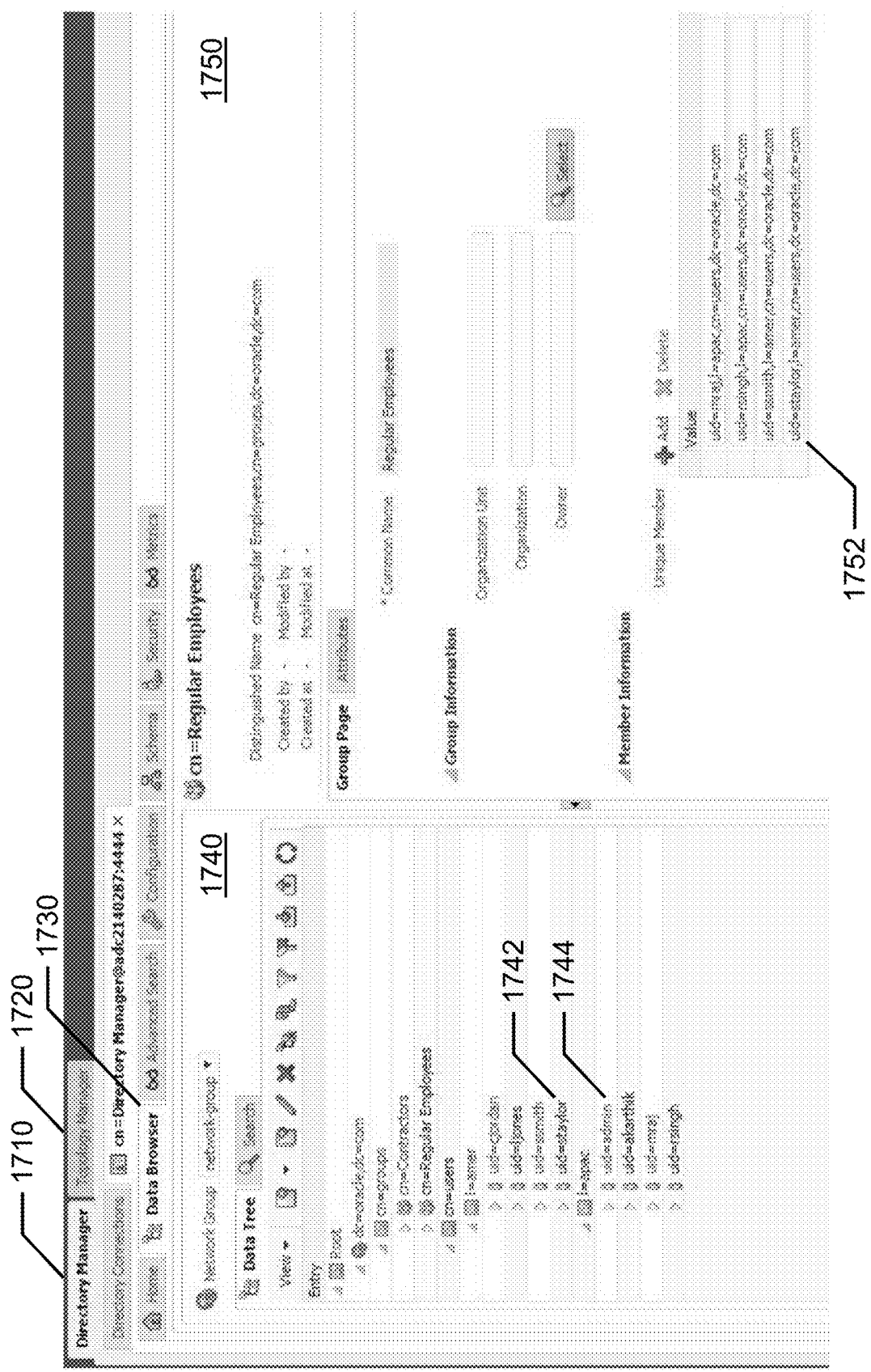
FIG. 17 presents a graphical user interface for a directory services manager application, in accordance with an embodiment of the present invention.
Figure 18A:
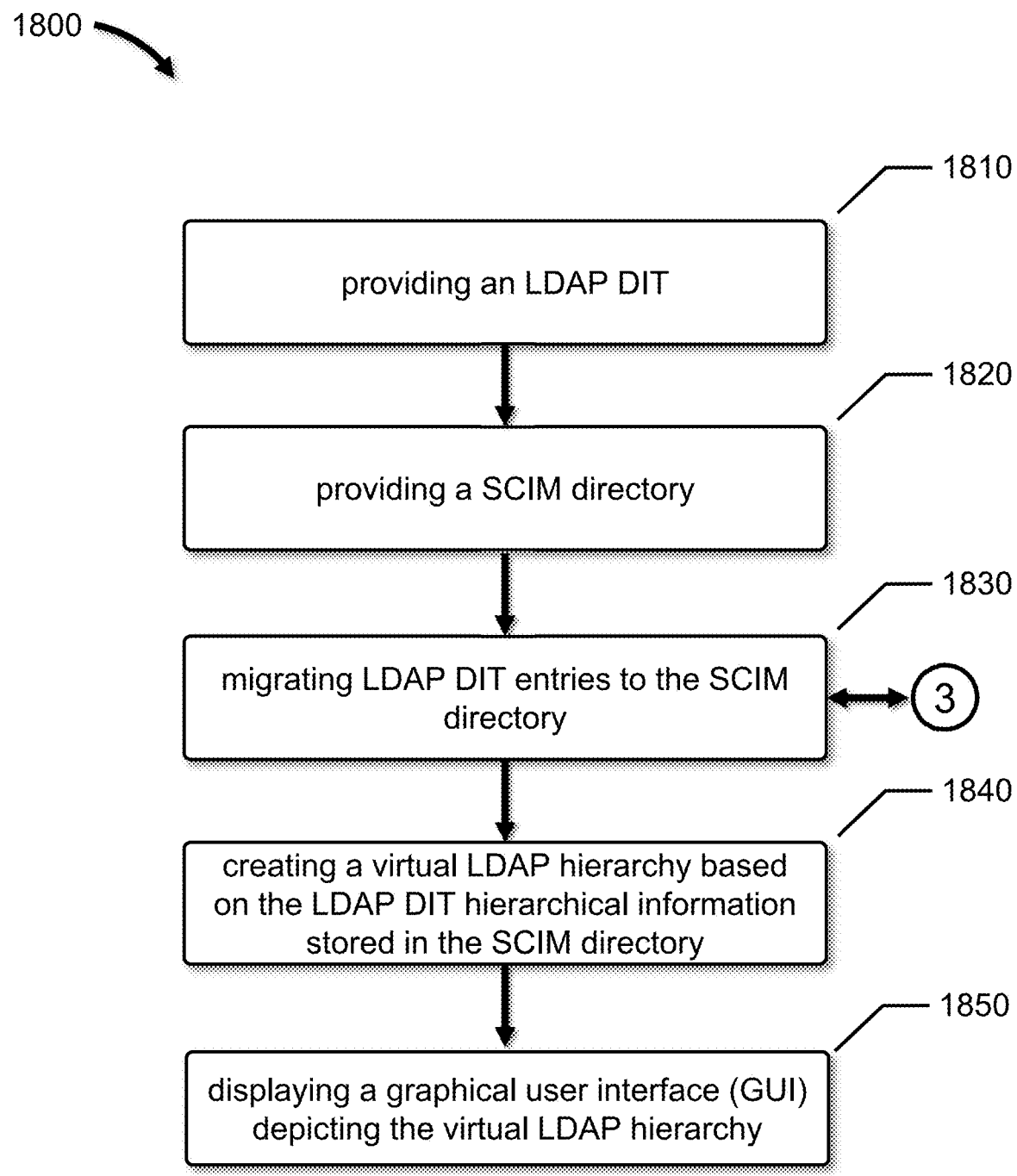
FIGS. 18A to 18E present a method for providing an on-premises virtual directory system, in accordance with embodiments of the present invention.
Figure 18B:
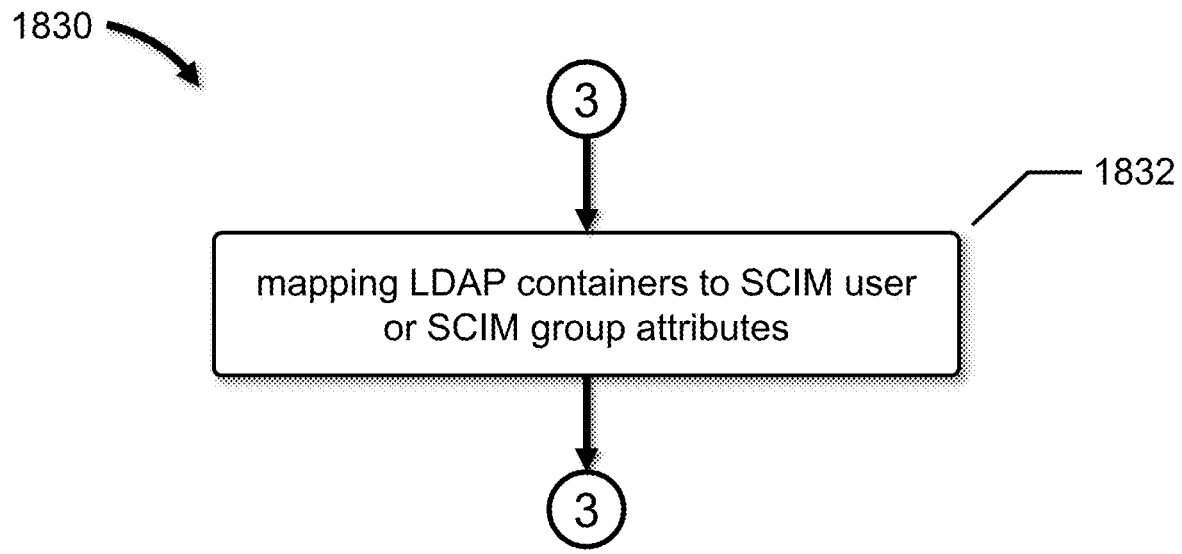
Figure 18C:
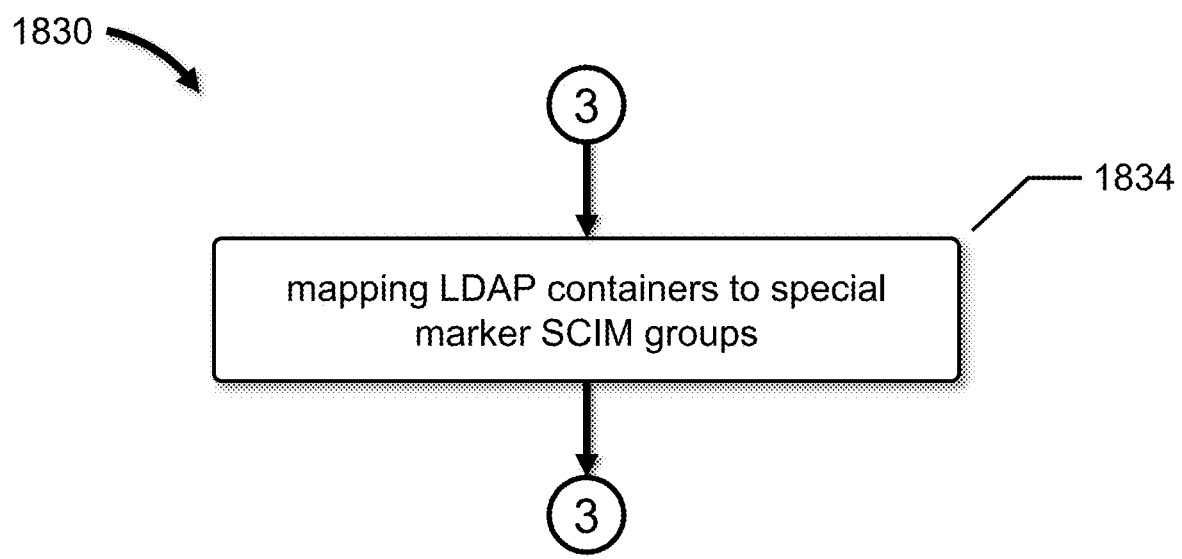
Figure 18D:
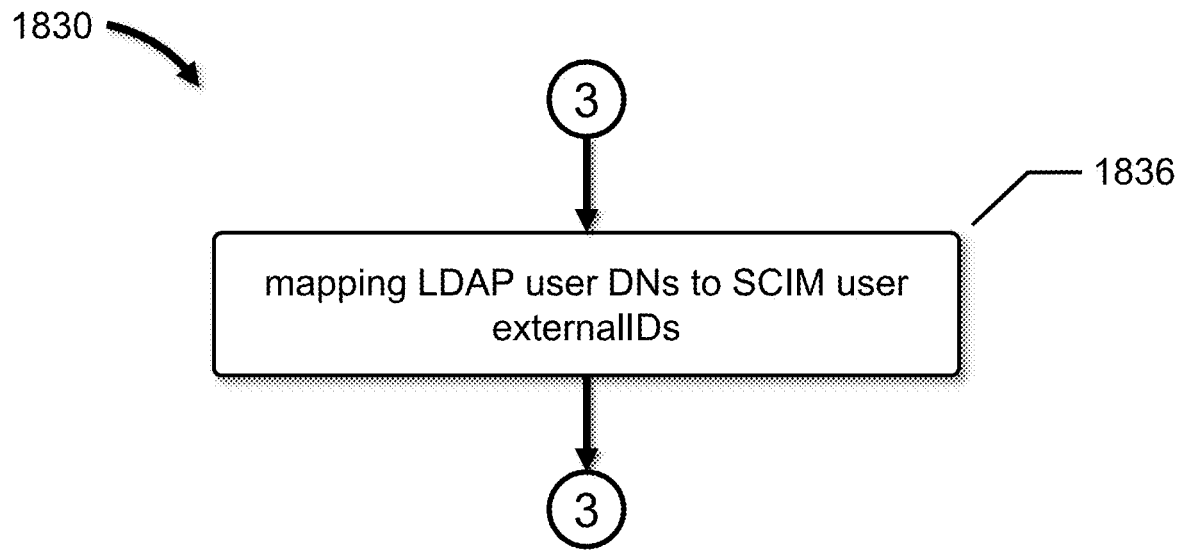
Figure 18E:
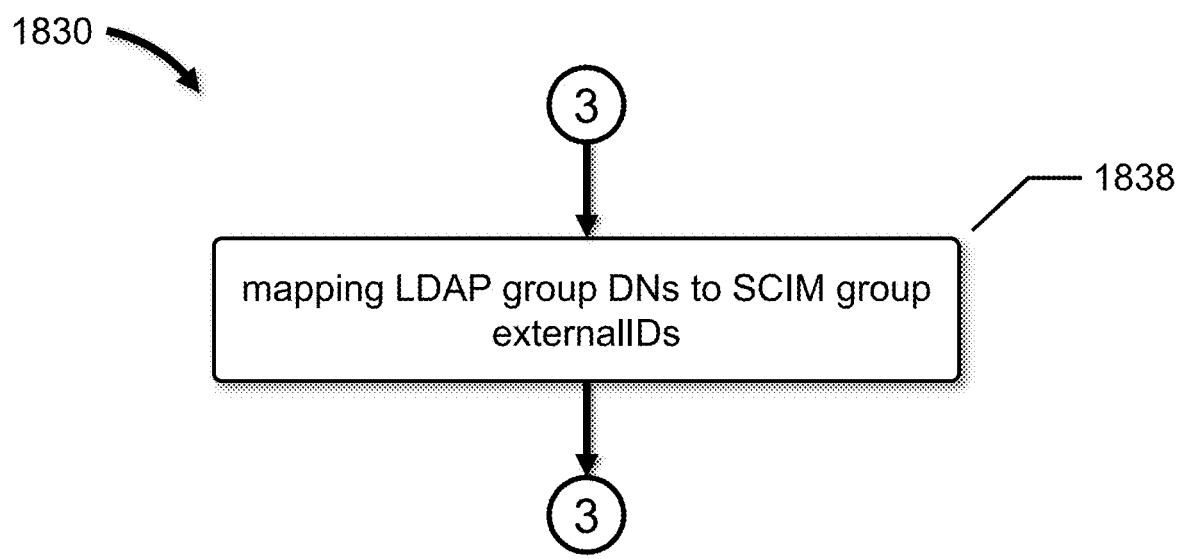

FIG. 17 presents a graphical user interface for a directory services manager application 1700, in accordance with an embodiment of the present invention. The directory services manager application includes a directory manager tab 1710 and a topology manager tab 1720. The directory manager includes a data browser tab 1730 with data tree pane 1740 that depicts a virtual LDAP hierarchy for IDCS User/Group entries. For example, the administrator and user Sarah Taylor are depicted as tree entries 1742 and 1744, respectively. The directory manager communicates with Cloud Cache in LDAP, and Cloud Cache in turn communicates to IDCS in SCIM and fetches the User/Group entries and reconstructs the hierarchy information associated with them. The details of the group whose CN is "Regular Employees" are depicted in group pane 1750. For example, the group information for user Sarah Taylor is depicted as table entry 1752.

In many embodiments, the LDAP to SCIM proxy service 1322 includes a client-side virtual directory system with caching ability that allows on-premises LDAP-based applications to interact with the cloud-based SCIM server by performing the LDAP to SCIM protocol conversion. The virtual directory system maps the LDAP tree-based hierarchy to the SCIM flat data model. In the hybrid scenario discussed above, the virtual directory system advantageously preserves the LDAP hierarchy after the identities have been migrated from the on-premises LDAP-based servers to the SCIM-based server in IDCS. For example, the virtual LDAP hierarchy depicted in data tree pane 1740 of FIG. 17 represents at least a portion of the virtual directory system.

In many embodiments, Cloud Cache provides the LDAP to SCIM proxy service 1322 with caching ability for on-premise LDAP-based applications. Cloud Cache provides LDAP to SCIM protocol conversion, and may be installed as an on-premise directory server. Cloud Cache will receive LDAP requests on an LDAP listener port, and will perform LDAP basic encoding rules ("BER") protocol encoding/decoding as an on-premise enterprise server. Cloud Cache may communicate with the SCIM server using a privileged account, such as, for example, an OAuth Client, and supports configurable attribute and object class mappings, search controls and filter mapping, error code mapping, and flattening of the LDAP tree hierarchy to match the flat SCIM structure, as discussed herein. Cloud Cache intelligently determines the type of SCIM resource (e.g., Users, Groups) to consider based on object classes specified in a search request filter and the presence of User and Group containers. Advantageously, Cloud Cache may scale based on LDAP load, and may cache LDAP data on-premise in order to avoid multiple requests to the SCIM server. An end user may define global access control lists ("ACLs"). For a particular bind user, Cloud Cache evaluates all global ACLs and returns responses.

In certain embodiments, only "User," "Group" and "PasswordPolicy" resources are supported by the LDAP to SCIM proxy service 1322.

LDAP containers from the on-premise LDAP directory may be converted to User/Group attributes of the SCIM protocol, and Users/Groups in the on premise LDAP directory are retained in the SCIM directory, as discussed in more detail herein.

In certain embodiments, a custom plugin/WFE intercepts incoming LDAP requests and outgoing responses and flattens the LDAP tree to match the SCIM structure. Multi-level hierarchy under the user searchbase is supported. This plugin also converts LDAP to SCIM protocol, maps LDAP to SCIM attribute/object class, and may record all Cloud Cache monitoring information in the backend.

REST interfaces may be used for communicating monitoring data to the cloud. For example, a scheduler job may use a MonitorData/Log handler to fetch the monitoring data (that was stored by Monitoring plugin/WFE) and send the info to an appropriate IDCS server at regular intervals. An Outbound HTTP connection from the scheduled task to an appropriate IDCS server may be used for sending monitoring information.

In many embodiments, the functionality of the LDAP to SCIM proxy service 1322 depends, at least in part, on how entries are migrated from the hierarchical on-premises LDAP directory server to the IDCS SCIM server. While users in the on-premise LDAP directory server might be present under several containers and at different hierarchical levels, when these users are migrated to the IDCS SCIM server, they will be present only under the /Users REST endpoint.

In a first embodiment, LDAP containers may be stored as attributes of an IDCS SCIM server entry. For example, if an LDAP user was present in an LDAP directory under an "ou=Sales" container, then, after migration, the "ou" attribute of the SCIM user is populated with the value "Sales" after migration. This approach relies on User and Group schema extensions and a complex DN re-construction rule that is specified in order to build back the DN from User/Group attributes at runtime.

In a second embodiment, LDAP containers may be mapped to new IDCS SCIM groups, and all of the SCIM users or role entries of the directory server become members of those groups. For example, if an LDAP user was present in an LDAP directory under an "ou=Sales" container, then, after migration, a new IDCS SCIM "Sales" group is created and that corresponding SCIM user is made a member of the "Sales" group. In certain embodiments, LDAP containers may be mapped to special marker IDCS SCIM groups, and all of the SCIM users or role entries of the directory server become members of those groups. These IDCS groups may be appropriately marked to distinguish them from generic IDCS groups.

In a third embodiment, the DN values of the LDAP entries may be mapped to an externalID attribute of a SCIM entry during migration. For example, if an LDAP user entry in an LDAP directory included "DN: uid=user1, ou=Sales, dc=com," then, after migration, the SCIM user's externalID attribute will have the value "uid=user1, ou=Sales, dc=com." Advantageously, the third embodiment does not increase the complexity of the IDCS SCIM server schema because hierarchy information is simply stored in the externalID attribute of the DN value of an entry. Alternatively, the DN values of the LDAP entries may be mapped to a custom attribute in Users/Groups.

In a fourth embodiment, all entries (Users/Groups/etc.) have a footprint created in a new SCIM resource that uses relevant position markers to reconstruct their exact position (or DN) in the LDAP Hierarchy.

In certain embodiments, a Virtual Directory server may be configured for smooth processing of LDAP requests. This typically includes a List of ObjectClasses that are required to identify a user entry, such as, for example, inetorgperson, organizationperson, and person, a list of ObjectClasses required to identify a group entry, such as, for example, groupOfUniqueNames, a Realm, which is the root DN of a subtree in Client's LDAP Directory on which a client application will perform LDAP operations, such as, for example, "ou=Sales, dc=com," and an EntryStructure that has a value of HIERARCHY or FLAT. The HIERARCHY value indicates that Cloud Cache will evaluate and rebuild the hierarchy for IDCS entries. The FLAT value indicates that Cloud Cache will not support the hierarchy, and will return all entries as if they were under the same container.

FIGS. 18A to 18E present a method 1800 for providing an on-premises virtual directory system, in accordance with embodiments of the present invention.

An LDAP Directory Information Tree (DIT) is provided (1810). The LDAP DIT includes a plurality of entries that describe LDAP containers, LDAP users and LDAP groups, and each entry includes a Distinguished Name (DN) and a plurality of LDAP attribute-value pairs. The DN provides LDAP DIT hierarchical information that uniquely identifies the entry and describes a hierarchical position of the entry in the LDAP DIT, and includes a plurality of attribute-value pairs. Each LDAP attribute-value pair includes an attribute name and one or more attribute values.

A SCIM directory is provided (1820). The SCIM directory includes a plurality of SCIM resource entries that describe SCIM users and SCIM groups. Each SCIM resource entry includes a plurality of attributes, and includes an externalID and a resource type identifying the SCIM resource entry as belonging to a User or a Group. Each SCIM attribute includes a name and one or more values.

The LDAP entries are migrated (1830) to the SCIM directory. Importantly, LDAP DIT hierarchy information for each LDAP DIT entry is preserved, i.e., stored, in the SCIM directory. When an LDAP Add or Modify operation occurs, the SCIM directory may be updated to reflect the new or modified LDAP DIT hierarchy information.

In one embodiment, LDAP containers are mapped (1832) to SCIM user or SCIM group attributes, as described above. For each LDAP user or LDAP group present in a particular LDAP container having an attribute name and an attribute value, a SCIM attribute is added to the corresponding SCIM user or SCIM group based on the attribute name and the attribute value. For example, the attribute name may be "ou," and the attribute value may be "sales."

In another embodiment, LDAP containers are mapped to special marker SCIM groups. For each LDAP user present in a first LDAP container having an attribute name and an attribute value, a new SCIM group is created (1834) based on the attribute name and attribute value, and the corresponding SCIM user is added to the new SCIM group. For example, the attribute name may be "ou," and the attribute value may be "sales."

In a further embodiment, LDAP user DNs are mapped (1836) to SCIM user externalIDs, as described above. For each LDAP user, the corresponding SCIM user externalID is set to the DN of the LDAP user. For example, the DN may be "uid=user1, ou=Sales, dc=com."

In another further embodiment, LDAP group DNs are mapped (1838) to SCIM group externalIDs, as described above. For each LDAP group, the corresponding SCIM group externalID is set to the DN of the LDAP group. For example, the DN may be "cn=groups, l=apac, ou=Sales, dc=com."

The SCIM directory is queried, and a virtual LDAP hierarchy is created (1840) based on the LDAP DIT information stored in the SCIM directory.

A graphical user interface (GUI) for a directory services application may be displayed (1850) that includes a data tree pane 1740 that depicts the virtual LDAP hierarchy.

Hierarchical Processing of LDAP Operations Against a SCIM Directory via Lexicon Syntactic Pattern Analysis for a Virtual Directory System Embodiments of the present invention advantageously provide a method for analyzing and evaluating LDAP operations, such as, for example, add, delete, modify, search, etc., that are performed against the SCIM directory in which the SCIM resources have LDAP distinguished names stored in their respective externalIDs. As discussed above, the distinguished name ("dn") attribute value of an LDAP DIT entry contains the names of all the parent containers in an appropriate sequence in a single string. This value is appropriately parsed and syntactically analyzed to extract the LDAP hierarchical placement of the respective SCIM entry in the SCIM directory. Thus, LDAP requests containing LDAP hierarchy constraints are processed correctly against the SCIM directory, and the required LDAP response is properly constructed and returned.

Figure 19:
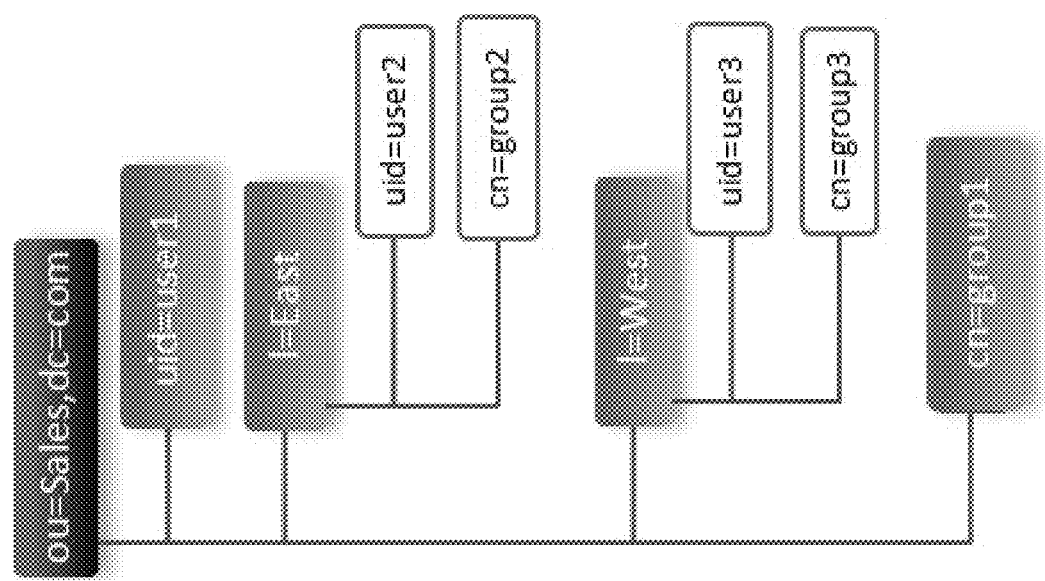
FIG. 19 presents an LDAP tree structure, in accordance with an embodiment of the present invention.

FIG. 19 presents an LDAP tree structure 1900, in accordance with an embodiment of the present invention. In this example, one domain component ("dc"), i.e., "com," and one organizational unit ("ou"), i.e., "Sales," are specified. Under the "Sales" organizational unit, a user identifier ("uid"), i.e., "user1, " two locations ("l"), i.e., "East" and "West," and one common name ("cn"), i.e., "group1, " are specified.

Generally, an LDAP search retrieves information about all of the objects within a specified scope that have certain characteristics. A search scope and a search base are always specified, and an optional filter may also be included in the search. The search base generally defines the location (i.e., the base object) in the LDAP directory from which the LDAP search begins, and the search scope defines the depth of the search within the search base. More particularly, the search base specifies the distinguished name ("dn") of the base object, and the search scope may be "Base," which specifies a search of the base object only, "One Level," which specifies a search of objects immediately subordinate to the base object but does not include the base object, or "Subtree," which specifies a search of the base object and the entire subtree that depends from the distinguished name of the base object. The optional filter allows certain entries in the subtree and excludes others. Several exemplary searches of the LDAP tree structure 1900 follow.

LDAP SEARCH OPERATION—1st EXAMPLE

In a first search example, the scope is "Base," the searchBaseDN is "uid=user2, l=East,ou=Sales,dc=com," and the filter is "& (objectclass=inetorgperson) (sn=test)."

First, a check is performed to determine whether the baseDN specified in the search request contains the REALM. If yes, then the search request is processed further; if no, then an error is identified. In one embodiment, LDAP searches operate only on a DN that is equal to, or is a child to, the REALM DN.

The LDAP filter in the search request is then analyzed to see if (objectclass=<user_object_class>) is present. If yes, the search is issued on the /Users endpoint. Similarly, if the filter contains (objectclass=<group_object_class>), then a search request will be issued on the /Groups endpoint. If the search request contains neither, then the search request will be made on both the /Users and /Groups endpoints. Accordingly, for this search request, a GET will issue on the /Users endpoint.

In a "SEARCH1" example, the original LDAP filter in the LDAP Search request is modified as follows: <Original_Filter is converted to a SCIM Filter, and all the expressions that contain the objectClass attribute are removed> and externalID eq <DN as mentioned in the search baseDN>. Accordingly, for the $1^{st}$ example, the SCIM search query is: SCIM Filter ->" name.familyName eq test and externalID eq uid=user2, l=East,ou=Sales,dc=com."

As noted above, when entries are created in the IDCS SCIM directory after migration, the externalID value is populated to preserve the LDAP hierarchy. A customer might decide not to maintain hierarchy information for new entries created in the SCIM directory. Accordingly, these users or groups should also be returned by the search. To meet this case, along with a search with above filter, another search may be done.

In a "SEARCH2" example, the original LDAP filter in search request is modified as follows: <Original_Filter is converted to a SCIM filter, and all the expressions that contain the objectClass attribute are removed> and <SCIM attribute corresponding to first RDN of searchBaseDN > eq <value of the first RDN of searchBaseDN> and not externalID pr. For this example, it will be "name.familyName eq test and username eq user2 and not (externalID pr)" where 'pr' is the present operator.

LDAP SEARCH OPERATION—$2^{nd}$ EXAMPLE

In a second search example, the scope is "One Level," the searchBaseDN is "ou=Sales,dc=com," and the filter is "(objectclass=*)."

First, a check is performed to determine whether the baseDN specified in the search request contains the REALM. If yes, then the search request is processed further; if no, then error is indicated.

The LDAP filter in the search request is then analyzed to see if (objectclass=<user_object_class>) is present. If yes, the search is issued on the/Users endpoint. Similarly, if the filter contains (objectclass=<group_object_class>), then a search request will be issued on the/Groups endpoint. If the search request contains neither, then the search request will be made on both the /Users and /Groups endpoints. Accordingly, for this search request, a GET will issue on both the /Users and /Groups endpoints.

In a "SEARCH1 " example, the original LDAP filter present in search request is modified as follows: <Original_Filter is converted to a SCIM Filter, and all the expressions that contain the objectClass attribute are removed> and externalID co <DN as mentioned in the search baseDN> where the operator 'co' means contains. Accordingly, for this example, the SCIM search query is: SCIM Filter->"externalID co ou=Sales,dc=com". The search will return entries with the following externalIDs:
 uid=user1, ou=Sales,dc=com
 cn=group1, ou=Sales,dc=com
 uid=user2, l=East,ou=Sales,dc=com
 cn=group2, l=East,ou=Sales,dc=com
 uid=user3, l=East,ou=Sales,dc=com
 cn=group3, l=East,ou=Sales,dc=com However, since this is a "One Level" LDAP search, only the following entries should be returned: uid=user1, ou=Sales,dc=com and cn=group1, ou=Sales,dc=com. Accordingly, the "One Level" search request includes an additional post processing step that is performed after the GET request has been issued. This post processing step scans externalID values of returned entries and allows only those entries to be specified in the response that have just one RDN=Value prefixed before searchBaseDN ("ou=Sales, dc=com").

In a "SEARCH2" example, for entries that are created after migration that do not have an externalID attribute populated, another search will be performed for them with the following filter: <Original_Filter is converted to a SCIM Filter, and all expressions that contain the objectClass attribute are removed> and not externalID pr. For this example, the search filter will be simply "not externalID pr." The original filter contained only object class expressions which are removed after analysis, so only the additional filter will be present.

LDAP SEARCH OPERATION—$3^{rd}$ EXAMPLE

In the third search example, the scope is "Subtree," the searchBaseDN is "L=East,ou=Sales,dc=com," and the filter is "(objectclass=*)."

First, a check is performed to determine whether the baseDN specified in the search request contains the REALM. If yes, then the search request is processed further; if no, then error is identified.

The LDAP filter in the search request is then analyzed to see if (objectclass=<user_object_class>) is present. If yes, the search is issued on the /Users endpoint. Similarly, if the filter contains (objectclass=<group_object_class>), then a search request will be issued on the /Groups endpoint. If the search request contains neither, then the search request will be made on both the /Users and /Groups endpoints. Accordingly, for this search request, a GET will issue on both the /Users and /Groups endpoints.

The original LDAP filter present in the search request is modified as follows: <Original_Filter is converted to a SCIM Filter, and all the expressions that contain the objectClass attribute are removed>and externalID co <DN as mentioned in the search baseDN> where the operator 'co' means contains. Accordingly, for this example, the SCIM search query is: SCIM Filter ->"externalID co l=East, ou=Sales, dc=com." The search will return entries with the following externalIDs:
 uid=user2, l=East,ou=Sales,dc=com
 cn=group2, l=East,ou=Sales,dc=com For a "Subtree" search, no post processing is required after issuing the SCIM GET request.

For entries that are created after migration that do not have an externalID attribute populated, another search will be performed with the following filter: <Original_Filter is converted to a SCIM Filter, and all expressions that contain the objectClass attribute are removed> and not externalID pr. For this example, the search filter will be simply "not externalID pr."

In certain embodiments, "One Level" or "Subtree" searches will return entries for which the externalID attribute has not been populated regardless of the specified searchBaseDN. The externalID attribute of an entry might not be populated for new entries that are created by the IDCS SCIM server after the old entries have been migrated from the on-premises LDAP server to the IDCS SCIM directory, or when it is desired not to maintain the hierarchy during migration. In these embodiments, when the externalID is not populated during or after migration, then the hierarchy information is lost.

If the value of EntryStructure, discussed above, is "HIERARCHY," only SEARCH1 will be performed. Similarly, if the value of EntryStructure is "FLAT," only SEARCH2 will be performed. And, if the value of EntryStructure is "BOTH" (e.g., the case when migrated entries have externalID value but new entries do not have any externalID value), SEARCH1 will be performed followed by SEARCH2. Objectclasses may be removed from the search filter because the IDCS SCIM server entries won't have objectclass attributes populated for them, and the objectclass iattribute n filter not needed once the REST endpoint to which the search request is issued is known.

These embodiments advantageously preserve hierarchy information, simplifying DN reconstruction of an entry (i.e., constructing LDAP response from SCIM response), do not require DN reconstruction rule to be defined, do not require dynamic extensions to IDCS User/Group schema as part of migration, and provide error free and efficient implementation (e.g., less round trips required with server) of LDAPSearch operations supporting all scopes, i.e., "Base," "One Level," and "Subtree."

FIGS. 20A to 20K present a method 2000 for hierarchical processing of LDAP operations against a SCIM directory, in accordance with embodiments of the present invention.

An LDAP Directory Information Tree (DIT) is provided (2010). The LDAP DIT includes a plurality of entries that describe LDAP containers, users and groups, and each entry includes a Distinguished Name (DN) and a plurality of LDAP attribute-value pairs. The DN provides LDAP DIT hierarchical information that uniquely identifies the entry and describes a hierarchical position of the entry in the LDAP DIT. Each LDAP attribute-value pair includes an attribute name and one or more attribute values.

A SCIM directory is provided (2020). The SCIM directory includes a plurality of SCIM resource entries that describe SCIM users and groups. Each SCIM resource entry includes a plurality of attributes, and includes an externalID and a resource type identifying the SCIM resource entry as belonging to a user or a group. Each SCIM attribute includes a name and one or more values.

The LDAP entries are migrated (2030) to the SCIM directory. Importantly, LDAP DIT hierarchy information for each LDAP DIT entry is preserved, i.e., stored in the SCIM directory. In certain embodiments, LDAP user DNs and group DNs are mapped to SCIM user externalIDs and group externalIDs, as described above. In other embodiments, SCIM user or group schema may be extended to introduce a new SCIM attribute where their corresponding DN values are stored. For each LDAP user or group, the corresponding SCIM user or group externalID is set to the DN of the LDAP user or group. For example, an LDAP user DN may be "uid=user1, ou=Sales, dc=com." When an LDAP add or modify operation occurs, the SCIM directory may be updated to reflect the new or modified LDAP DIT hierarchy information, as discussed below.

An LDAP operation request is received (2035) from an LDAP-based application over the network. The LDAP operation request may be an LDAP Add request, an LDAP Delete request, an LDAP Modify request, an LDAP Search request, an LDAP Bind DN operation request, an LDAP modify DN operation request, etc.

The LDAP operation request is processed (2040).

The LDAP operation response is then returned (2090) to the LDAP-based application over the network. For an LDAP Add request, an LDAP Add response is sent to the LDAP-based application over the network. For an LDAP Delete request, an LDAP Delete response is sent to the LDAP-based application over the network. For an LDAP Modify request, an LDAP Modify response is sent to the LDAP-based application over the network. For an LDAP Search request, an LDAP Search response is sent to the LDAP-based application over the network.

Figure 20A:
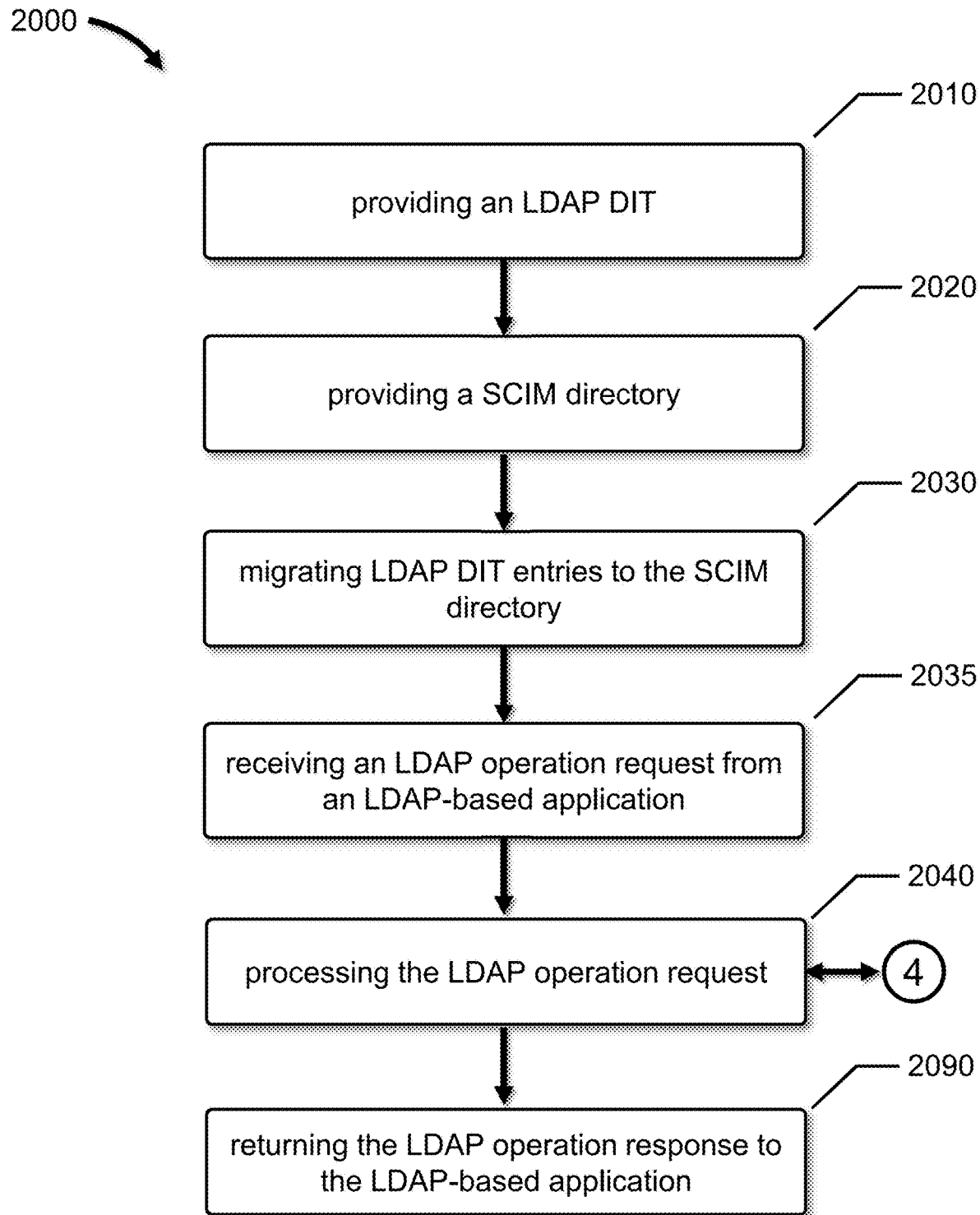
FIGS. 20A to 20K present a method for hierarchical processing of LDAP operations against a SCIM directory, in accordance with embodiments of the present invention.
Figure 20B:
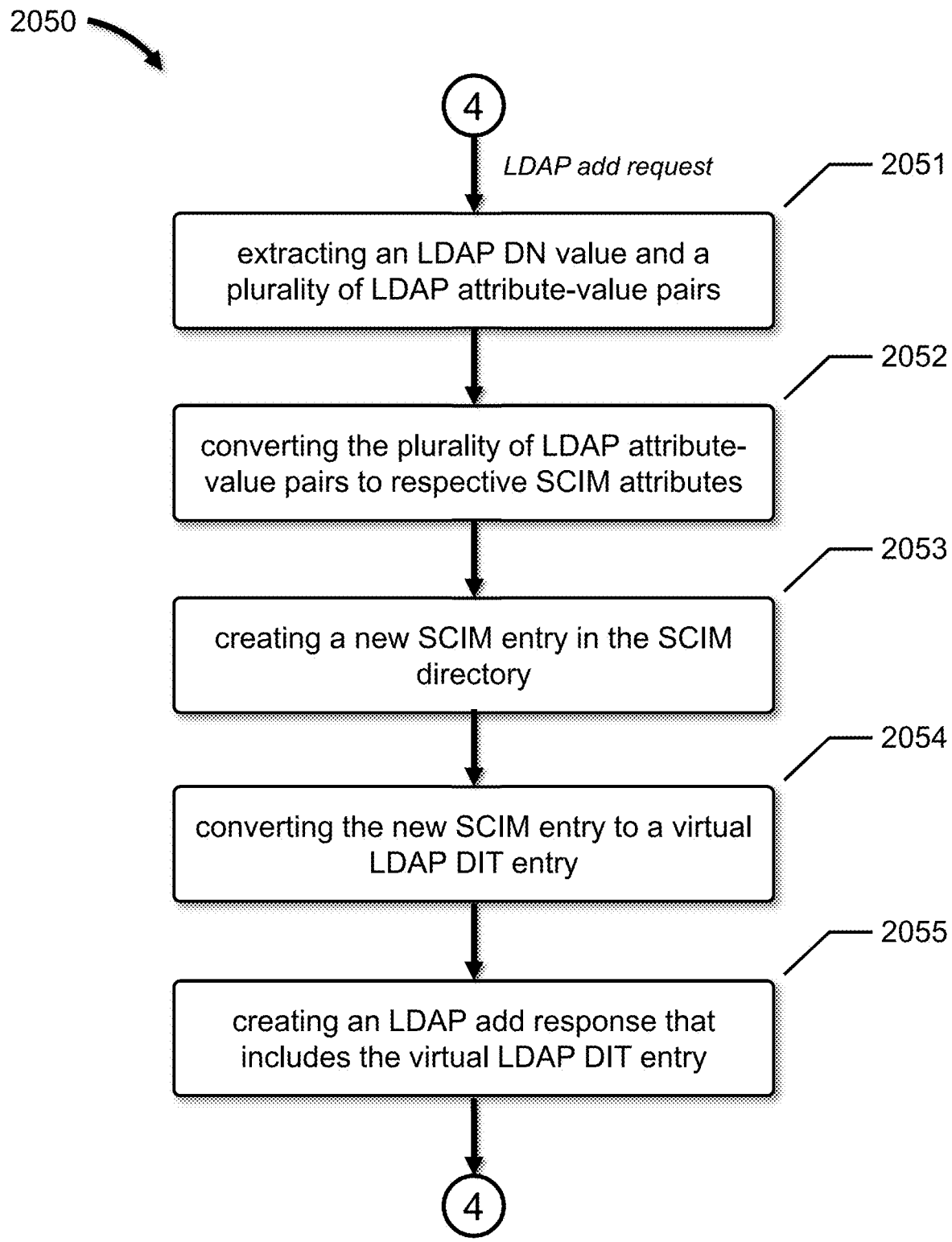
Figure 20C:
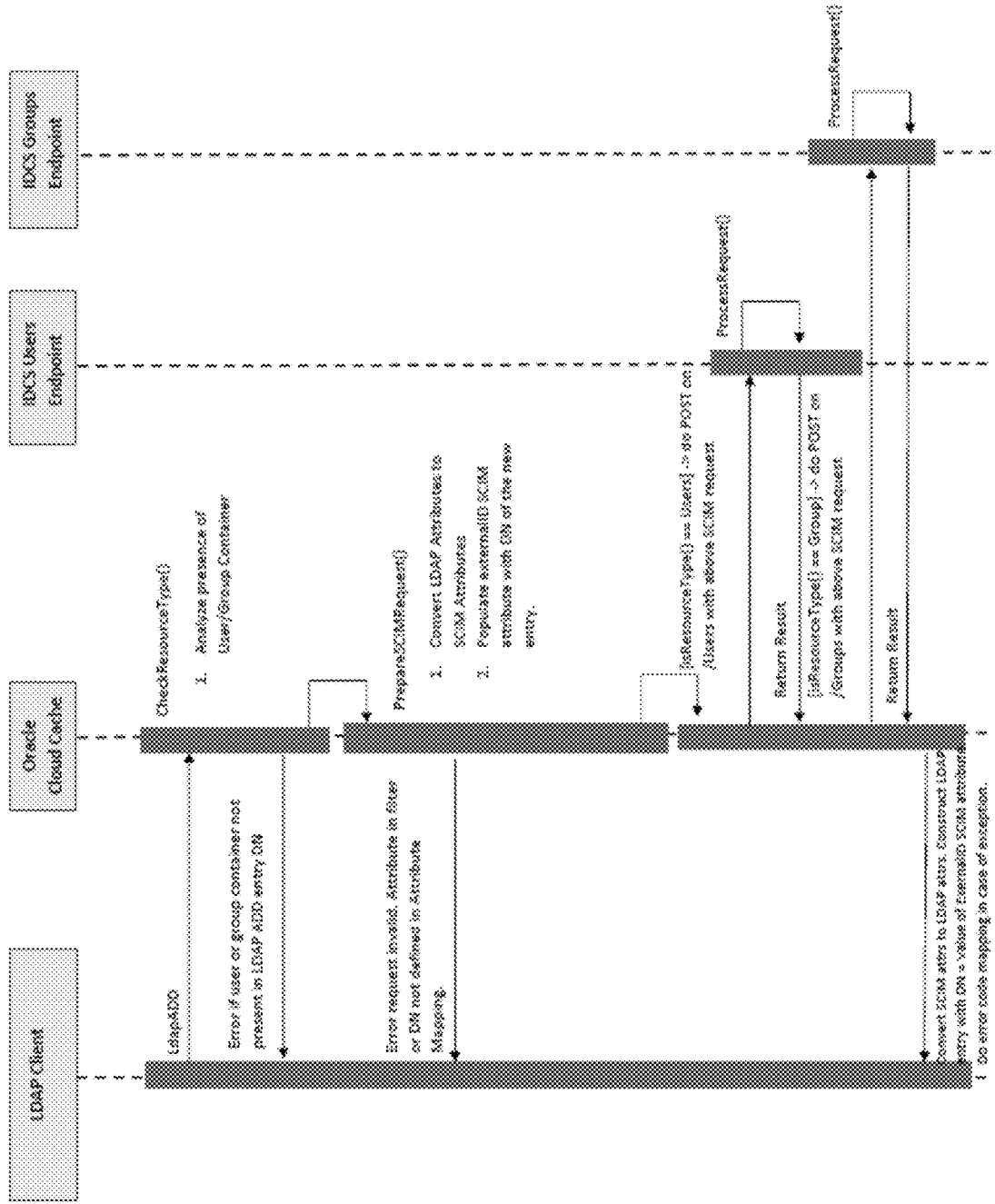

FIG. 20B presents a flow diagram 2050 depicting processing an LDAP Add request, according to an embodiment of the present invention. An LDAP DN value and a plurality of LDAP attribute-value pairs are first extracted (2051) from the LDAP Add request. The plurality of LDAP attribute-value pairs are converted (2052) to respective SCIM attributes. A new SCIM entry is created (2053) in the SCIM directory, using a POST command, for example. When the new SCIM entry is created, the LDAP DN value is stored in the externalID of the new SCIM entry, the respective SCIM attributes are stored in the new SCIM entry, and the resource type of the new SCIM entry is set to user or group based on the user or group container present in DN value. Alternatively, the resource type of the new SCIM entry is set to user or group based on the objectclass present in the LDAPAdd request. The new SCIM entry is then converted (2054) to a virtual LDAP DIT entry, which includes converting the externalID of the new SCIM entry to a virtual LDAP DN, and converting the SCIM attributes of the new SCIM entry to virtual LDAP attribute-value pairs. An LDAP Add response is then created (2055) that includes the virtual LDAP DIT entry. FIG. 20C presents a flow diagram 2050 depicting processing an LDAP Add request, according to another embodiment of the present invention.

Figure 20D:
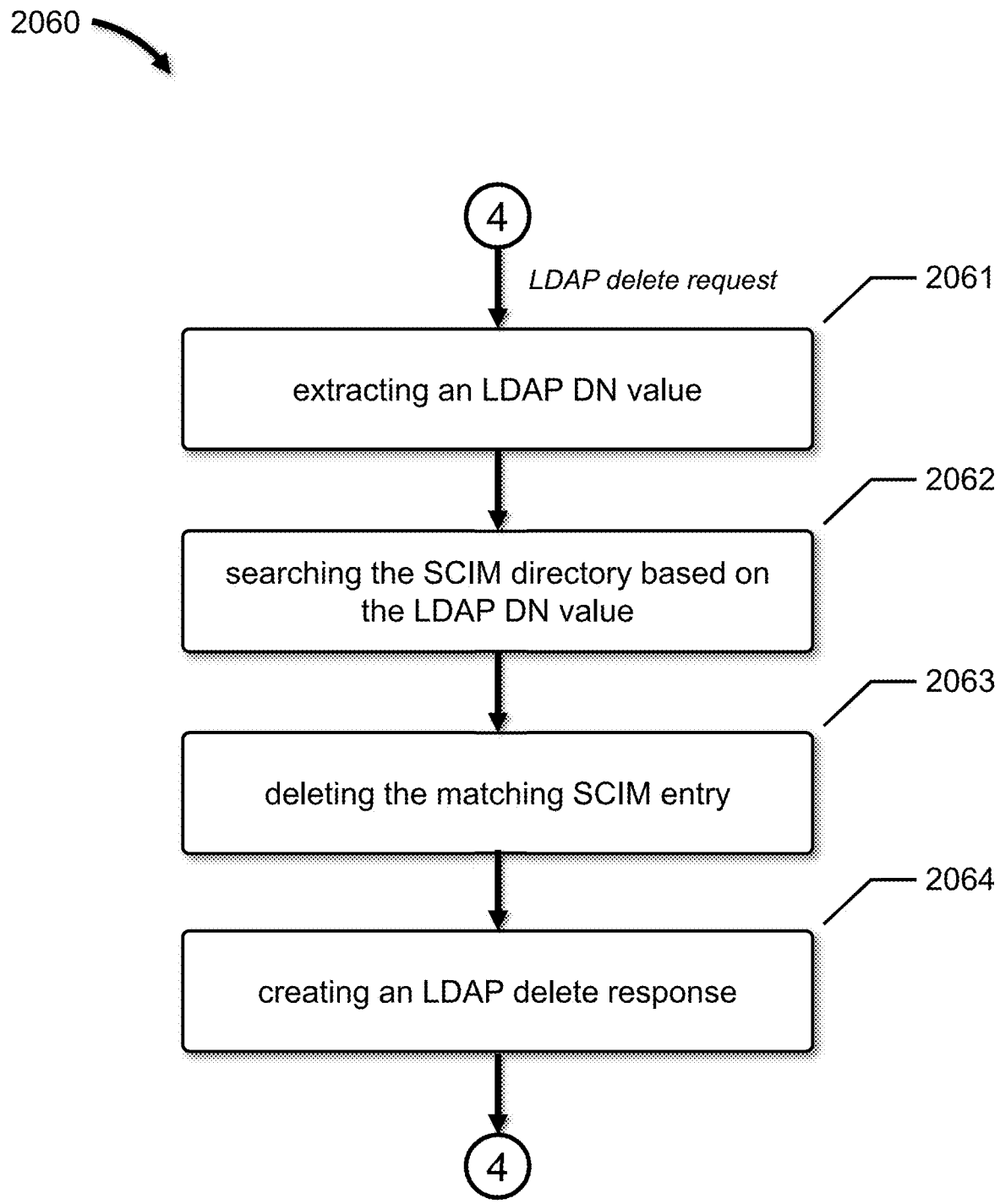
Figure 20E:
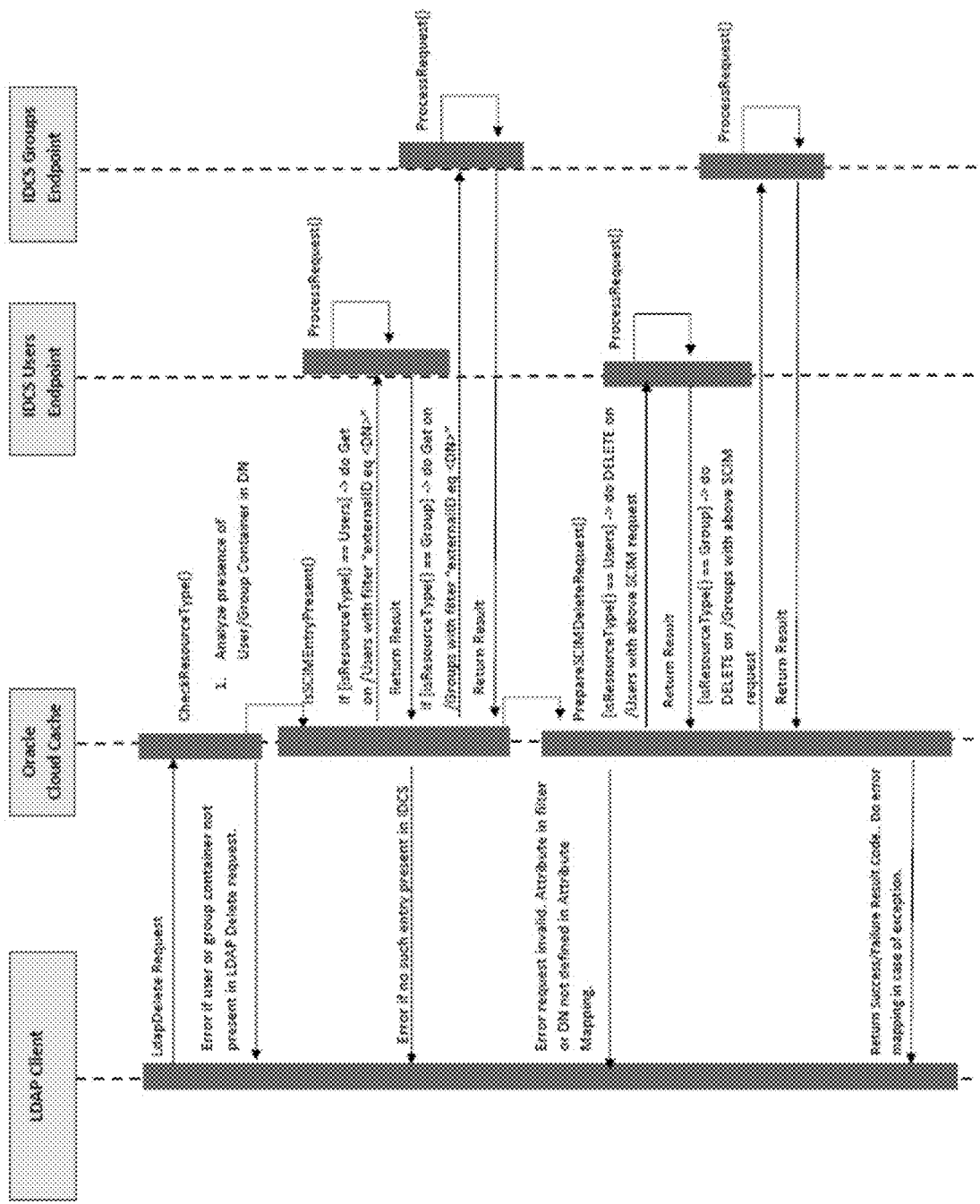

FIG. 20D presents a flow diagram 2060 depicting processing an LDAP Delete request, according to an embodiment of the present invention. An LDAP DN value is first extracted (2061) from the LDAP Delete request. The SCIM directory is searched (2062) to find the SCIM entry whose externalID matches the DN value extracted from the LDAP Delete request, using a GET command, for example. The matching SCIM entry is then deleted (2063) from the SCIM directory, using a Delete command, for example. An LDAP Delete response is created (2064) that includes the results of the delete operation. FIG. 20E presents a flow diagram 2060 depicting processing an LDAP Delete request, according to another embodiment of the present invention.

Figure 20F:
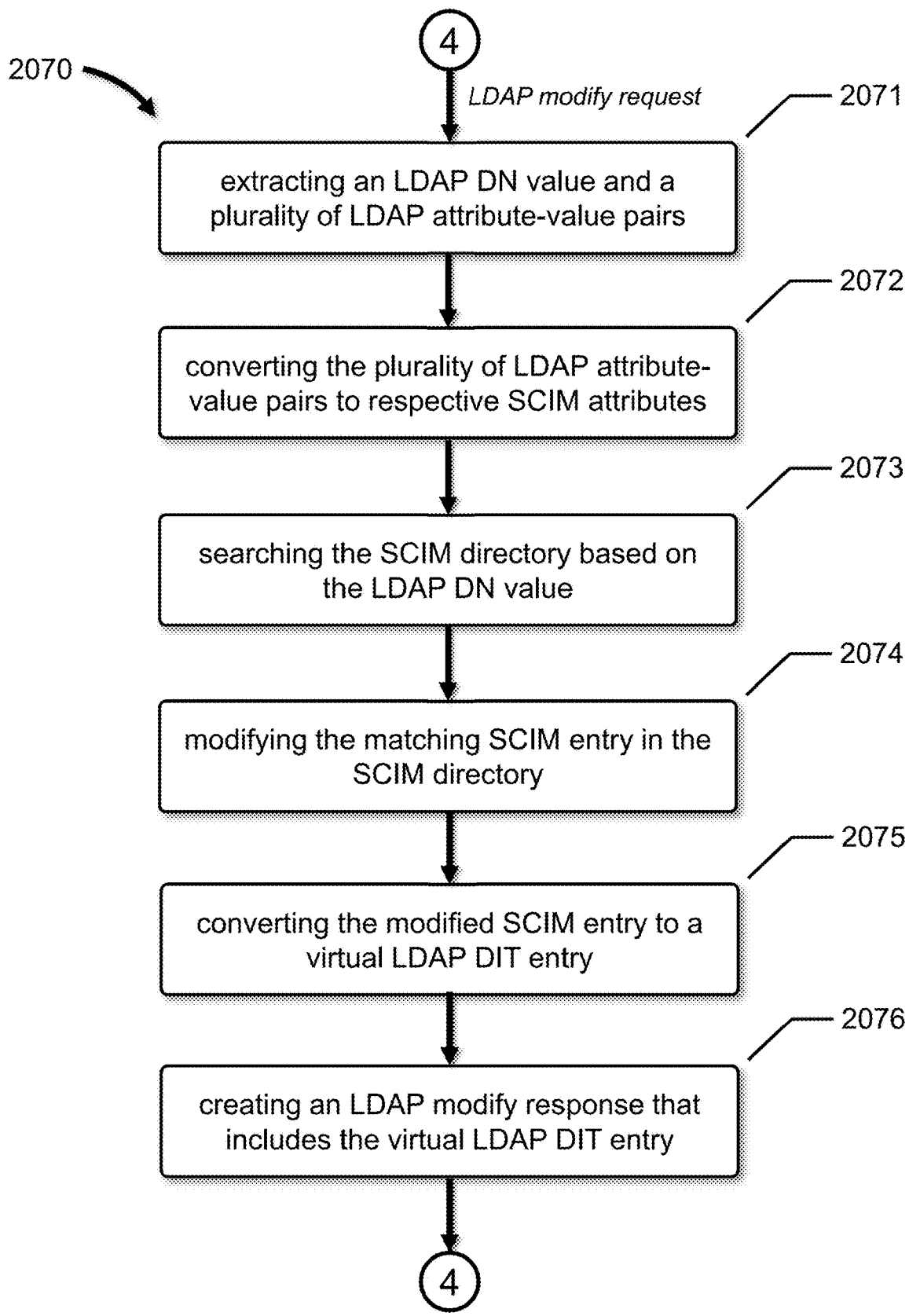
Figure 20G:
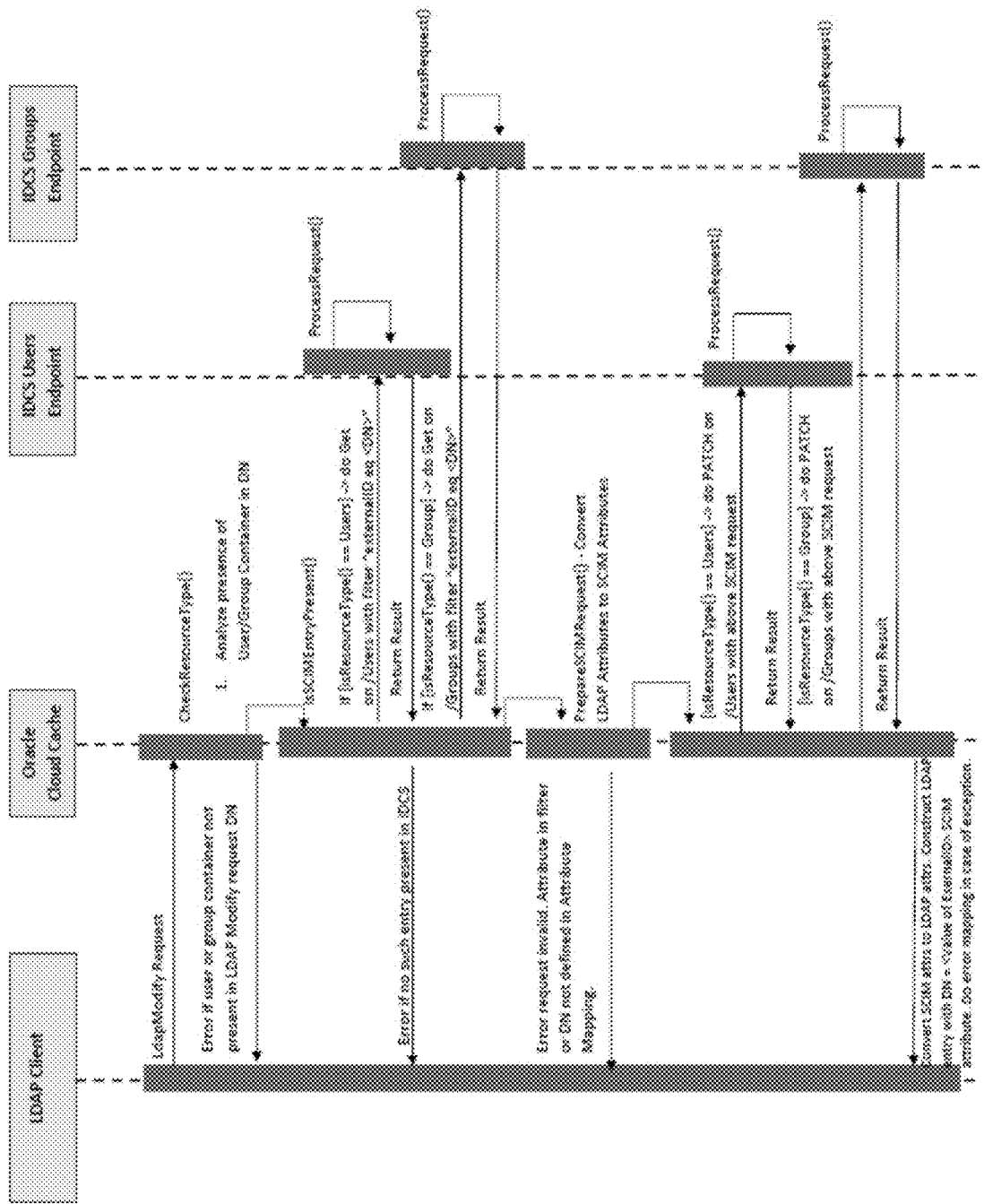

FIG. 20F presents a flow diagram 2070 depicting processing an LDAP Modify request, according to an embodiment of the present invention. An LDAP DN value and a plurality of LDAP attribute-value pairs are first extracted (2071) from the LDAP Modify request. The plurality of LDAP attribute-value pairs are converted (2072) to respective SCIM attributes. The SCIM directory is searched (2073) to find the SCIM entry whose externalID matches the DN value extracted from the LDAP Modify request, using a GET command, for example. The matching SCIM entry is modified (2074) in the SCIM directory, using a PATCH command, for example. When the matching SCIM entry is modified, the respective SCIM attributes are stored in the modified SCIM entry. The modified SCIM entry is then converted (2075) to a virtual LDAP DIT entry, which includes converting the externalID of the modified SCIM entry to a virtual LDAP DN, and converting the SCIM attributes of the modified SCIM entry to virtual LDAP attribute-value pairs. An LDAP Modify response is then created (2076) that includes the virtual LDAP DIT entry. FIG. 20G presents a flow diagram 2050 depicting processing an LDAP Modify request, according to another embodiment of the present invention.

Figure 20H:
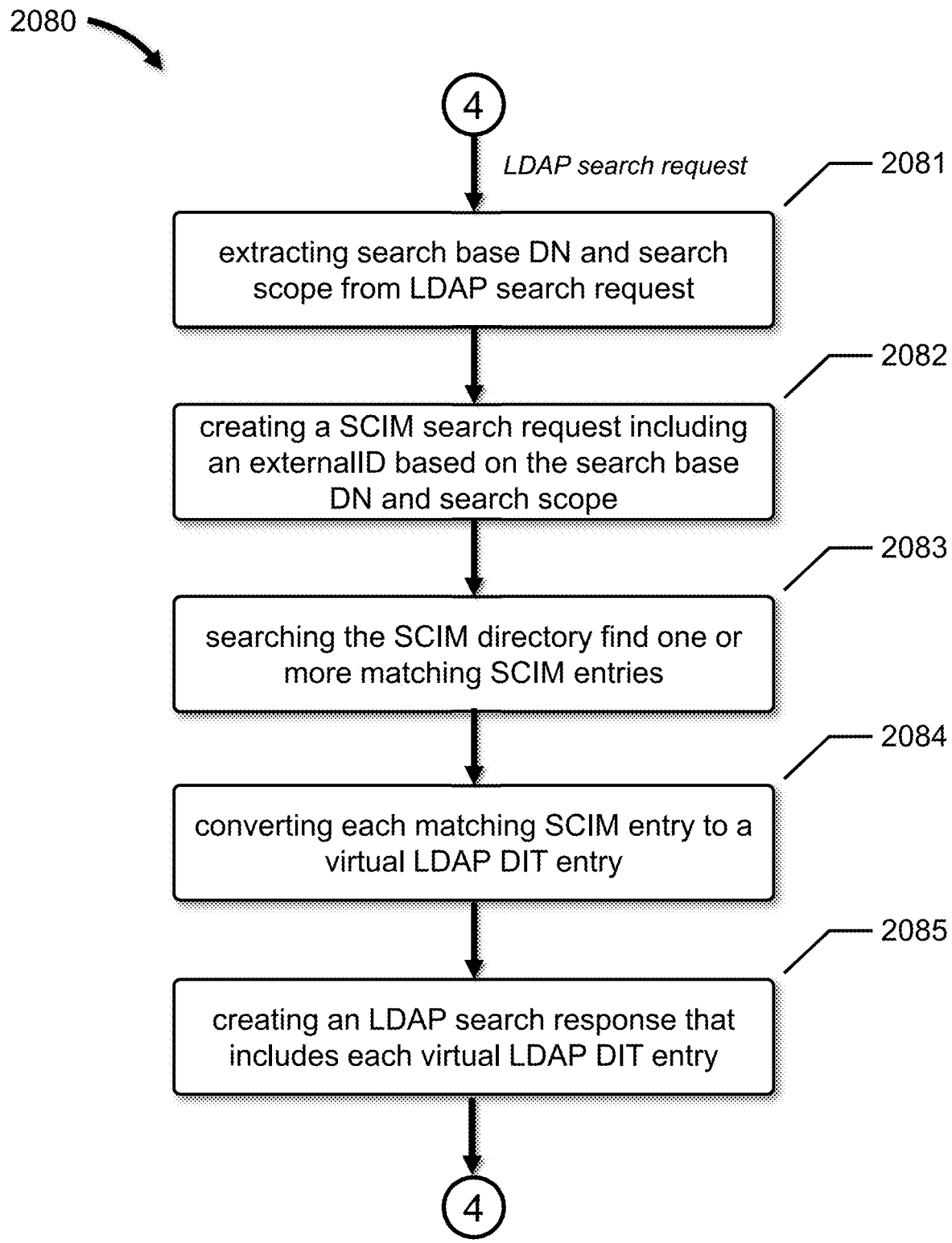

FIG. 20H presents a flow diagram 2080 depicting processing an LDAP Search request, according to an embodiment of the present invention. A search BaseDN value and a search scope value are first extracted (2081) from the LDAP Search request. A SCIM search request is then created (2082), the SCIM search request including an externalID value that is based on the search BaseDN value and the search scope value. The SCIM directory is then searched (2083) using the SCIM search request to find one or more matching SCIM entries, using a GET command, for example. Each matching SCIM entry is then converted (2084) to a virtual LDAP DIT entry, which includes converting the externalID of the matching SCIM entry to a virtual LDAP DN, and converting the SCIM attributes of the matching SCIM entry to virtual LDAP attribute-value pairs. An LDAP Search response is then created (2085) that includes each virtual LDAP DIT entry.

In certain embodiments, the LDAP Search request may include an LDAP filter that has a plurality of LDAP filter attributes. In these embodiments, the LDAP filter may be extracted from the LDAP Search request, and the plurality of LDAP filter attributes may be converted to respective SCIM filter attributes. A SC IM filter may be created based on the SCIM filter attributes, and then added to the SCIM search request.

In certain embodiments, after the LDAP filter is extracted from the search request, the LDAP filter may be analyzed to determine whether a user object class or a group object class is present. If a user object class is present, then a SCIM search may be issued against the /Users endpoint. Similarly, if a group object class is present, then a SCIM search may be issued against the /Groups endpoint. If neither a user object class or a group object class is present, then SCIM searches may be issued against both /Users and /Groups endpoints.

In certain embodiments, if the search scope is "Base," then the externalID value is set to be equal (i.e., "eq") to the search BaseDN value; if the search scope is "One Level" or "Subtree," then the externalID value is set to contain (i.e., "co") the search BaseDN value. Additionally, if the search scope is "One Level," then the externalID value of each matching SCIM entry is scanned, and only those matching SCIM entries that have one Relative Distinguished Name (RDN) prefixed before the search Base DN are converted to a virtual LDAP DIT entry.

Figure 20I:
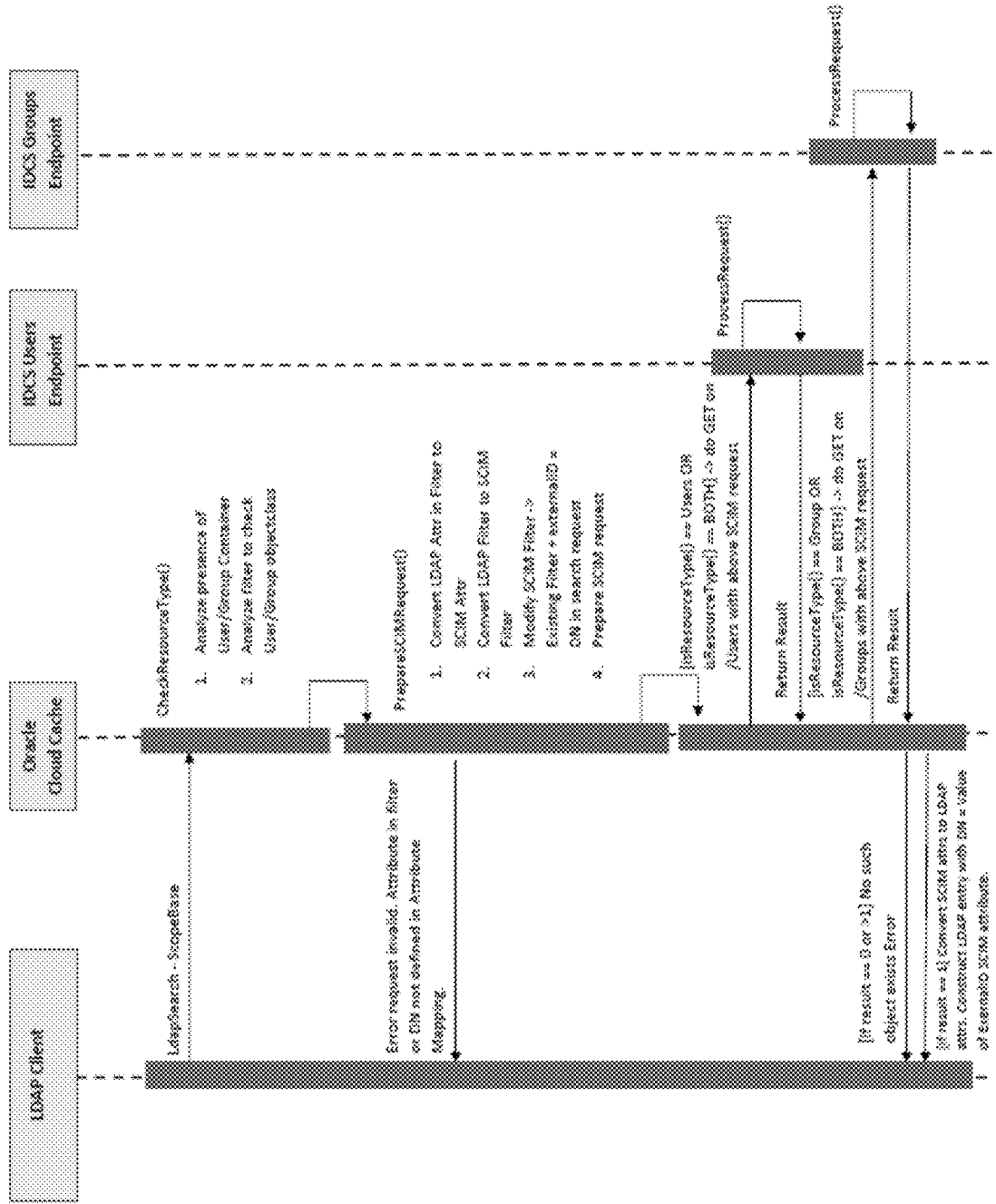
Figure 20J:
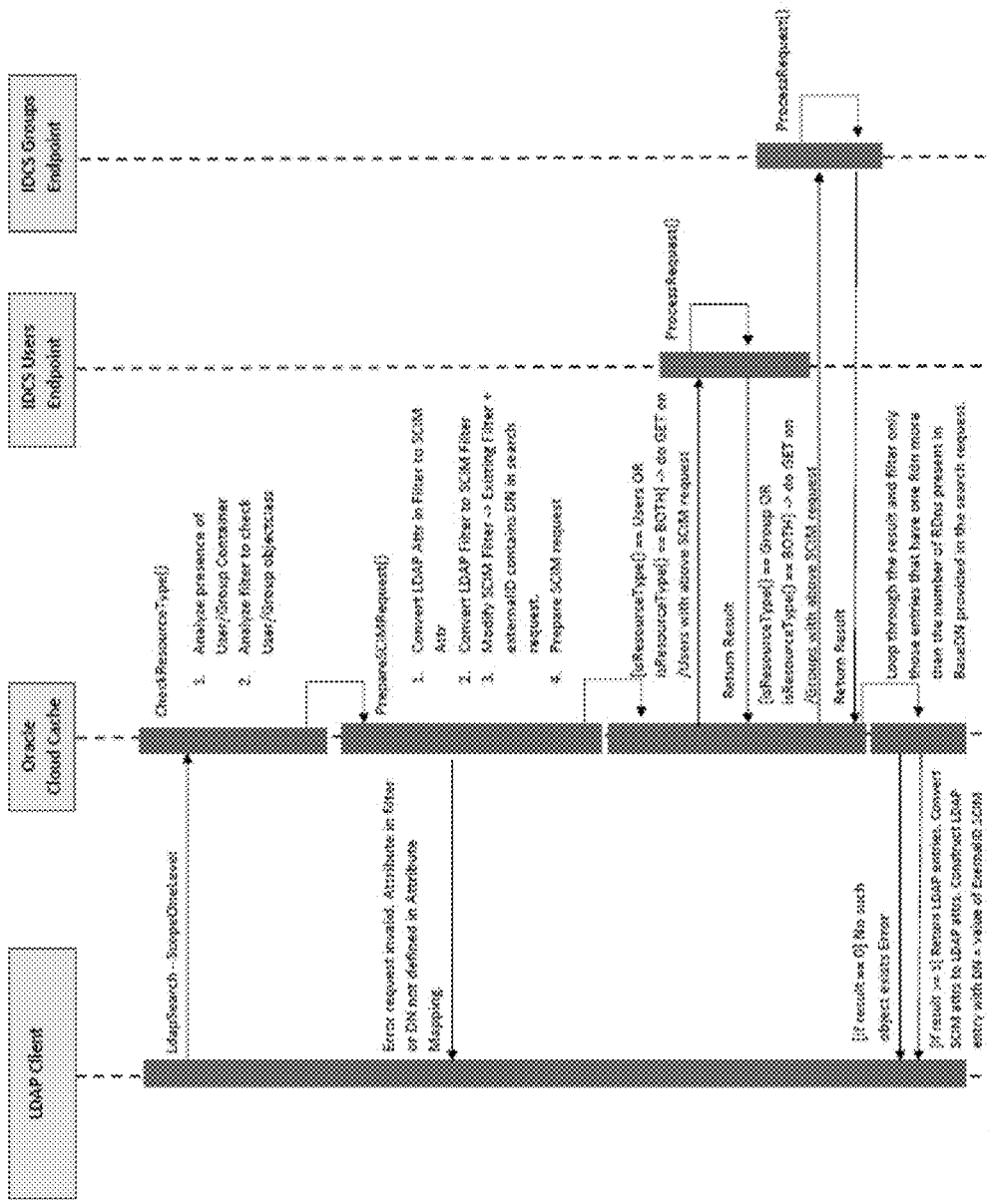
Figure 20K:
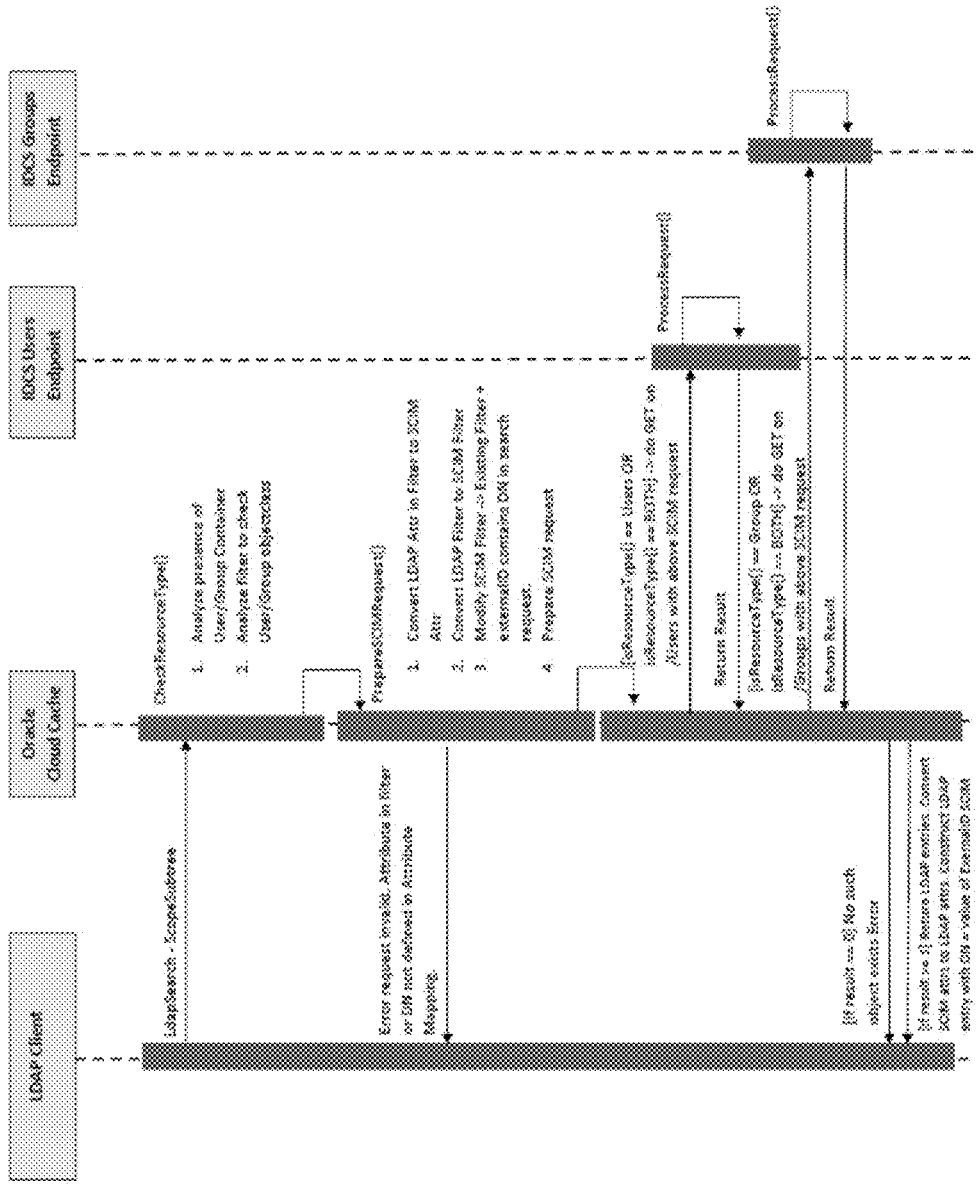

FIG. 20I presents a flow diagram 2080 depicting processing an LDAP Search request for a "Base" search, according to an embodiment of the present invention. FIG. 20J presents a flow diagram 2080 depicting processing an LDAP Search request for a "One Level" search, according to an embodiment of the present invention. FIG. 20K presents a flow diagram 2080 depicting processing an LDAP Search request for a "Subtree Level" search, according to an embodiment of the present invention.

Preserving LDAP Hierarchy in a SCIM Directory Using Special Marker Groups

As noted above, in a virtual directory system, hierarchy mapping is required for LDAP to SCIM conversion because LDAP uses a tree based hierarchy data model and SCIM uses a flat data model, as discussed above.

Embodiments of the present invention advantageously provide a method for preserving and evaluating hierarchy information represented by the LDAP distinguished name attribute of an entry that was migrated to a SCIM directory by introduction of special marker groups in the SCIM directory. All LDAP operations may be processed appropriately according to LDAP hierarchy constraints by checking the membership of these identities with respective marker groups to determine their relative position in the virtual directory system.

In one embodiment, a corresponding group in the SCIM directory is created for every container in the LDAP DIT. Additionally, a child container that is present below a parent container in the LDAP hierarchy is migrated to the SC IM directory as a nested member to the group representing the parent container.

FIGS. 21A to 21D present a method 2100 for preserving LDAP hierarchy in a SCIM directory, in accordance with embodiments of the present invention.

An LDAP Directory Information Tree (DIT) is provided (2110). The LDAP DIT includes a plurality of entries that describe LDAP containers, users and groups, and each entry includes a Distinguished Name (DN) and a plurality of LDAP attribute-value pairs. The DN provides LDAP DIT hierarchical information that uniquely identifies the entry and describes a hierarchical position of the entry in the LDAP DIT. Each LDAP attribute-value pair includes an attribute name and one or more attribute values.

A SCIM directory is provided (2120). The SCIM directory includes a plurality of SCIM resource entries that describe SCIM users and groups. Each SCIM resource entry includes a plurality of attributes, and includes an externalID and a resource type identifying the SCIM resource entry as belonging to a user or a group. Each SCIM attribute includes a name and one or more values.

The LDAP entries are migrated (2130) to the SCIM directory. Importantly, LDAP DIT hierarchy information for each LDAP DIT entry is preserved, i.e., stored, in the SCIM directory. In certain embodiments, LDAP containers are mapped to special marker SCIM groups in the SCIM directory. For each LDAP container in the LDAP DIT, a special marker SCIM group is created in the SCIM directory for the LDAP container. If an LDAP container is a child LDAP container of one or more parent LDAP containers in the LDAP DIT, then the child LDAP container is added to the special marker SCIM group associated with each parent LDAP container. This determination may include extracting the LDAP DN value from the LDAP container, parsing the LDAP DN value and identifying any parent LDAP containers based on the parsed LDAP DN value.

The SCIM directory supports nested memberships for these special marker SCIM group entries that represent LDAP containers. In one example, there are four (4) nested LDAP DIT containers with DNs as follows: "dc=com", "dc=us,dc=com", "l=India,dc=us,dc=com" and "ou=Sales, l=India,dc=us,dc=com." During migration, a special marker SCIM group is created for the "dc=com" container, the "dc=us" container, the "l=India" container, and the "ou=Sales" container in the SCIM directory. After the special marker groups are created, "ou=Sales" is made a member of "l=India," "l=India" is made member of "dc=us," and "dc=us" is made a member of "dc=com". The "dc=com"

container is the top-most container and, accordingly, is not a member of any special marker SCIM groups.

In certain embodiments, these special marker SCIM groups have a SCIM resourceType equal to Groups. In some embodiments, the entire LDAP entry RDN's key-value pair is placed in SCIM group.displayName attribute. For example, for the special marker SCIM group created for "ou=Sales", the group.displayName value is "ou=sales".

In certain embodiments, only the RDN attribute value is stored in the SCIM group.displayName attribute, and the RDN attribute name is stored in another SCIM Group attribute, such as, for example, group.description. Both RDN attribute type and attribute value is preserved in the SCIM directory in order to reconstruct the LDAP DIT. For example, the special marker SCIM group for ou=Sales has a group.displayName equal to "Sales" and a group.description equal to "ou."

These special marker SCIM groups have a group.members attribute. Any SCIM resourceType equal to Users or Groups is made a member of this special marker SCIM group by adding its SCIM ID to the group.members list. The special marker SCIM groups that represent LDAP containers are separated from generic SCIM groups that represent LDAP groups. For example, if the group.description for a SCIM group has a value such as "ou", "dc", "l", "o" or "cn," then the SCIM group represents an LDAP container entry and is marked as a special marker SCIM group.

In certain embodiments, these special marker SCIM groups are maintained as a separate resourceType, and their group.members attribute has a SC IM ID of resourceType Users or Groups or SpecialMarkerGroups as values.

An LDAP operation request is received (2140) from an LDAP-based application over the network. The LDAP operation request may be an LDAP Add request, an LDAP Delete request, an LDAP Modify request, an LDAP Search request, an LDAP Bind DN operation request, an LDAP modify DN operation request, etc.

The LDAP operation request is processed (2150).

The LDAP operation response is then returned (2190) to the LDAP-based application over the network. For an LDAP Add request, an LDAP Add response is sent to the LDAP-based application over the network. For an LDAP Delete request, an LDAP Delete response is sent to the LDAP-based application over the network. For an LDAP Modify request, an LDAP Modify response is sent to the LDAP-based application over the network. For an LDAP Search request, an LDAP Search response is sent to the LDAP-based application over the network.

Figure 21A:
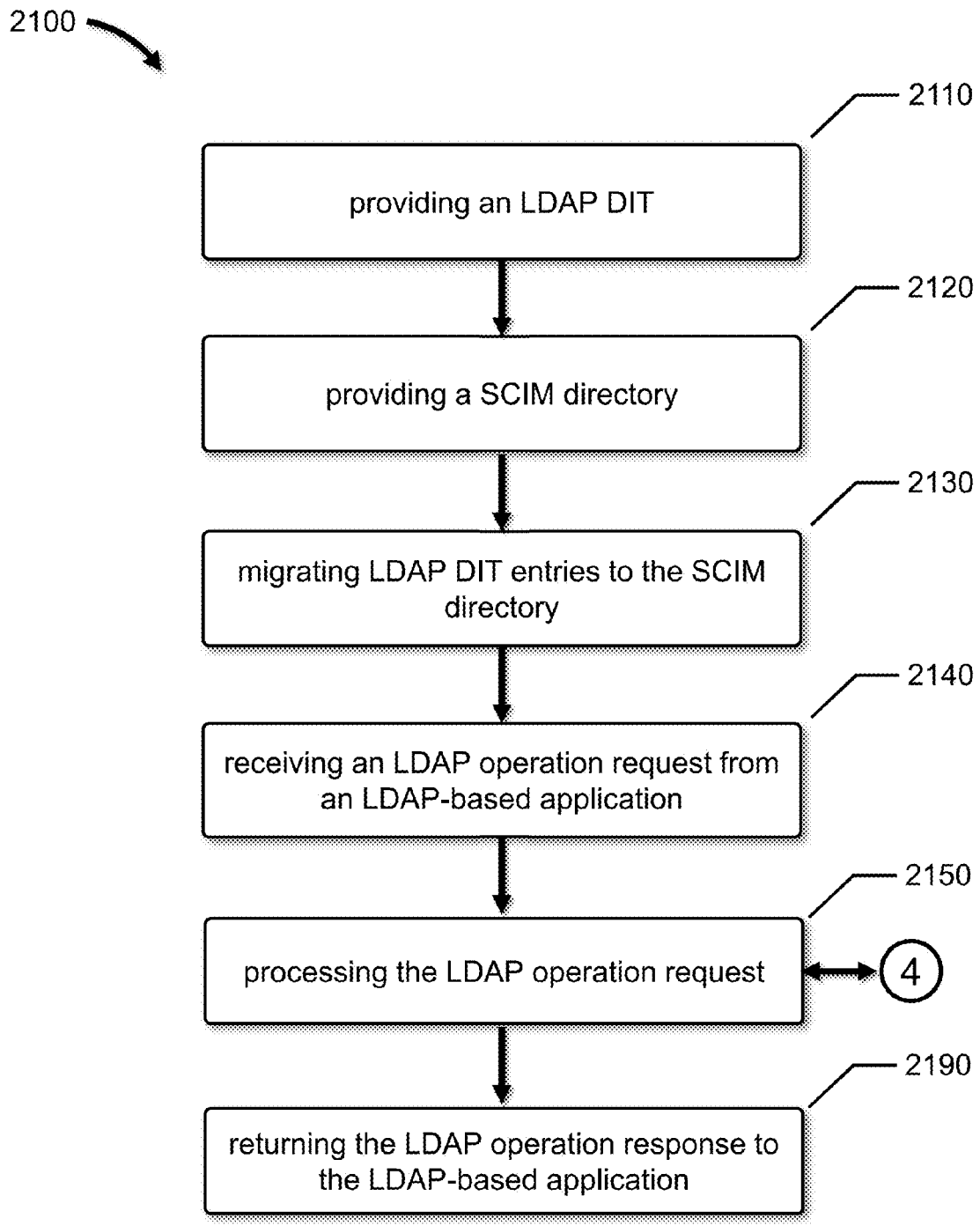
FIGS. 21A to 21D present a method for preserving LDAP hierarchy in a SCIM directory, in accordance with embodiments of the present invention.
Figure 21B:
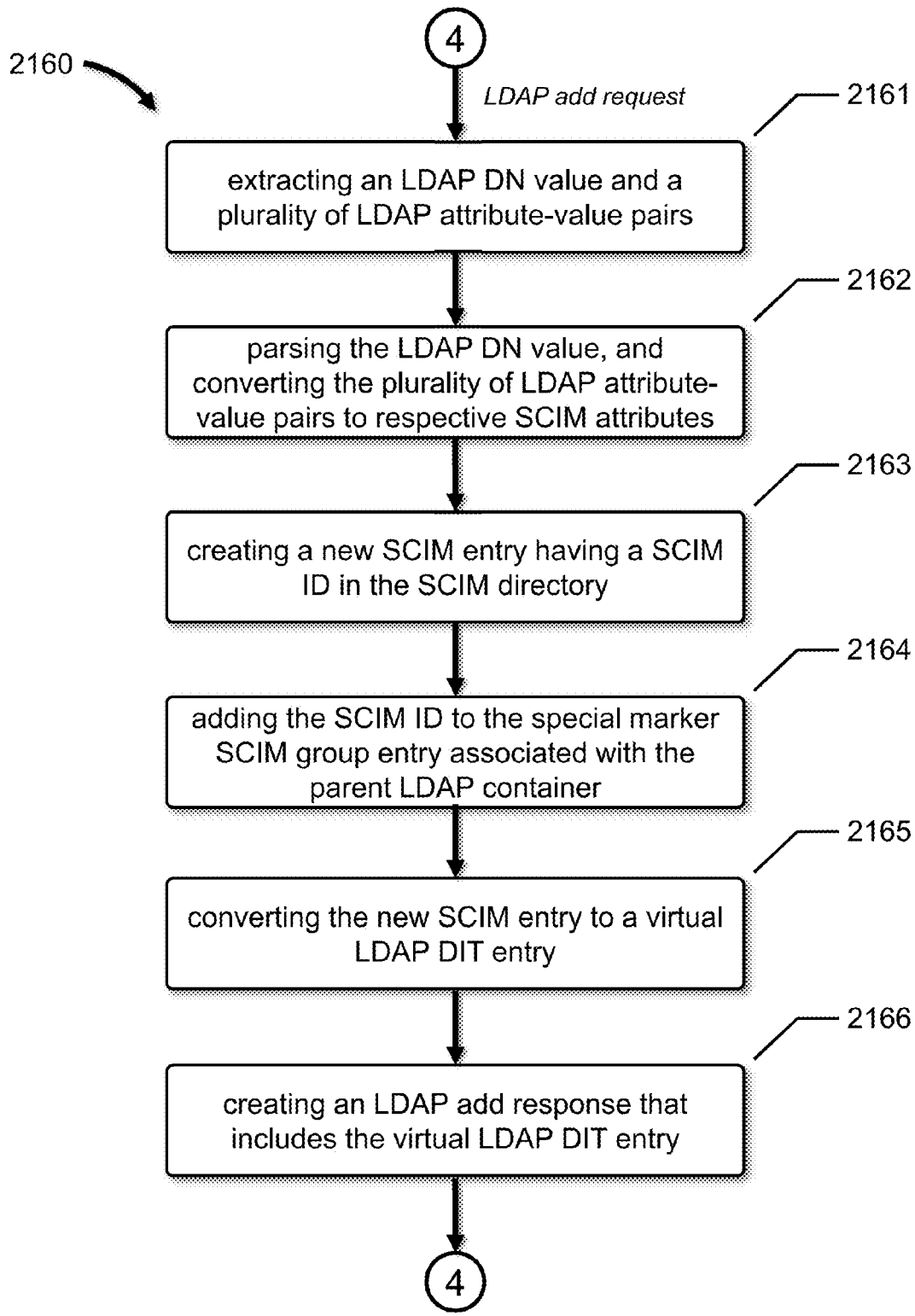

FIG. 21B presents a flow diagram 2160 depicting processing an LDAP Add request for a user, according to an embodiment of the present invention.

An LDAP DN value and a plurality of LDAP attribute-value pairs are extracted (2161) from the LDAP Add request. The LDAP DN value is parsed (2162) to identify a user's relative distinguished attribute-value pair and one or more parent LDAP containers, and the plurality of LDAP attribute-value pairs are converted (2162) to respective SCIM attributes. A new SCIM entry is created (2163) in the SCIM directory, using a POST command, for example. Depending on whether an LDAP user or LDAP group entry is being created, a corresponding SCIM entry is created for a SCIM resourceType of User or Group, respectively.

When a new LDAP user is created in LDAP DIT, the corresponding SCIM user entry is created in the SCIM directory. The new SCIM user entry is also added (2164) to the special marker SCIM group associated with its immediate parent container, obtained by parsing the DN value associated with the LDAP user entry being added. The immediate parent container is the one represented by the second RDN key value pair in DN, while the first RDN represents the attribute of the entry being added. The new SCIM entry is then converted (2165) to a virtual LDAP DIT entry, and an LDAP Add response is created (2166) based on the SCIM response obtained from the POST operation. The LDAP Add response includes the virtual LDAP DIT entry.

As discussed above, to determine whether the LDAP DN includes one or more parent LDAP containers, the parsed LDAP DN values are inspected. For example, if the LDAP DN value is: "uid=testUser1, cn=Users, ou=Sales, l=East, dc=example, dc=com," then the parsed LDAP DN values are "uid=testUser1, " "cn=Users," "ou=Sales," "l=East," "dc=example," and "dc=com." The SCIM User ID "testUser1" will then be added to special marker SCIM groups Users. For this example, the special marker SCIM group Users is a member of the special marker SCIM group Sales, the special marker SCIM group Sales is as a member of the special marker SCIM group East, the special marker SCIM group East is a member of the special marker SCIM group Example, and the special marker SCIM group Example group is a member of the special marker SCIM group Com. Accordingly, the user id "testUser1" is a member of the special marker SCIM group Users, and an indirect member of special marker SCIM groups Sales, East, Example, and Com. In certain embodiments, the groups "Example" and "Corn" may be skipped if "dc=example, dc=com" is the Realm of the directory server.

When a new LDAP group is created in the LDAP DIT, a corresponding SCIM group entry is created in the SCIM directory, and the SCIM ID of this SCIM group entry is added as a member to the special marker SCIM group representing its immediate parent LDAP DIT container, obtained after parsing its DN value. The SCIM response obtained from the POST operation is converted to an LDAP Add response that includes this virtual LDAP Group entry.

Figure 21C:
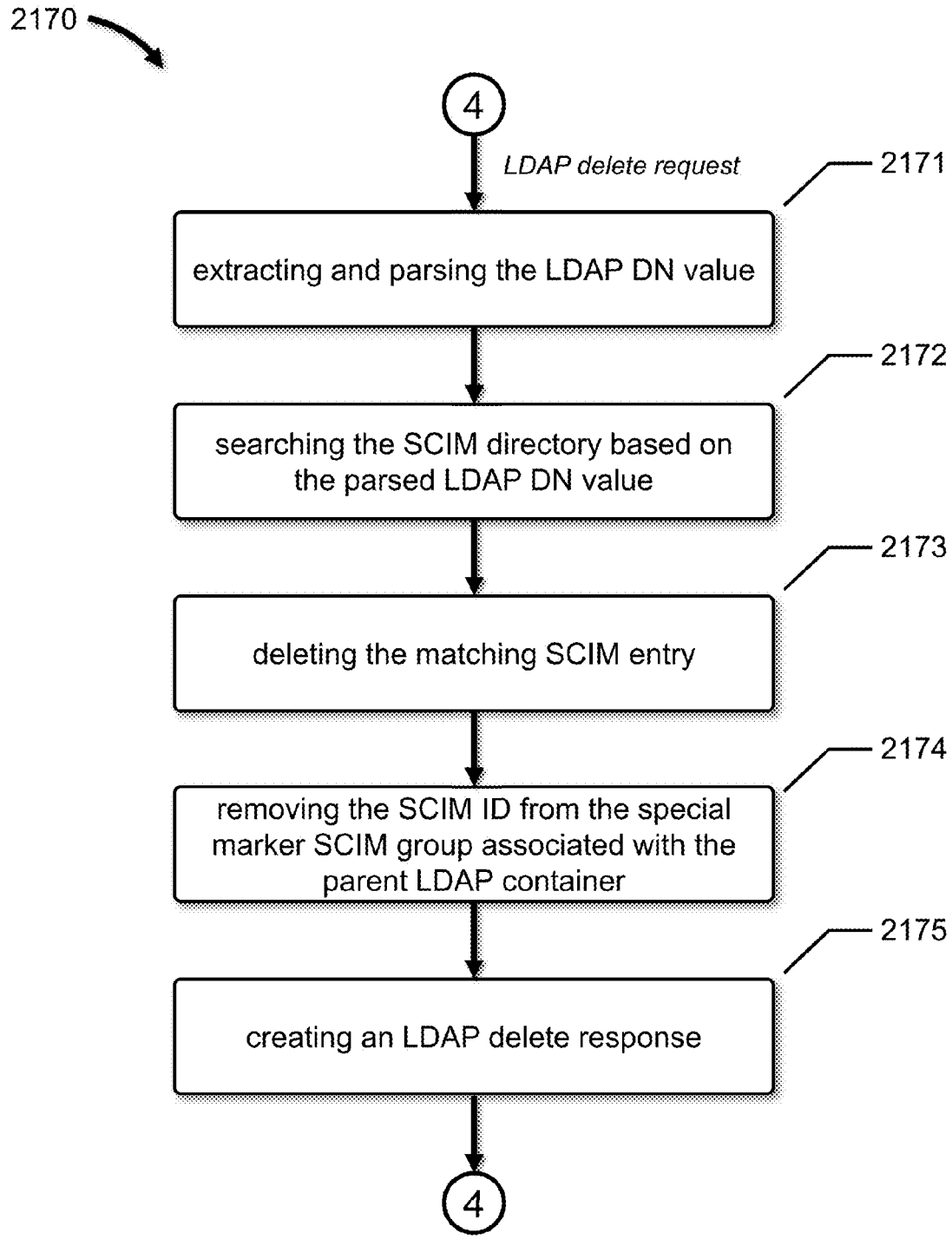

FIG. 21C presents a flow diagram 2170 depicting processing an LDAP Delete request, according to an embodiment of the present invention.

An LDAP DN value is extracted (2171) from the LDAP Delete request, and the LDAP DN value is parsed (2171) to identify LDAP user or group entry's relative distinguished name's attribute value pair and one or more parent LDAP containers. The SCIM directory is searched (2172) to find the matching SCIM entry and its SCIM ID is retrieved. A special SCIM filter may be constructed for the GET request.

For example, for an LDAP Delete command for an LDAP entry having a DN of "uid=testUser1, cn=Users,ou=Sales, l=East,dc=example,dc=com," the GET request will be performed on the SCIM directory to uniquely identify the corresponding SCIM entry and retrieve its SCIM ID. The SCIM search filter for this GET request is "(groups.value eq '<SCIM ID of Users group>') AND (groups.value eq '<SCIM ID of Sales group>') AND (groups.value eq '<SCIM ID of East group>') AND (groups.value eq '<SCIM ID of Example group>') AND (groups. value eq '<SCIM ID of corn group>') AND (<SCIM attr corresponding to uid>eq lestUsert) AND (groups.value neq '<SCIM ID of groups that are immediate members of special marker SCIM Users group>')."

This search uniquely identifies the SCIM entry and return its SCIM ID. The matching SCIM entry is then deleted (2173) from the SCIM directory using a SCIM Delete request with the SCIM ID. The user's membership in the special marker SCIM group that represents its immediate LDAP parent container is also removed (2174). An LDAP Delete response is created (2175) from the SCIM Delete response.

An LDAP Modify operation requires no special processing with respect to these special marker SCIM groups, because an LDAP Modify operation changes the attribute values and does not affect existing special marker SCIM group membership. The SCIM ID of the SCIM entry to be modified is obtained the same way as described in Delete request.

These embodiments advantageously preserve LDAP hierarchy information, do not require dynamic extensions to the IDCS User/Group schema as part of migration, and provide error free implementation of LDAP Search operations supporting all scopes, i.e., "Base," "One Level," and "Subtree." Several examples are provided below for a search base configured with Cloud Cache that is "dc=example, dc=com."

Figure 21D:
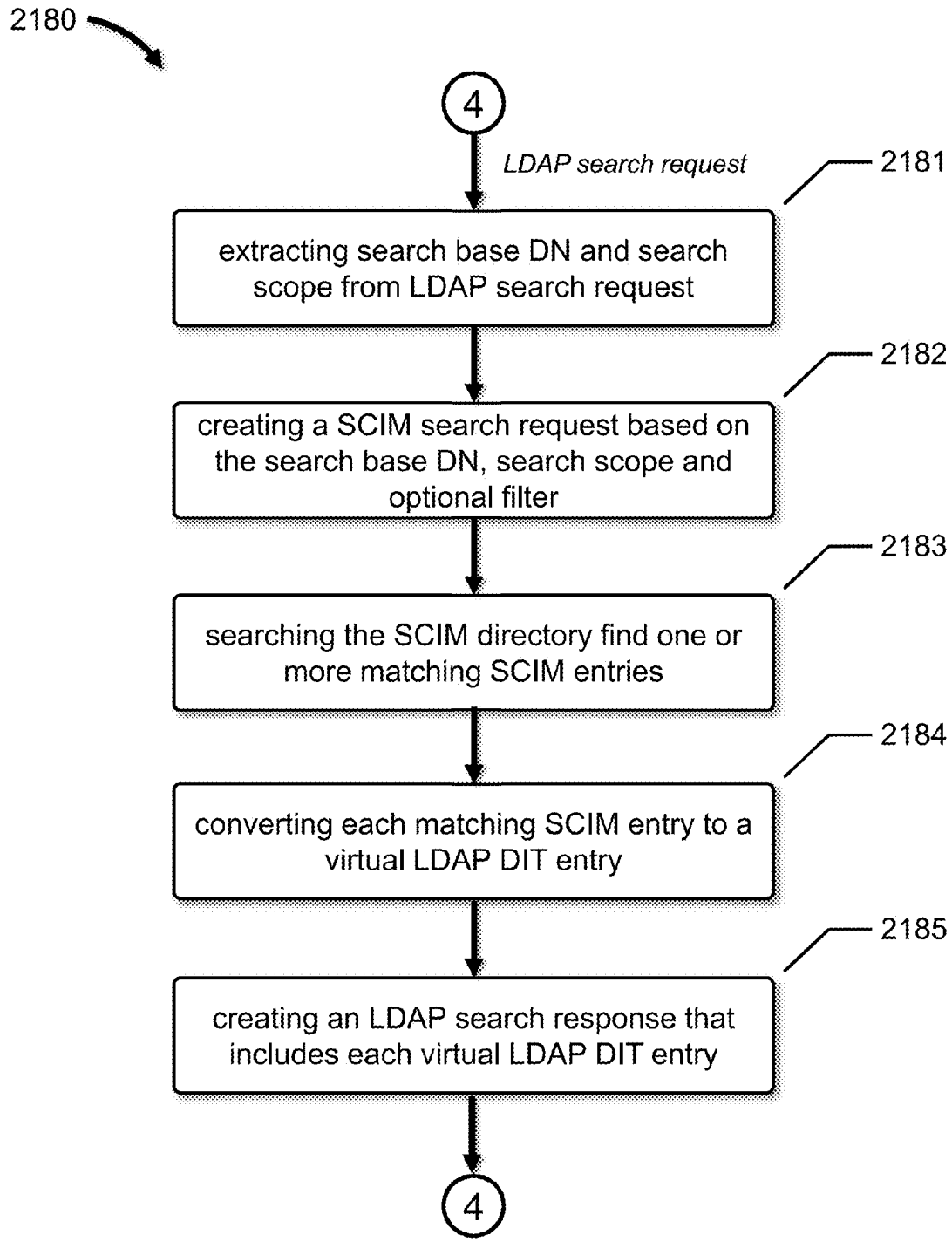

FIG. 21D presents a flow diagram 2180 depicting processing an LDAP Search request, according to an embodiment of the present invention. A search BaseDN value and a search scope value are first extracted (2181) from the LDAP Search request. A SCIM search request is then created (2182), the SCIM search based on the search BaseDN value, the search scope value and an optional LDAP filter. When present, the optional LDAP filter is extracted from the LDAP search request, and the LDAP filter attributes are converted to SCIM filter attributes. A SCIM filter is created based on the SCIM filter attributes, and then added to the SCIM search request. The SCIM directory is then searched (2183) using the SCIM search request to find one or more matching SCIM entries, using a GET command, for example. Each matching SCIM entry is then converted (2184) to a virtual LDAP DIT entry. An LDAP Search response is then created (2185) that includes each virtual LDAP DIT entry.

In certain embodiments, an additional SCIM filter may be created to search for memberships of the SCIM entry to special marker SCIM groups associated with respective parent containers in the LDAP DIT. The additional SCIM filter may be added to the SCIM search request, as discussed in more detail below.

In one example, for an LDAP Search operation with "Subtree" scope and a searchBaseDN of "ou=Sales, l=East, dc=example, dc=com," the SCIM filter is "<OriginalLDAP-Filter mapped to SCIM Filter>AND <groups.value eq <id of ou=Sales>>AND <groups.value eq <id of l=East>>."

In another example, for an LDAP Search operation with "One Level" scope and a searchBaseDN of "ou=Sales, l=East, dc=example, dc=com," an initial search is performed to find the immediate members of "ou=Sales" that are group entries. A second search is then performed for Users that are member of "ou=Sales" and "l=East" but are not members of the immediate groups below "ou=Sales." This ensures that only "One Level" entries are returned. The SCIM filter for this "One Level" search is "<OriginalLDAPFilter mapped to SCIMFilter>AND <groups.value eq <id of ou=Sales>>AND <groups.value eq <id of l=East>>AND (NOT(groups.value eq <id of any immediate group present under ou=Sales))."

In a further example, for an LDAPSearch with "Base" scope, the first RDN of searchBaseDN is a non-container value, so the searchbaseDn is "uid=testUser1, cn=Users, ou=Sales, l=East,dc=example,dc=com."

One exemplary filter may be "(groups.value eq '<id of Users group>') AND (groups.value eq '<id of Sales group>') AND (groups.value eq '<id of East group>') AND (groups.value eq '<id of Example group>') AND (groups-.value eq '<id of com group>') AND (<SCIM attr corresponding to uid>='testUser1') AND (groups.value neq '<id of groups immediate members of Users group>'). The corresponding SCIM filter is "<OriginalLDAPFilter mapped to SCIMFilter> AND <username(SCIM attr for uid) eq testUser1> AND <groups.value eq <id of cn=Users>> AND <groups.value eq <id of ou=Sales>> AND <groups-.value eq <id of l=East>> AND (NOT(groups.value eq <id of any immediate group present under ou=Sales))".

Preserving LDAP Hierarchy in a SCIM Directory Using Hierarchy Placement Markers

In another embodiment, LDAP hierarchy information is persisted as a separate resource in the SCIM directory. For every entry (user, group, org or any other container) in the LDAP DIT, an entry is created in this separate SCIM resource. Left and right markers are associated with the entry, which indicate the position and hierarchy of the node. In this embodiment, if the node is a leaf node with no children, then right=left+1. If a node has children, then that particular node's left marker will be less than the left and right markers of its children, and the right marker will be greater than the left and right marker of all of the node's children. All the children node's left and right marker values are contained within the parent node's left and right marker. Advantageously, the hierarchy of any node is clearly described and stored in the SCIM directory.

Mapping SCIM Resources to LDAP Entries Using Subtype Attributes

In certain embodiments, LDAP subtype is used to map SCIM resources to LDAP entries for complex multi-valued attributes. As discussed above, SCIM uses a flat data model and LDAP uses a tree based hierarchy data model, and the data structure of an actual resource/entry in SCIM and LDAP are very different. SCIM has four attribute types, i.e., a simple attribute, a simple multi-valued attribute, a simple complex attribute, and a complex multi-valued attribute ("CMVA").

Figure 22:
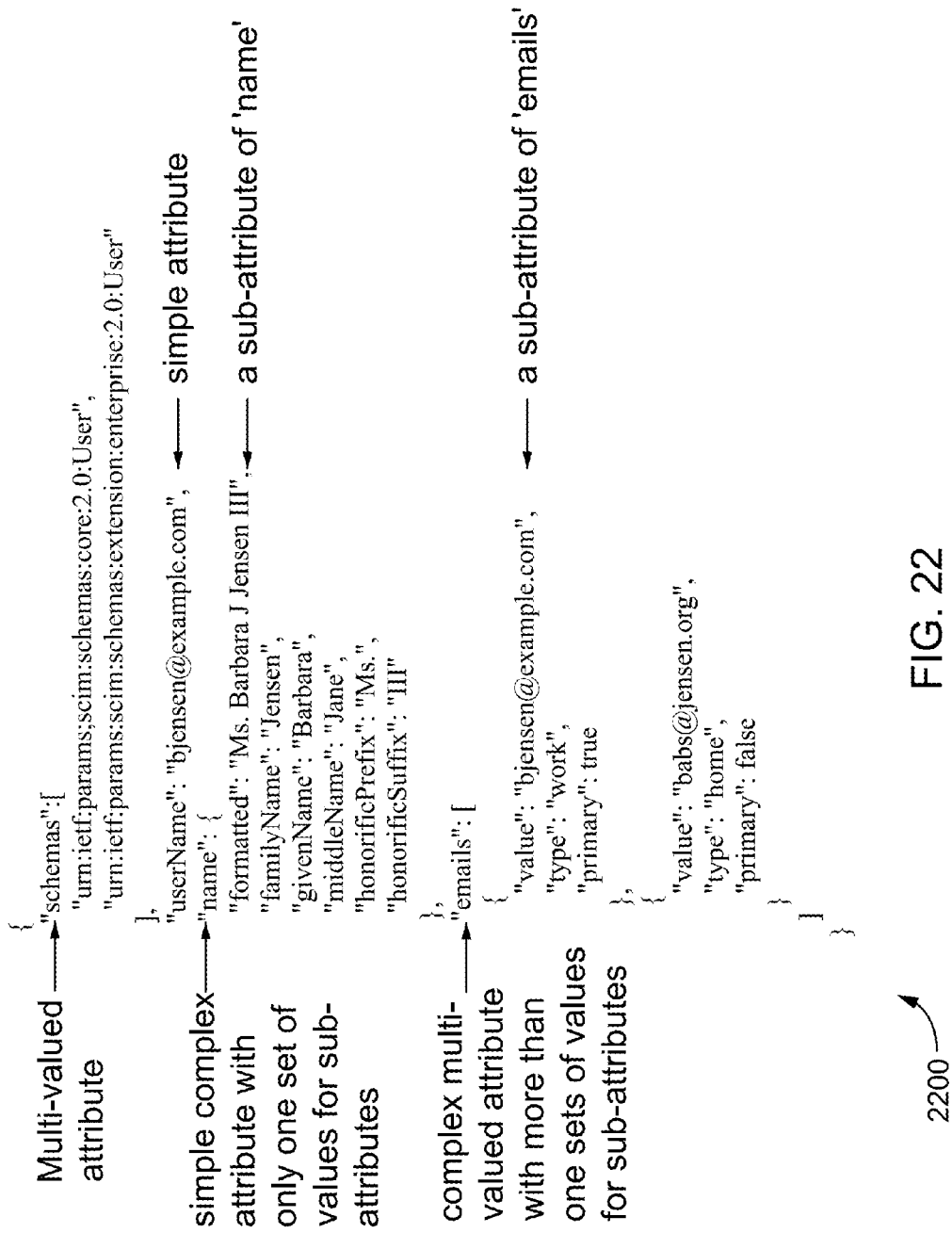
FIG. 22 presents exemplary SCIM attributes of a user, in accordance with an embodiment of the invention.

FIG. 22 presents exemplary SCIM attributes 2200 of a user, in accordance with an embodiment of the invention. A simple attribute is a singular attribute (an attribute with 0 . . . 1 values), whose value is a primitive, e.g., "String." A simple multi-valued attribute is a multi-valued attribute (an attribute with 0 . . . n values, n is an integer and >1), whose value is a primitive. A simple complex attribute is a singular attribute whose value is a composition of one or more simple/simple multi-valued attributes. Each of the components is called a sub-attribute of the complex attribute. A CMVA has multiple values of a singular attribute, whose value is a composition of one or more simple/simple multi-valued attributes.

As noted above, the structure of attributes in LDAP is quite different than SCIM. That is, each LDAP attribute presents its value in a single row in the LDAP directory. In other words, for simple attributes, simple-multivalued attributes, or sub-attributes of simple complex attributes, one-to-one mapping on their names and values between SCIM and LDAP is achieved. However, it is not possible to map CMVA sub-attributes to a single LDPA row using known techniques.

FIG. 23 depicts one-to-one mapping 2300 for simple, simple multi-valued, and simple complex attributes between SCIM and LDAP, in accordance with an embodiment of the invention. LDPA subtypes are used to solve the mapping problem for CMVA. A subtype in LDAP is an optional expression added after the LDAP attribute name, separated by semicolon ";", i.e., a row in LDAP directory can be ldapAttributeName;[subtype]:value. Providing different subtype expressions for SCIM sub-attributes in different set of values and keeping it the same within one set allows for uniquely distinguishing and mapping any sub-attribute from any set of SCIM values into one LDAP row. More importantly, when converting the corresponding LDAP rows back to SCIM data, the SCIM sub-attributes can be grouped within one set based on subtype without further manipulation. To achieve this, at least one sub-attribute is always present (its 'required' property in schema is defined as true) for a CMVA, and a hashcode is computed from its value and then assigned as the name of the LDPA subtype.

In certain embodiments, for a CMVA sub-attribute of a particular set of values, the name of its LDAP row is:

---
ldapAttributeName;
<hash code computed from required sub-attribute's value in set>
---

Figure 24:
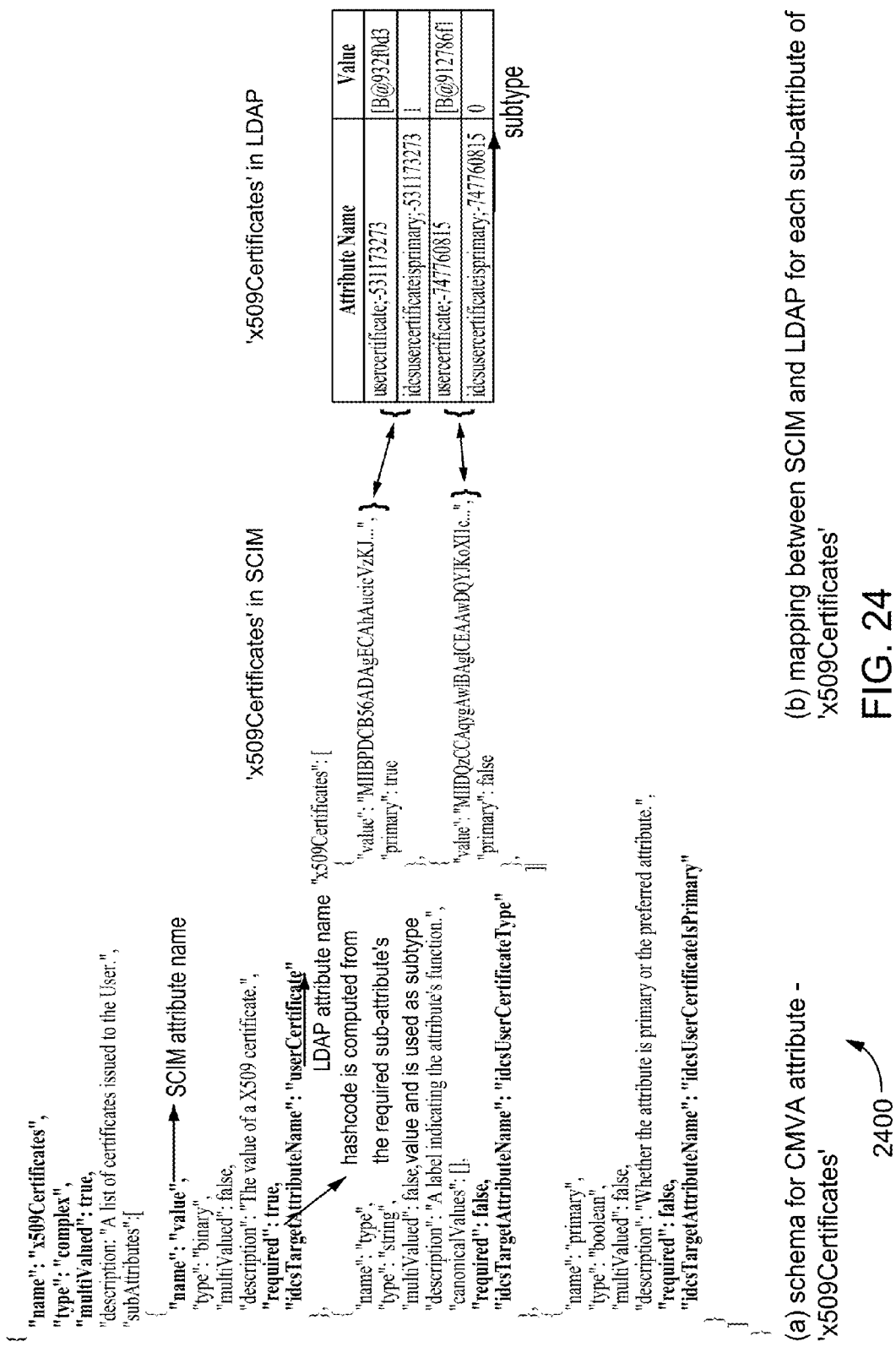
FIG. 24 depicts usage of LDAP subtype to map between SCIM and LDAP data, in accordance with an embodiment of the present invention.

FIG. 24 depicts usage of LDAP subtype to map 2400 between SCIM and LDAP data, in accordance with an embodiment of the present invention. In "x509Cerfificates" CMVA, a "value" sub-attribute is required. Then, in each set of values, the value of "value" is used to compute the hash code which appends as a subtype after the LDAP attribute name for all the sub-attributes in that particular set. In this example, "−531173273" and "−747760815" are two subtypes that are used to group two sets of sub-attributes when LDAP attributes are mapped back to SCIM.

Frequently, the same value occurs for the required sub-attribute, such as "value," but they belong to different "types."

Figure 25:
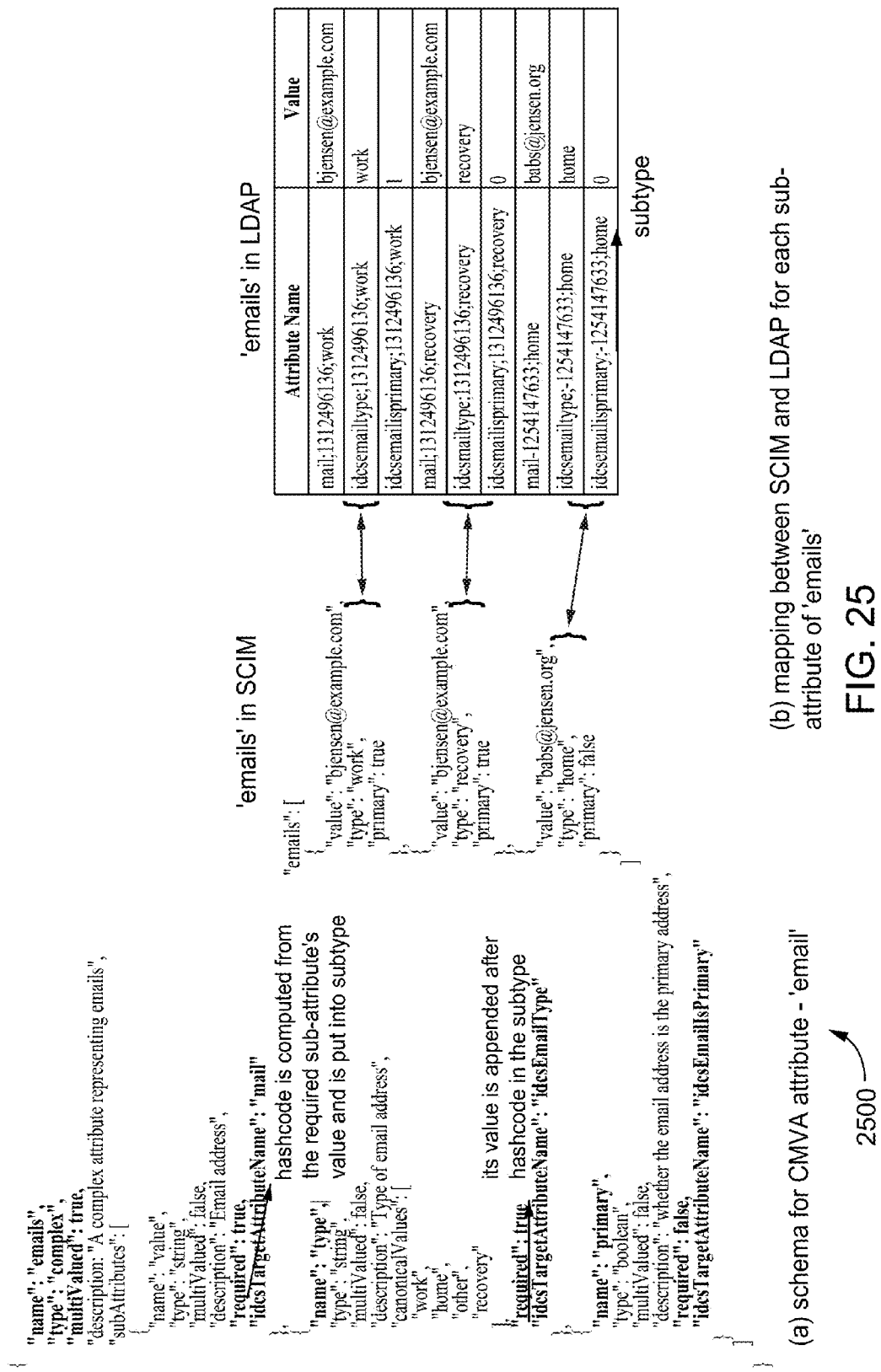
FIG. 25 depicts usage of LDAP subtype (with "type" sub-attribute) to achieve mapping between SCIM and LDAP data, in accordance with an embodiment of the present invention.

FIG. 25 depicts usage of LDAP subtype (with "type" sub-attribute) to achieve mapping 2500 between SCIM and LDAP data, in accordance with an embodiment of the present invention. In CMVA "emails", the "work" type and "recovery" type emails are both "bjensen@example.com". To distinguish these two sets of values, the "required" property of "type" sub-attribute is set to be true, which means to append the value of "type" after hash code when forming the subtype.

In certain embodiments, the name of LDAP row is:

---
ldapAttributeName;
<hash code computed from the required sub-attribute's value in the set>;
<"type" sub-attribute's value if it is required>
---

In this example, there are three subtypes as 1312496136; work, 1312496136; recovery, and −1254147633; home, to uniquely define the three set of email values.

In certain embodiments, an LDAP to SCIM proxy service 1322 allows legacy LDAP-based applications to interact seamlessly with an IDCS SCIM server. Newly-deployed on-premises SCIM-based applications may access the IDCS SCIM server directly, as well as those legacy on-premises LDAP-based applications that have been re-written to support SCIM. In a hybrid cloud deployment, the LDAP to SCIM proxy service 1322 advantageously provides a single source of truth for identities, and avoids the complexities, disadvantages and limitations of identity federation and/or synchronization configurations.

In certain embodiments, an LDAP to SCIM proxy service 1322 receives an LDAP request from an LDAP-based application running on an LDAP-based application server, translates the LDAP request to a SCIM request, forwards the SCIM request to a SCIM server within the IDCS. The LDAP to SCIM proxy service 1322 then receives a SCIM response from the SCIM server within the IDCS, translates the SCIM response to an LDAP response, and forwards the LDAP response to the LDAP-based application.

In certain embodiments, a method for processing LDAP (Lightweight Directory Access Protocol) operations against a SCIM (System for Cross-domain Identity Management) directory includes providing an LDAP Directory Information Tree (DIT) including a plurality of LDAP DIT entries that describe LDAP containers, users and groups, providing a SCIM directory including a plurality of SCIM resource entries that describe SCIM users and groups, migrating the plurality of LDAP DIT entries to the SCIM directory, receiving, from an LDAP-based application over a network, an LDAP operation request, processing the LDAP operation request, and returning an LDAP operation response to the LDAP-based application over the network.

In certain embodiments, each LDAP DIT entry includes a Distinguished Name (DN) and a plurality of LDAP attribute-value pairs. The DN provides LDAP DIT hierarchical information that uniquely identifies the LDAP DIT entry and describes a hierarchical position of the LDAP DIT entry in the LDAP DIT, and each LDAP attribute-value pair including an attribute name and one or more attribute values. Each SCIM resource entry includes a plurality of SCIM attributes including an externalID and a resource type identifying the SCIM resource entry as belonging to a user or a group, and each SCIM attribute including a name and one or more values. Migrating the plurality of LDAP DIT entries to the SCIM directory includes storing the LDAP DIT hierarchical information in the SCIM directory by mapping LDAP user DNs and group DNs to SCIM user externalIDs and group externalIDs. The LDAP operation request may include an LDAP Add request, an LDAP Delete request, an LDAP Modify request, or an LDAP Search request.

In certain embodiments, a method for processing Lightweight Directory Access Protocol (LDAP) operations against a System for Cross-domain Identity Management (SCIM) directory is provided. The method includes providing an LDAP Directory Information Tree (DIT) including a plurality of LDAP DIT entries that describe LDAP containers, users and groups, providing a SCIM directory including a plurality of SCIM resource entries that describe SCIM users and groups, migrating the plurality of LDAP DIT entries to the SCIM directory including storing the LDAP DIT hierarchical information in the SCIM directory by mapping LDAP containers in the LDAP DIT to special marker SCIM groups in the SCIM directory, receiving, from an LDAP-based application over a network, an LDAP operation request, processing the LDAP operation request, and returning an LDAP operation response to the LDAP-based application over the network Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer-readable medium having instructions stored thereon that, when executed by at least one processor, cause the at least one processor to preserve Lightweight Directory Access Protocol (LDAP) hierarchy in a System for Cross-domain Identity Management (SCIM) directory, the processing comprising:

providing an LDAP Directory Information Tree (DIT) including a plurality of LDAP DIT entries that describe LDAP containers, users and groups, each LDAP DIT entry including a Distinguished Name (DN) and a plurality of LDAP attribute-value pairs, the DN providing LDAP DIT hierarchical information that uniquely identifies the LDAP DIT entry and describes a hierarchical position of the LDAP DIT entry in the LDAP DIT, each LDAP attribute-value pair including an attribute name and one or more attribute values;

providing the SCIM directory including a plurality of SCIM resource entries that describe SCIM users and groups, each SCIM resource entry including a plurality of SCIM attributes including an externalID and a resource type identifying the SCIM resource entry as belonging to a user or a group, each SCIM attribute including a name and one or more values;

migrating the plurality of LDAP DIT entries to the SCIM directory, including storing the LDAP DIT hierarchical information in the SCIM directory by mapping LDAP containers in the LDAP DIT to special marker SCIM groups in the SCIM directory;

receiving, from an LDAP-based application over a network, an LDAP operation request including an LDAP add request, an LDAP delete request, an LDAP modify request, or an LDAP search request;

processing the LDAP operation request; and returning an LDAP operation response to the LDAP-based application over the network.

2. The computer-readable medium of claim 1, wherein said mapping LDAP containers to special marker SCIM groups includes, for each LDAP container in the LDAP DIT:
creating a special marker SCIM group entry in the SCIM directory for the LDAP container,
determining whether the LDAP container is a child LDAP container of a parent LDAP container, and
adding the special marker SCIM group entry to a parent special marker SCIM group entry associated with the parent LDAP container.

3. The computer-readable medium of claim 2, wherein said determining whether the LDAP container is the child LDAP container includes:
extracting an LDAP DN value from the LDAP container,
parsing the LDAP DN value, and
identifying the parent LDAP container based on the parsed LDAP DN value.

4. The computer-readable medium of claim 2,
wherein said processing the LDAP operation request includes:
for the LDAP add request:
extracting an LDAP DN value and the plurality of LDAP attribute-value pairs from the LDAP add request,
parsing the LDAP DN value to identify a relative distinguished name (RDN) and the parent LDAP container,
converting the plurality of LDAP attribute-value pairs to respective SCIM attributes,
creating a new SCIM entry having a SCIM ID in the SCIM directory, including storing the relative distinguished name attribute and the respective SCIM attributes in the new SCIM entry, and setting the resource type of the new SCIM entry to user or group,
adding the SCIM ID to the special marker SCIM group entry associated with the parent LDAP container,
converting the new SCIM entry to a virtual LDAP DIT entry, and
creating an LDAP add response that includes the virtual LDAP DIT entry; and
wherein said returning the LDAP operation response to the LDAP-based application over the network includes:
for the LDAP add request:
sending the LDAP add response to the LDAP-based application over the network.

5. The computer-readable medium of claim 2,
wherein said processing the LDAP operation request includes:
for the LDAP delete request:
extracting an LDAP DN value from the LDAP delete request,
parsing the LDAP DN value to identify an RDN and the parent LDAP container,
searching the SCIM directory to find a matching SCIM entry having a SCIM ID and a SCIM attribute that matches the RDN,
deleting the matching SCIM entry from the SCIM directory,
removing the SCIM ID from the special marker SCIM group entry associated with the parent LDAP container, and
creating an LDAP delete response; and
wherein said returning the LDAP operation response to the LDAP-based application over the network includes:
for the LDAP delete request:
sending the LDAP delete response to the LDAP-based application over the network.

6. The computer-readable medium of claim 1,
wherein said processing the LDAP operation request includes:
for the LDAP search request:
extracting a search base DN value and a search scope value from the LDAP search request,
creating a SCIM search request based on the search base DN value and the search scope value,
searching the SCIM directory to find one or more SCIM entries that match the SCIM search request,
converting each matching SCIM entry to a virtual LDAP DIT entry, and
creating an LDAP search response that includes each virtual LDAP DIT entry; and
wherein said returning the LDAP operation response to the LDAP-based application over the network includes:
for the LDAP search request:
sending the LDAP search response to the LDAP-based application over the network.

7. The computer-readable medium of claim 6, wherein said processing the LDAP operation request further includes:
for the LDAP search request:
extracting an LDAP filter from the LDAP search request, the LDAP filter including a plurality of LDAP filter attributes,
converting the plurality of LDAP filter attributes to SCIM filter attributes,
creating a SCIM filter based on the SCIM filter attributes, and
adding the SCIM filter to the SCIM search request.

8. The computer-readable medium of claim 7, wherein said processing the LDAP operation request further includes:
for the LDAP search request:
creating an additional SCIM filter to search for a SCIM entry that is a member of one or more special marker SCIM groups that are associated with respective parent containers in the LDAP DIT, and adding the additional SCIM filter to the SCIM search request.

9. A method for preserving Lightweight Directory Access Protocol (LDAP) hierarchy in a System for Cross-domain Identity Management (SCIM) directory, the method comprising:

providing an LDAP Directory Information Tree (DIT) including a plurality of LDAP DIT entries that describe LDAP containers, users and groups, each LDAP DIT entry including a Distinguished Name (DN) and a plurality of LDAP attribute-value pairs, the DN providing LDAP DIT hierarchical information that uniquely identifies the LDAP DIT entry and describes a hierarchical position of the LDAP DIT entry in the LDAP DIT, each LDAP attribute-value pair including an attribute name and one or more attribute values;

providing the SCIM directory including a plurality of SCIM resource entries that describe SCIM users and groups, each SCIM resource entry including a plurality of SCIM attributes including an externalID and a resource type identifying the SCIM resource entry as belonging to a user or a group, each SCIM attribute including a name and one or more values;

migrating the plurality of LDAP DIT entries to the SCIM directory, including storing the LDAP DIT hierarchical information in the SCIM directory by mapping LDAP containers in the LDAP DIT to special marker SCIM groups in the SCIM directory;

receiving, from an LDAP-based application over a network, an LDAP operation request including an LDAP add request, an LDAP delete request, an LDAP modify request, or an LDAP search request;

processing the LDAP operation request; and returning an LDAP operation response to the LDAP-based application over the network.

10. The method of claim 9, wherein said mapping LDAP containers to special marker SCIM groups includes, for each LDAP container in the LDAP DIT:

creating a special marker SCIM group entry in the SCIM directory for the LDAP container, determining whether the LDAP container is a child LDAP container of a parent LDAP container, including:

extracting an LDAP DN value from the LDAP container, parsing the LDAP DN value, and identifying the parent LDAP container based on the parsed LDAP DN value; and adding the special marker SCIM group entry to a parent special marker SCIM group entry associated with the parent LDAP container.

11. The method of claim 10, wherein said processing the LDAP operation request includes:

for the LDAP add request:

extracting an LDAP DN value and the plurality of LDAP attribute-value pairs from the LDAP add request, parsing the LDAP DN value to identify a relative distinguished name (RDN) and the parent LDAP container, converting the plurality of LDAP attribute-value pairs to respective SCIM attributes, creating a new SCIM entry having a SCIM ID in the SCIM directory, including storing the relative distinguished name attribute and the respective SCIM attributes in the new SCIM entry, and setting the resource type of the new SCIM entry to user or group, adding the SCIM ID to the special marker SCIM group entry associated with the parent LDAP container, converting the new SCIM entry to a virtual LDAP DIT entry, and creating an LDAP add response that includes the virtual LDAP DIT entry; and wherein said returning the LDAP operation response to the LDAP-based application over the network includes:

for the LDAP add request:

sending the LDAP add response to the LDAP-based application over the network.

12. The method of claim 10, wherein said processing the LDAP operation request includes:

for the LDAP delete request:

extracting an LDAP DN value from the LDAP delete request, parsing the LDAP DN value to identify an RDN and the parent LDAP container, searching the SCIM directory to find a matching SCIM entry having a SCIM ID and a SCIM attribute that matches the RDN, deleting the matching SCIM entry from the SCIM directory, removing the SCIM ID from the special marker SCIM group entry associated with the parent LDAP container, and creating an LDAP delete response; and wherein said returning the LDAP operation response to the LDAP-based application over the network includes:

for the LDAP delete request:

sending the LDAP delete response to the LDAP-based application over the network.

13. The method of claim 9, wherein said processing the LDAP operation request includes:

for the LDAP search request:

extracting a search base DN value and a search scope value from the LDAP search request, creating a SCIM search request based on the search base DN value and the search scope value, searching the SCIM directory to find one or more SCIM entries that match the SCIM search request, converting each matching SCIM entry to a virtual LDAP DIT entry, and creating an LDAP search response that includes each virtual LDAP DIT entry; and wherein said returning the LDAP operation response to the LDAP-based application over the network includes:

for the LDAP search request:

sending the LDAP search response to the LDAP-based application over the network.

14. The method of claim 13, wherein said processing the LDAP operation request further includes:

for the LDAP search request:

extracting an LDAP filter from the LDAP search request, the LDAP filter including a plurality of LDAP filter attributes, converting the plurality of LDAP filter attributes to SCIM filter attributes, creating a SCIM filter based on the SCIM filter attributes, adding the SCIM filter to the SCIM search request, creating an additional SCIM filter to search for a SCIM entry that is a member of one or more special marker SCIM groups that are associated with respective parent containers in the LDAP DIT, and adding the additional SCIM filter to the SCIM search request.

15. A system for preserving Lightweight Directory Access Protocol (LDAP) hierarchy in a System for Cross-domain Identity Management (SCIM) directory, the system comprising:

a first hardware processor, coupled to a network, configured to:

provide an LDAP Directory Information Tree (DIT), stored in a first memory coupled to the first processor, including a plurality of LDAP DIT entries that describe LDAP containers, users and groups, each LDAP DIT entry including a Distinguished Name (DN) and a plurality of LDAP attribute-value pairs, the DN providing LDAP DIT hierarchical information that uniquely identifies the LDAP DIT entry and describes a hierarchical position of the LDAP DIT entry in the LDAP DIT, each LDAP attribute-value pair including an attribute name and one or more attribute values;

a second hardware processor, coupled to the network, configured to:

provide the SCIM directory, stored in a second memory coupled to the second processor, including a plurality of SCIM resource entries that describe SCIM users and groups, each SCIM resource entry including a plurality of SCIM attributes including an externalID and a resource type identifying the SCIM resource entry as belonging to a user or a group, each SCIM attribute including a name and one or more values;

migrate the plurality of LDAP DIT entries to the SCIM directory, including storing the LDAP DIT hierarchical information in the SCIM directory by mapping LDAP containers in the LDAP DIT to special marker SCIM groups in the SCIM directory;

receive, from an LDAP-based application over the network, an LDAP operation request including an LDAP add request, an LDAP delete request, an LDAP modify request, or an LDAP search request;

process the LDAP operation request; and return an LDAP operation response to the LDAP-based application over the network.

16. The system of claim 15, wherein said mapping LDAP containers to special marker SCIM groups includes, for each LDAP container in the LDAP DIT:

creating a special marker SCIM group entry in the SCIM directory for the LDAP container, determining whether the LDAP container is a child LDAP container of a parent LDAP container, including:

extracting an LDAP DN value from the LDAP container, parsing the LDAP DN value, identifying the parent LDAP container based on the parsed LDAP DN value, and adding the special marker SCIM group entry to a parent special marker SCIM group entry associated with the parent LDAP container.

17. The system of claim 16, wherein said process the LDAP operation request includes:

for the LDAP add request:

extract an LDAP DN value and the plurality of LDAP attribute-value pairs from the LDAP add request, parse the LDAP DN value to identify a relative distinguished name (RDN) and the parent LDAP container, convert the plurality of LDAP attribute-value pairs to respective SCIM attributes, create a new SCIM entry having a SCIM ID in the SCIM directory, including storing the relative distinguished name attribute and the respective SCIM attributes in the new SCIM entry, and setting the resource type of the new SCIM entry to user or group, add the SCIM ID to the special marker SCIM group entry associated with the parent LDAP container, convert the new SCIM entry to a virtual LDAP DIT entry, and create an LDAP add response that includes the virtual LDAP DIT entry; and wherein said return the LDAP operation response to the LDAP-based application over the network includes:

for the LDAP add request:

send the LDAP add response to the LDAP-based application over the network.

18. The system of claim 16, wherein said process the LDAP operation request includes:

for the LDAP delete request:

extract an LDAP DN value from the LDAP delete request, parse the LDAP DN value to identify an RDN and the parent LDAP container, search the SCIM directory to find a matching SCIM entry having a SCIM ID and a SCIM attribute that matches the RDN, delete the matching SCIM entry from the SCIM directory, remove the SCIM ID from the special marker SCIM group entry associated with the parent LDAP container, and create an LDAP delete response; and wherein said return the LDAP operation response to the LDAP-based application over the network includes:

for the LDAP delete request:

send the LDAP delete response to the LDAP-based application over the network.

19. The system of claim 15, wherein said process the LDAP operation request includes:

for the LDAP search request:

extract a search base DN value and a search scope value from the LDAP search request, create a SCIM search request based on the search base DN value and the search scope value, search the SCIM directory to find one or more SCIM entries that match the SCIM search request, convert each matching SCIM entry to a virtual LDAP DIT entry, and create an LDAP search response that includes each virtual LDAP DIT entry; and wherein said return the LDAP operation response to the LDAP-based application over the network includes:

for the LDAP search request:

send the LDAP search response to the LDAP-based application over the network.

20. The system of claim 19, wherein said processing the LDAP operation request further includes:

for the LDAP search request:
- extract an LDAP filter from the LDAP search request, the LDAP filter including a plurality of LDAP filter attributes,
- convert the plurality of LDAP filter attributes to SCIM filter attributes,
- create a SCIM filter based on the SCIM filter attributes,
- add the SCIM filter to the SCIM search request,
- create an additional SCIM filter to search for a SCIM entry that is a member of one or more special marker SCIM groups that are associated with respective parent containers in the LDAP DIT, and add the additional SCIM filter to the SCIM search request.

* * * * *